US012578864B2

(12) United States Patent
Canepa

(10) Patent No.: US 12,578,864 B2
(45) Date of Patent: Mar. 17, 2026

(54) OPTIMIZED I/O PERFORMANCE REGULATION FOR NON-VOLATILE STORAGE

(71) Applicant: QoS Tech LLC, Los Gatos, CA (US)

(72) Inventor: Timothy L. Canepa, Los Gatos, CA (US)

(73) Assignee: QoS TECH LLC, Los Gatos, CA (US)

( * ) Notice: Subject to any disclaimer, the term of this patent is extended or adjusted under 35 U.S.C. 154(b) by 0 days.

(21) Appl. No.: 18/763,244

(22) Filed: Jul. 3, 2024

(65) Prior Publication Data

US 2025/0004644 A1 Jan. 2, 2025

Related U.S. Application Data

(63) Continuation of application No. 18/368,434, filed on Sep. 14, 2023, now Pat. No. 12,056,360, which is a continuation of application No. 17/850,020, filed on Jun. 27, 2022, now Pat. No. 11,797,187.

(60) Provisional application No. 63/215,878, filed on Jun. 28, 2021.

(51) Int. Cl.
*G06F 3/06* (2006.01)

(52) U.S. Cl.
CPC .......... *G06F 3/0611* (2013.01); *G06F 3/0659* (2013.01); *G06F 3/067* (2013.01)

(58) Field of Classification Search
CPC ....... G06F 3/0611; G06F 3/0659; G06F 3/067
See application file for complete search history.

(56) References Cited

U.S. PATENT DOCUMENTS

| | | | |
|---|---|---|---|
| 9,298,493 B1 | 3/2016 | Harel et al. | |
| 9,971,548 B1 * | 5/2018 | Talwar ................. | G06F 3/0613 |
| 2006/0090163 A1 * | 4/2006 | Karisson ............. | G06F 11/3409 |
| | | | 718/105 |
| 2008/0244209 A1 * | 10/2008 | Seelam ................. | G06F 3/0659 |
| | | | 711/E12.001 |
| 2013/0326284 A1 | 12/2013 | Losh et al. | |
| 2014/0359243 A1 * | 12/2014 | Byrd ..................... | G06F 3/0683 |
| | | | 711/170 |
| 2016/0139815 A1 * | 5/2016 | Levy ..................... | G06F 3/0644 |
| | | | 711/158 |
| 2016/0292116 A1 | 10/2016 | Wakhare et al. | |
| 2018/0335978 A1 | 11/2018 | Tidwell et al. | |

(Continued)

OTHER PUBLICATIONS

Wan, Lipeng, et al. "SSD-optimized workload placement with adaptive learning and classification in HPC environments." 2014 30th Symposium on Mass Storage Systems and Technologies (MSST). IEEE, 2014. (Year: 2014).*

(Continued)

*Primary Examiner* — Nicholas J Simonetti
(74) *Attorney, Agent, or Firm* — POLSINELLI LLP

(57) ABSTRACT

A credit regulation and monitoring module receives a command for an application that is to be executed. In response to the command, credit amount for execution of the command is calculated. Further, an outstanding credit amount is determined based on an outstanding credit table and the other commands being executed. It is determined whether the credit amount and the outstanding credit are below a threshold value. If so, the command is executed and an outstanding credit table is updated to reduce the amount of credit available according to the credit amount allocated to the command.

21 Claims, 29 Drawing Sheets

(56) References Cited

U.S. PATENT DOCUMENTS

| | | |
|---|---|---|
| 2019/0065086 A1 | 2/2019 | Margetts et al. |
| 2020/0007462 A1 | 1/2020 | Singhal et al. |
| 2020/0112521 A1 | 4/2020 | Desai |
| 2021/0200481 A1 | 7/2021 | Buxton et al. |
| 2021/0200703 A1 | 7/2021 | Simionescu et al. |
| 2022/0035574 A1* | 2/2022 | Cain ..................... G06F 3/0613 |
| 2022/0091739 A1 | 3/2022 | Kumar et al. |

OTHER PUBLICATIONS

Notice of Allowance dated Jun. 23, 2023 for U.S. Appl. No. 17/850,020, filed Jun. 27, 2022, 10 pages.

Final Office Action dated Jan. 20, 2023 for U.S. Appl. No. 17/085,020, filed Jun. 27, 2022, 17 pages.

Non-Final Office Action dated Sep. 15, 2022 for U.S. Appl. No. 17/085,020, filed Jun. 27, 2022, 16 pages.

Ling, Xiao et al., "Efficient disk I/O scheduling with qus guarantee for xen-based hosting platforms." 2012 12th IEEE/ACM International Symposium on Cluster, Cloud and Grid Computing (ccgrid 2012). IEEE, 2012 (Year: 2012).

ISR and Written Opinion, dated Sep. 14, 2022, PCT/US2022/035119, filed Jun. 27, 2022, 37 pages.

Bentaleb, H. et al., "QoS Generic Mechanisms in an Operating System," Factory Communication Systems 1997. Proceedings, 1997 IEEE International Workshop on Barcelona, Spain Oct. 1-3, 1997, New York, NY USA, IEEE, US, Oct. 1, 1997, pp. 48-59.

Notice of Allowance dated Apr. 17, 2024 for U.S. Appl. No. 18/368,434, filed Sep. 14, 2023, 15 pages.

Li, Zengxiang et al., "Integrated QoS-aware Resource Provisioning, for Parallel and Distributed Applications" 2015 International Symposium on Distributed Simulation and Real Time Applications (DS-RT), IEEE, 2015. (Year: 2015).

\* cited by examiner

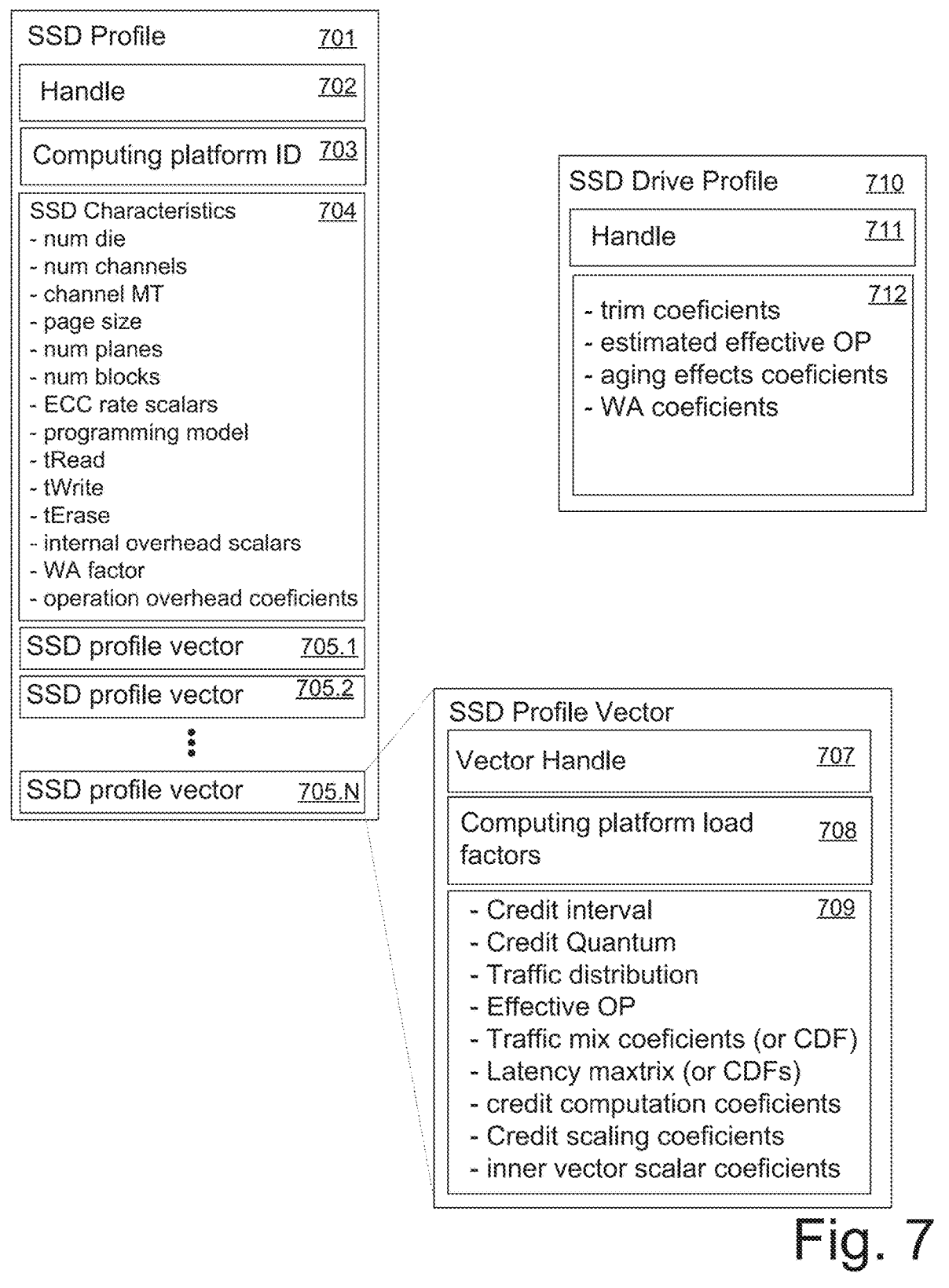

SSD Profile　　　　　　701

Handle　　　　　　　702

Computing platform ID　703

SSD Characteristics　　704
- num die
- num channels
- channel MT
- page size
- num planes
- num blocks
- ECC rate scalars
- programming model
- tRead
- tWrite
- tErase
- internal overhead scalars
- WA factor
- operation overhead coeficients SSD profile vector　　705.1

SSD profile vector　　705.2

⋮

SSD profile vector　　705.N

SSD Drive Profile　　　710

Handle　　　　　　　711

712
- trim coeficients
- estimated effective OP
- aging effects coeficients
- WA coeficients SSD Profile Vector Vector Handle　　　　707

Computing platform load　708
factors

709
- Credit interval
- Credit Quantum
- Traffic distribution
- Effective OP
- Traffic mix coeficients (or CDF)
- Latency maxtrix (or CDFs)
- credit computation coeficients
- Credit scaling coeficients
- inner vector scalar coeficients

Fig. 7

OPTIMIZED I/O PERFORMANCE REGULATION FOR NON-VOLATILE STORAGE

CROSS-REFERENCE TO RELATED APPLICATIONS

The present patent application is a continuation patent application of U.S. patent application Ser. No. 18/368,434 filed on Sep. 14, 2023, which is a continuation patent application of U.S. patent application Ser. No. 17/850,020 filed Jun. 27, 2022, now U.S. Pat. No. 11,797,187 issued Oct. 24, 2023, which claims the benefit of U.S. Provisional Patent Application No. 63/215,878 filed Jun. 28, 2021, the disclosures of which are incorporated by reference herein.

FIELD

The present disclosure relates generally to improvements in input/output (I/O) deterministic performance of non-volatile storage devices. Particularly, the present disclosure relates to methods and systems for optimizing storage I/O deterministic latency performance and performance isolation by regulating submission of I/O requests.

BACKGROUND

Modern applications have become more and more data centric rather than compute centric, requiring continuous and deterministic access to the persistent storage where the data resides. Along with that, the trend toward application consolidation in data centers employing multiprocessor servers leads to running demanding application workloads on those servers with diverse I/O requirements. The economic viability and high performance of NAND Flash based Solid State Drives (SSDs) has made SSDs a key storage medium in the data center. Furthermore, capacities of SSDs have grown so large that individual SSD storage devices include actively accessed data from multiple applications, commonly referred to as multi-tenancy.

These trends described have created a landscape where deterministic I/O performance has become a primary challenge. Independent application workloads sharing the same SSD storage interfere with each other when competing for I/O related resources, experiencing performance degradation and large variances in I/O request latency. The arrival of new tenant applications disrupt current tenant application's performance, acting like noisy neighbors, competing for shared SSD I/O resources. This is especially true when the applications have different workloads (e.g., differing numbers of read vs. write requests) due to SSD performance asymmetry between read requests and write requests.

With today's server technology and increased SSD capacities, applications sharing storage resources can experience severe performance degradation. For instance, for a server running multiple applications, with each application running a workload that performs a particular level of storage I/O, the performance degradation and latency for a particular application can change dramatically based on the workload of a more aggressive application that may have a workload whose storage I/O interferes with the performance and latency of the particular application. In many cases, an impacted application is part of a group of applications that must all return a result to a requesting entity, making the fulfilling of that result incomplete until all the applications return data. This may result in the statistically aggregated worst case latency of all the impacted application in the group significant for returning a result to the requesting entity.

Until recently, applications have had to share the hardware I/O request queues used to send commands to individual storage devices, but innovations in standards such as NVMe and related changes to the I/O stacks now allow applications to have their own dedicated I/O request queues to send storage requests to individual storage devices.

Improving deterministic I/O performance, and in particular in the access to storage through the I/O stack across concurrent, differing workloads, is a problem of growing concern. The problem becomes more pronounced when the Hypervisor or OS has to manage an increasing number of tenant applications, requiring a large number of I/Os to be managed in near real-time to guarantee deterministic I/O performance. Linux Control groups (cgroups), for example, provide a mechanism to limit storage I/O latency and bandwidth usage on a per process group in the block storage layer of the Linux Kernel. It is one of the few mechanisms today to control bandwidth allocation between tenants.

However, the approach taken by cgroups has challenges. Apportionment of bandwidth is not based on characterization of the performance capabilities of the SSD to meet the needs of the tenants, but rather on statically selected performance apportionment values selected by a system administrator to apportion bandwidth to tenant groups, making it challenging to assess if a particular SSD has sufficient bandwidth to support an additional tenant meeting that tenant's needs while also not impacting the needs of other tenants, especially with respect to request latency. To further complicate matters in using such a static bandwidth apportionment scheme as is employed by cgroups, the performance of SSDs is dependent on the fullness of the drive, as the fullness of the drive impacts garbage collection overhead and what is commonly referred to in the industry as write amplification. Furthermore, the impact of aspects of I/O requests such as I/O size and statistical I/O mix are not accounted for in their impact on the underlying SSD's performance and latency, which requires characterization of both the application and the underlying SSD. Also, from the point at which cgroups manages bandwidth, there still remains a number of critical and time consuming operations that the Hypervisor or OS must perform before a request is submitted to the hardware where the data resides. Driver locks must be obtained, Scatter Gather Lists for logical to physical memory mapping must be constructed, and the memory holding the data to be transferred must be pinned. These intervening steps add a variable amount of latency, making maintaining bandwidth challenging over small sampling intervals, which directly impacts deterministic I/O latency and bandwidth experienced by the tenant. The result is a lackluster fidelity of both bandwidth and latency as the time interval they are measured over decreases.

Some systems have addressed apportionment of I/O bandwidth and performance using statically configured methods, ignoring the dynamic nature of SSD performance as well as the dynamic nature of application performance, with latency being addressed indirectly, at best.

Accordingly, there is a need in the art for enabling the improvement in determinism of I/O access latency to non-volatile storage, especially in the presence of multiple application workloads.

SUMMARY

In the present disclosure, an application refers to a software entity treated as a unit with respect to its Input/Output (I/O) requests to one or more storage systems that include one or more non-volatile storage devices. The application comprises software running on one or more computing platforms, such as an application program, an application thread, a virtual machine, a software appliance, a container instance, an operating system, a kernel or any I/O requester. The computing platform includes the hardware and software framework where the application executes and issues I/O requests to the underlying storage. The I/O requests include read requests, write requests, and data management requests such as TRIM requests. The non-volatile storage devices include any type of non-volatile storage, such as hard disk drives, Solid-State disks, and other non-volatile storage devices along with RAID configurations of the storage devices. Solid-State Disks (SSDs) generally include one or more non-volatile memory chips, such as NAND flash chips, PCM chips, 3-D Xpoint chips, or other non-volatile memory chips. In the present disclosure, SSDs with NAND flash chips are used by way of example, but the techniques described are applicable to any type of non-volatile storage using any type of non-volatile memory storage medium.

Some applications expect a certain Quality of Service (QoS), such as a QoS guaranteed to the application by a Service-Level Agreement (SLA). According to various embodiment, QoS includes one or more factors such as: a latency guarantee, such as a bound on the worst-case latency of some percentage of the I/O operations of the applications; a bandwidth guaranty; an I/O Operations per Second (IOPs) guarantee; other I/O factor guarantees affecting application performance; any of the foregoing optionally and/or selectively divided into read and/or write guarantees; and a combination of the foregoing.

According to some embodiments of the invention, there is provided a method for QoS regulation of I/O requests to meet desired individual application QoS for one or more applications in a computing platform that includes at least one storage device in network or direct communication with at least one computer processor. QoS regulation of I/O requests uses a non-accumulating weighted credit scheme, where weighted credit required for an I/O request is based at least in part on the size and type of the I/O request, where the credit scheme also adapts to changing conditions of the storage device as well as changing conditions in the I/O request mix.

According to some embodiments, the total credit available within a time interval of the non-accumulating weighted credit scheme meets selected QoS constraints for I/O requests regulated within that time interval when required by one or more applications.

According to some embodiments, the credit is metered across a time interval to meet selected QoS constraints for I/O requests regulated within that time interval when required by one or more applications.

According to some embodiments, the determination of the total credits available within a time interval is computed from a storage device performance profile vector selected from a plurality of storage device performance profile vectors.

According to some embodiments, the storage device performance profile vectors are created via performance analysis of the storage device.

According to some embodiments, a portion or all of the storage device performance profile vectors are created via performance modeling analysis of the storage device.

According to some embodiments, the credit scheme is adapted to changing conditions by tracking storage device fullness, TRIM operations, aging, and conditions that cause read disturb handling.

According to some embodiments, the selection of the storage device performance profile vector is determined based on the quality of service needs of the applications, where each application is apportioned credits according to that application's performance and quality of service profile.

According to some embodiments, the application's QoS profile is created by analyzing performance of the application's behavior.

According to some embodiments, the determination of which storage device or portions of a plurality of storage devices to assign to an application is based on a determination of whether there is adequate remaining credit based on the selected storage device performance profile or profiles and the application's credit needs from that profile or profiles to achieve the application's quality of service needs without impacting the quality of service needs of other applications using the storage device or devices.

According to some embodiments, an application's workload is dynamically migrated based on a determination that the underlying storage device can no longer meet the application's performance profile due to a change in the condition of the underlying storage, a change to the application's performance profile, or a change to another application's performance profile sharing the same storage device.

According to some embodiments, a computer-implemented method if provided. The computer-implemented method comprises receiving a command for an application. The command corresponds to an I/O submission request. The computer-implemented method further comprises calculating a credit amount for execution of the command. The computer-implemented method further comprises determining outstanding credit corresponding to other commands being executed. The outstanding credit is determined based on an outstanding credit table and the other commands being executed. The computer-implemented method further comprises determining whether the credit amount and the outstanding credit are below a threshold value. When the credit amount and the outstanding credit are below the threshold value, the outstanding credit table is evaluated to identify an amount of credit available. The computer-implemented method further comprises executing the command for the application if the amount of credit available is greater than the credit amount. The computer-implemented method further comprises updating the outstanding credit table to reduce the amount of credit available according to the credit amount.

In some embodiments, determining whether the credit amount and the outstanding credit are below the threshold value is performed as a result of no other I/O requests waiting to be performed.

In some embodiments, the computer-implemented method further comprises receiving a second command for the application. The computer-implemented method further comprises determining that a second credit amount for execution of the second command and the outstanding credit are not below the threshold value. The computer-implemented method further comprises adding the second command to an I/O submission queue for later execution of the second command.

In some embodiments, the computer-implemented method further comprises receiving a completion callback. The completion callback corresponds to fulfillment of the I/O submission request. The computer-implemented method further comprises updating the outstanding credit table to release the amount of credit available according to the credit amount.

In some embodiments, the I/O submission request is retrieved from a blocked command queue as a result of a previously executed command having been completed.

In some embodiments, the threshold value corresponds to set of thresholds corresponding to a set of applications. Further, the set of thresholds are determined to account outstanding credit amounts across the set of applications over a time window according to a set of Quality of Service (QoS) requirements.

In some embodiments, the computer-implemented method further comprises determining that the command is idle. The command is idle as a result of the command failing to consume any credits from the credit amount for execution of the command over a time interval. The computer-implemented method further comprises re-allocating the credits allocated for the execution of the command. The credits are re-allocated for execution of other commands.

In an embodiment, a system comprises one or more processors and memory including instructions that, as a result of being executed by the one or more processors, cause the system to perform the processes described herein. In another embodiment, a non-transitory computer-readable storage medium stores thereon executable instructions that, as a result of being executed by one or more processors of a computer system, cause the computer system to perform the processes described herein.

This summary is not intended to identify key or essential features of the claimed subject matter, nor is it intended to be used in isolation to determine the scope of the claimed subject matter. The subject matter should be understood by reference to appropriate portions of the entire specification of this patent application, any or all drawings, and each claim.

The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

FIG. 7 illustrates an example of a SSD performance profile in accordance with at least one embodiment;

DETAILED DESCRIPTION

Figure 1:
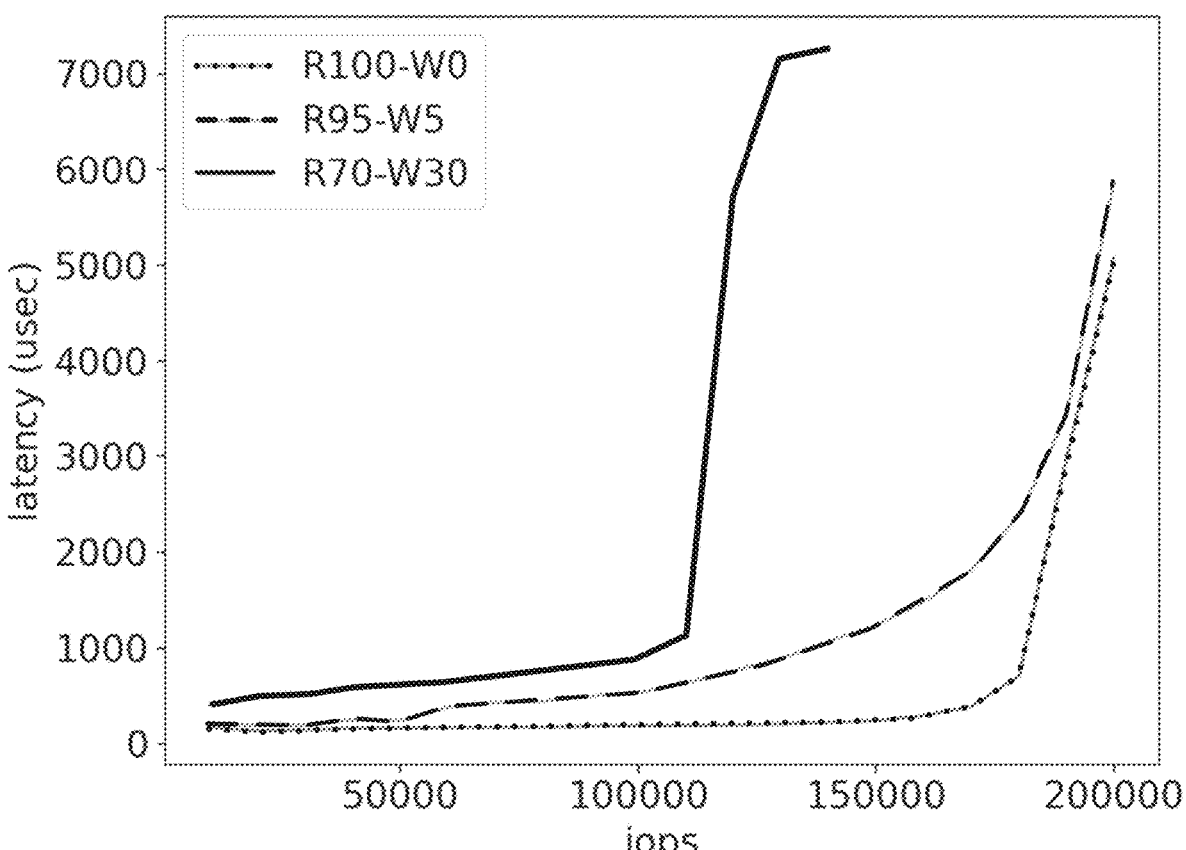
FIG. 1 illustrates examples of results of performance testing interference between application workloads.

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Introduction

This introduction is included only to facilitate the understanding of the Detailed Description; the embodiments described herein are not limited to the concepts presented in the introduction (including explicit examples, if any), as the paragraphs of any introduction are necessarily an abridged view of the entire subject and are not meant to be an exhaustive or restrictive description. For example, the introduction that follows provides overview information limited by space and organization to only certain embodiments. There are many other embodiments, including those to which claims will ultimately be drawn, discussed throughout the balance of the specification.

Acronyms

At least some of the various shorthand abbreviations (e.g. acronyms) defined here refer to certain elements used herein.

| Acronym | Description |
| --- | --- |
| CDF | Continuous Distribution Function |
| CPU | Central Processing Unit |
| CQ | Completion Queue |
| ECC | Error-Correcting Code |
| FUA | Force Unit Access |
| I/O | Input Output |
| IOPS | Input/Output operations Per Second |
| LBA | Logical Block Address |
| NVM | Non-Volatile Memory |
| NVMe | NVM Express |
| ONFI | Open NAND Flash Interface |
| OP | Over Provisioning |
| OS | Operating System |
| PDF | Probability Distribution Function |
| PMF | Probability Mass Function |
| POH | Power On Hours |
| PPV | Performance Profile Vector |
| QoS | Quality of Service |
| RBER | Raw Bit Error Rate |
| SATA | Serial Advanced Technology Attachment (Serial ATA) |
| SMART | Self-Monitoring Analysis and Reporting Technology |
| SSD | Solid-State Disk/Drive |
| SQ | Submission Queue |
| TRIM | SATA or NVMe TRIM operation |

Non-volatile storage device I/O performance and latency varies dynamically depending on application workload, computing platform and operating conditions on the non-volatile storage device. The amount of valid data stored on the storage device, wear on the non-volatile storage media, background operations such as garbage collection as well as other internal management operations all affect performance, the impact of which varies by application workload. At any given point in time, depending on the operating conditions, the non-volatile storage device is capable of producing a particular I/O performance with a particular latency distribution for a given application workload.

In various embodiments, by analyzing SSD performance under various application workloads and SSD operating conditions, a plurality of performance reference points are collected that are used to construct a plurality of credit schemes that match the various combinations of application workloads and operating conditions, where the credit schemes can be employed to meet application I/O performance, latency distribution, and QoS requirements. In some embodiments, SSD performance can further be analyzed based on the computing platform and computing platform resource utilization to construct a plurality of credit schemes. In some embodiments, by analyzing individual application performance, an application profile for a specific application is created describing that application's storage I/O performance needs. The application performance information from the application profile is then used to make a determination of whether a particular SSD that may or may not be in use by other applications has sufficient performance to meet the application's (capacity and QoS) I/O performance and latency needs based on the SSD's operating conditions and current workload, subsequently allocating a portion of SSD's resources to the application while also providing a credit scheme to constrain the application from exceeding the application profile so that it does not interfere with the performance of other applications sharing the SSD.

In some embodiments and/or usage scenarios, an SSD's current operating conditions are not known at the time a portion of the SSD's resources are allocated to an application, where a conservative view of SSD operating conditions are taken in selection of a performance reference point and associated credit scheme. Further monitoring of the SSD's actual performance is then used to ascertain actual operating conditions, allowing an actual performance reference point to be determined, such that the available performance and latency characteristics of the SSD are known and can be used in subsequent policy decisions. Even when an SSD's operating conditions are known, changes to those operating conditions still need to be monitored so that related performance impacts can be taken into account to make any necessary changes to credit schemes and policies.

In various embodiments, the I/O performance and latency (e.g., QoS) an SSD is able to produce depends on the combined application workloads applied to the SSD, where each application workload consumes a portion of the SSD's resources based on the application's workload. The credit scheme distributes SSD resources across applications based on each application's individual QoS requirements. In some embodiments, an application has no predetermined QoS requirements, where the application is assigned a portion of credits based on a default target workload profile.

According to some embodiments, the I/O performance and latency the SSD is able to produce depends on the workload running on the computing platform including the SSD.

According to various embodiments, in the event that an application deviates from its workload profile, the credit scheme dynamically adjusts to prevent the deviating application from impacting performance guarantees provided to other applications. For example, when an application's workload is unknown where that application is assigned a portion of credits based on a default target workload profile.

In some embodiments, to aid the credit enforcement mechanism in being effective, the overhead of the credit enforcement mechanism has minimal impact on application performance, while also being accurate enough to guarantee quality of service to meet individual application performance requirements. In some embodiments, for the credit enforcement mechanism in being effective, the credit scheme accounts for added overhead imposed by the credit scheme on application performance to ensure the application's desired level of QoS is met.

DETAILED DESCRIPTION

FIG. 1 illustrates examples of results of performance testing interference between application workloads. As illustrated in FIG. 1, the I/O completion latency for different combinations of read/write operations can increase substantially as the number of IOPS increases.

Figure 2A:
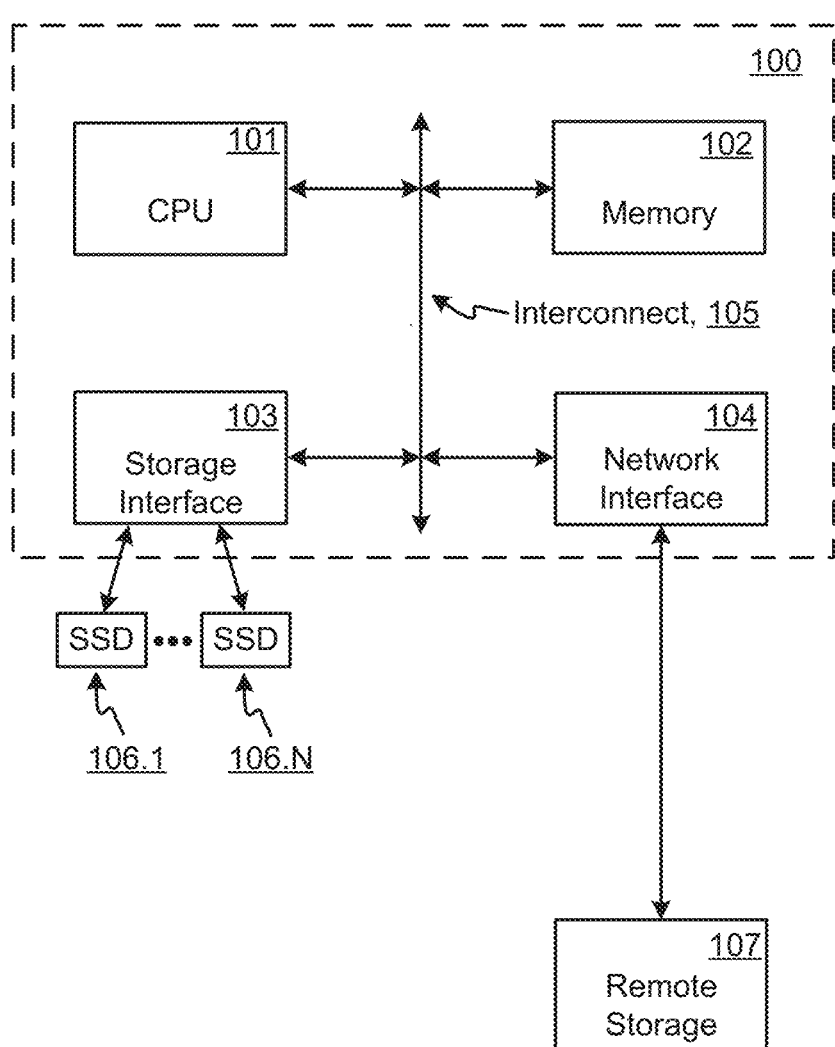
FIG. 2A illustrates one example of a system architecture in accordance with at least one embodiment.

FIG. 2A illustrates one example of a system architecture in accordance with at least one embodiment. As illustrated in FIG. 2A, a computer server 100 comprises one or more central processing units (CPUs) 101 connected to memory 102, local storage 106.1-106.N accessible via a storage interface 103, and a network interface 104 through which remote storage 107 may be accessed. These components of the computer server 100 may be interconnected through an interconnect layer 105.

Figure 2B:
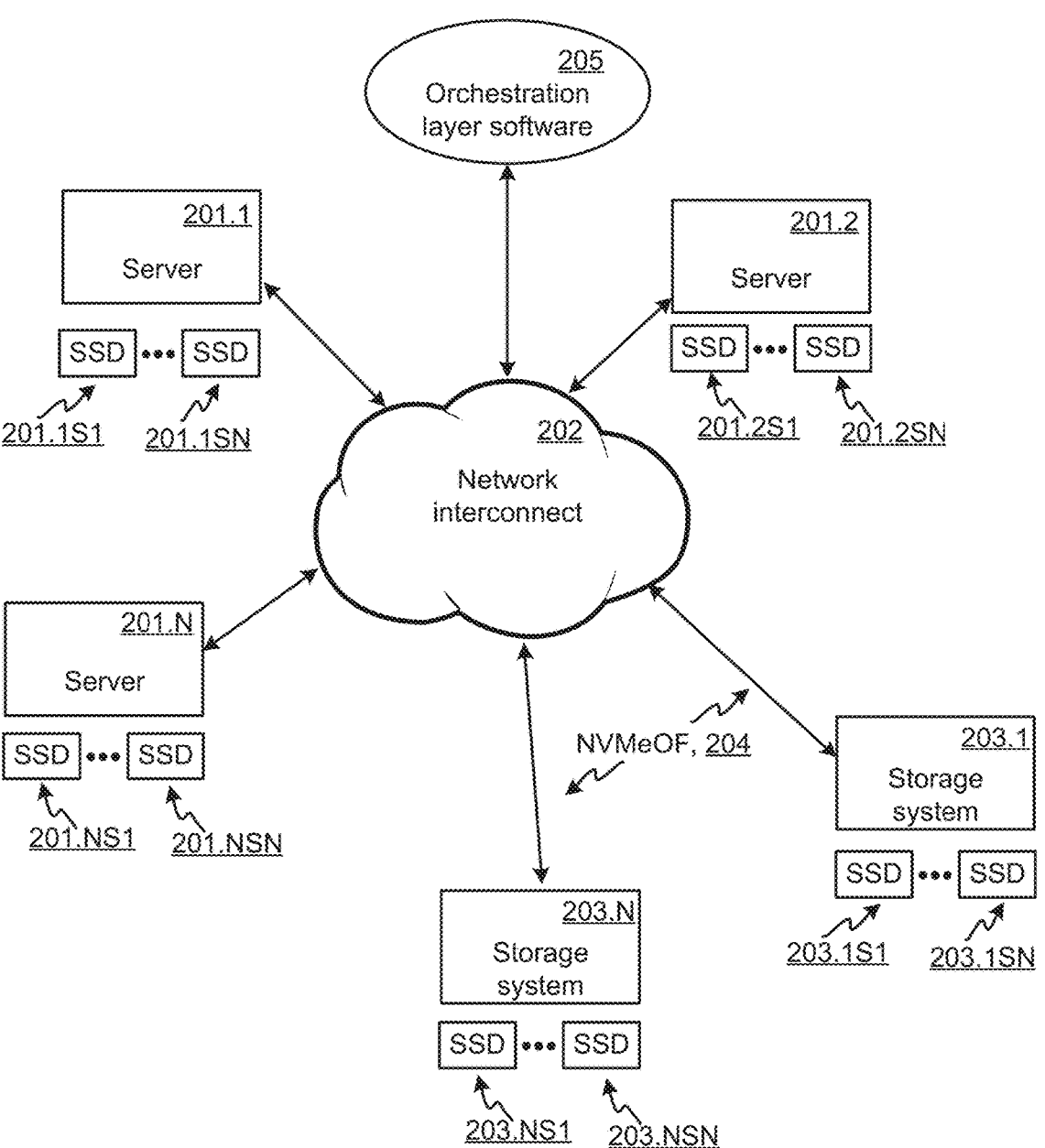
FIG. 2B illustrates an example of a network of servers and storage systems in accordance with at least one embodiment.

FIG. 2B illustrates an example of a network of servers and storage systems in accordance with at least one embodiment. As illustrated in FIG. 2B, a network of servers 201.1, 201.2, 201.N comprising one or more local storage devices 201.1S1-201.1SN, 201.2S1-201.2SN, and 201.NS1-201.NSN, respectively and remote storage systems 203.1, 203.N with corresponding storage devices 203.1S1-203.1SN and 203.NS1-203.NSN, respectively are implemented. The network may include an orchestration layer software 205, which may control where applications are executed and where storage for these applications is allocated.

Figure 3:
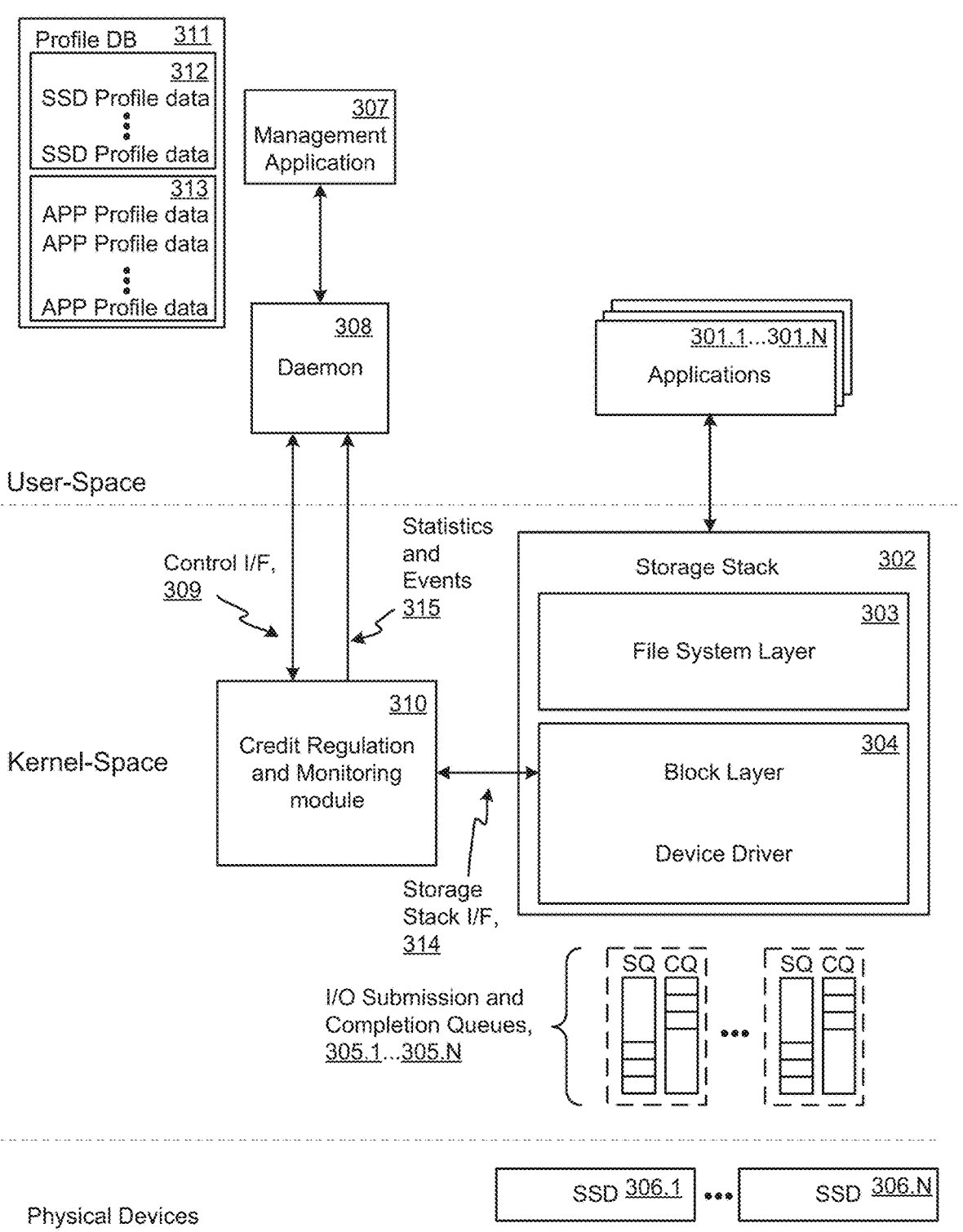
FIG. 3 illustrates an example of selected details in accordance with at least one embodiment.

FIG. 3 illustrates an example of selected details in accordance with at least one embodiment. As illustrated in FIG. 3, the kernel-space includes a storage stack 302 comprising a file system layer 303 and a block layer 304 with a device driver. The file system layer 303 provides an abstraction to organize information into separate files, each of which may be identified using a unique name. Each file system type may define its own structures and logic rules used to manage these groups of information and their names. The file system layer 303 may be used to control how data is stored and retrieved. The file system layer 303 may be used on different kinds of storage devices, including SSDs 306.1-306.N. The block layer 304 may provide buffered access to the hardware (e.g., SSDs 306.1-306.N), allowing to read or write any sized block and not subject to alignment restrictions.

The block layer 304, as noted above, may include a device driver, which provides a framework for mapping physical block devices onto higher-level virtual block devices. The device driver may pass data from a virtual block device to another block device. This data may be modified in transition. User-space applications 301.1-301.N that require creation of new mapped devices may communicate with the device driver via a shared library. The block layer 304 may further include an I/O scheduler, which is used to decide in which order the block I/O operations will be submitted to the storage volumes. The I/O scheduler may maintain a plurality of I/O submission and completion queues 305.1-305.N.

The kernel-space may further include a credit regulation and monitoring module 310 that is in communication with the block layer 304 of the storage stack 302 via a storage stack interface 314. The credit regulation and monitoring module 310 provides rate regulation for various I/O operations. In an embodiment, in order to rate regulate I/O operations, collect statistics, and the like, the credit regulation and monitoring module 310 needs to be a part of the storage stack 302 or have the ability to hook into the storage stack 302. In various embodiments, the NVMe driver can be modified to include a pair of "weak calls" that allows the NVMe driver to connect or disconnect to the credit regulation and monitoring module 310 (if present). A "weak call" is a mechanism where if the function is present at the time function linkages are resolved (e.g., when the module is loaded, etc.), the function is linked. Otherwise, the functions becomes a NOP. This may allow this new version of the NVMe driver to run unmodified on a system regardless of whether the credit regulation and monitoring module 310 exists or not.

NVMe requests can be placed in the SSD's submission queue. However, until the tail pointer is updated, the requests are not submitted to the drive. Any I/O operation in the submission queue may be ready to go (buffers pinned, scatter/gather lists created, etc.) such that no variability from the OS occurs at this point. An NVMe SSD may have multiple submission queues, allowing each one to be individually rate regulated by controlling tail pointer updates.

In various embodiments, different functions are implemented to provide the mechanics of hooking into the NVMe driver and associated control points. The "connect" function takes five characteristics: device instance, driver queue ID, SQ size, NVMe driver tail update callback, and callback context. The device instance and driver queue ID are used to allocate a rate regulation object within the credit regulation and monitoring module 310 for a particular SSD and submission queue. The SQ size is used for allocating internal tables to shadow the submission queue. The tail update callback and the callback context provide a way for the credit regulation and monitoring module 310 to instruct the NVMe driver to update the tail pointer to submit requests held back by the credit regulation and monitoring module 310.

The "connect" function returns an "ops" structure that includes two functions: a "command_can_start" function and a "command_complete" function. The NVMe driver calls the "command_can_start" function (if ops < >NULL) prior to updating a submission queue tail pointer. The "command_can_start" function evaluates if sufficient credit is available to submit the command and informs the NVMe driver if it can update the tail pointer. The "command_complete" function is called when a command is processed from an NVMe completion queue (if ops < >NULL), updating credit information and statistics.

The tail update callback function may be called when the credit regulation and monitoring module 310 determines that there are sufficient credits available to advance the tail pointer to release some number of blocked requests. The tail update callback function may be called based on various conditions. In some instances, the tail update callback may be used by the credit regulation and monitoring module 310 to release and/or submit I/O requests that have been suspended or delayed due to throttling to the SSDs 306.1-306.N. The "disconnect" function is used to unhook and release kernel resources.

The credit regulation and monitoring module 310 may interact with a daemon 308 in the user-space via a control interface 309 and a statistics and events interface 315. The daemon 308 may be a service process that supervises the system and/or provides functionality to other processes. The daemon 308 may maintain a library and may keep track of the various SSD profiles 312 and application profiles 313 within a profile database 311 implemented in the user-space. For instance, via a management application 307, the daemon 308 may load and unload the various profiles 312-313 from the profile database 311.

The daemon 308 may locally monitor and manage the credit regulation and monitoring module 310 and may provide an interface to other management frameworks and orchestration layers to instruct the credit regulation and monitoring module 310 and to receive notifications if an event is triggered. When the daemon 308 is initiated, the daemon 308 may connect to the credit regulation and monitoring module 310 and detect the SSDs 306.1-306.N. The daemon 308 may further communicate with the profile database 311 to determine which SSDs 306.1-306.N are registered to be managed and obtains the corresponding SSD profile data 312.

Once the daemon 308 has obtained the corresponding SSD profile data 312 for the registered SSDs, the daemon 308 may connect to these SSDs to determine their state. This may include determining whether the SSDs have PPVs and applications executing, whether the SSD drive profiles for these SSDs are valid, and the like. The daemon 308, in some instances, may further monitor these SSDs to detect events and statistics from these SSDs and make periodic updates to the corresponding SSD drive profiles when conditions change. The daemon 308 may register itself to listen and communicate with one or more management applications 307.

The management application interface allows orchestration layers to communicate with the daemon 308 to set policy and receive alerts. The application interface can register SSDs 306.1-306.N, set PPVs, and provide application profile region and thread information to the daemon 308, which uses this data to track allocations and make credit policy locally based on an installed PPV for a given SSD. The daemon 308 may include a library to perform SSD characteristic extraction.

Figure 4:
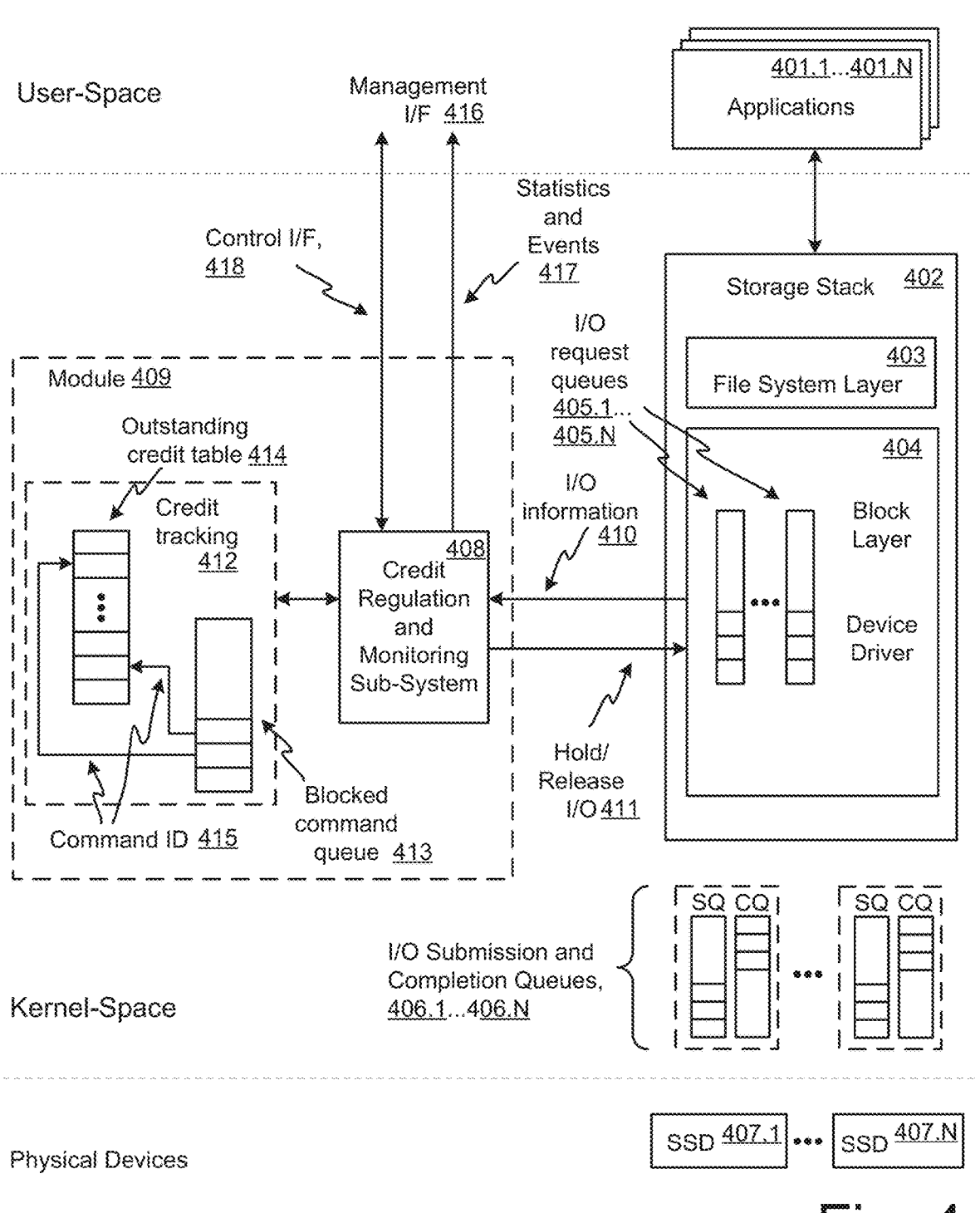
FIG. 4 illustrates an example of credit management used in regulation of I/O requests in accordance with at least one embodiment.

FIG. 4 illustrates an example of credit management used in regulation of I/O requests in accordance with at least one embodiment. As illustrated in FIG. 4, the credit regulation and monitoring module 409 may include several components that may provide rate regulation for various I/O operations. For example, the credit regulation and monitoring module 409 may include a credit regulation and monitoring sub-system 408, which may calculate the credits and monitor how much credit is currently outstanding. Further, the credit regulation and monitoring sub-system 408 may determine when to release outstanding credit for use in processing other requests.

The credit regulation and monitoring module 409 may further include credit tracking information 412 that may be used to determine the available and outstanding credit via an outstanding credit table 414 and the commands to be executed via a blocked command queue 413. The blocked command queue 413 may mirror the I/O submission queues of the I/O submission and completion queues 406.1-406.N. The I/O submission and completion queues 406.1-406.N can be different (fixed) sizes and are created by the device driver in host memory. The device driver may inform the SSD of the locations of the queues 406.1-406.N. The blocked command queue 413 may include command identifiers, which are the handles used by the device driver of the block layer 404 of the storage stack 402. One table may be 1:1 mapped to the I/O submission queues that include command identifiers and another table may be indexed by the command identifiers that include the credit for each command. When a command is blocked in the I/O submission queues, the command identifier corresponding to the command may be used in the blocked command queue 413 to lookup the number of credits the command required to proceed in the outstanding credit table. When the credit regulation and monitoring module 409 receives a completion callback from the device driver, the command identifier may be used to lookup how many credits the completed I/O was using, which may enable adjustments to the outstanding credit accordingly.

When the credit regulation and monitoring module 409 receives a completion notification from the device driver via the I/O information interface 410, the notification may include the command identifier of the completed command. This command identifier may be used to identify the command from the blocked command queue 413. The I/O information interface 410 may serve as the interface between the NVMe driver and the credit regulation and monitoring sub-system 408. The I/O information interface 410 and the I/O hold/release interface 411 may correspond to the storage stack interface 314 described above in connection with FIG. 3.

When a command is received for an application 401.1-401.N, the credit regulation and monitoring sub-system 408 calculates the amount of credit required for execution of the command. The credit regulation and monitoring sub-system 408 may evaluate an outstanding credit table 414 to determine whether there is sufficient credit available to allow for execution of the command. If the credit regulation and monitoring sub-system 408 determines that there is insufficient credit available for the command, the credit regulation and monitoring sub-system 408 may add the command to the blocked command queue 413.

The credit regulation and monitoring sub-system 408 may provide statistics and events 417 to a management interface 416. The management interface 416 may utilize the statistics and events 417 on a period basis to set and/or modify policies via the control interface 418 to the credit and regulation monitoring sub-system 408.

Figure 5:
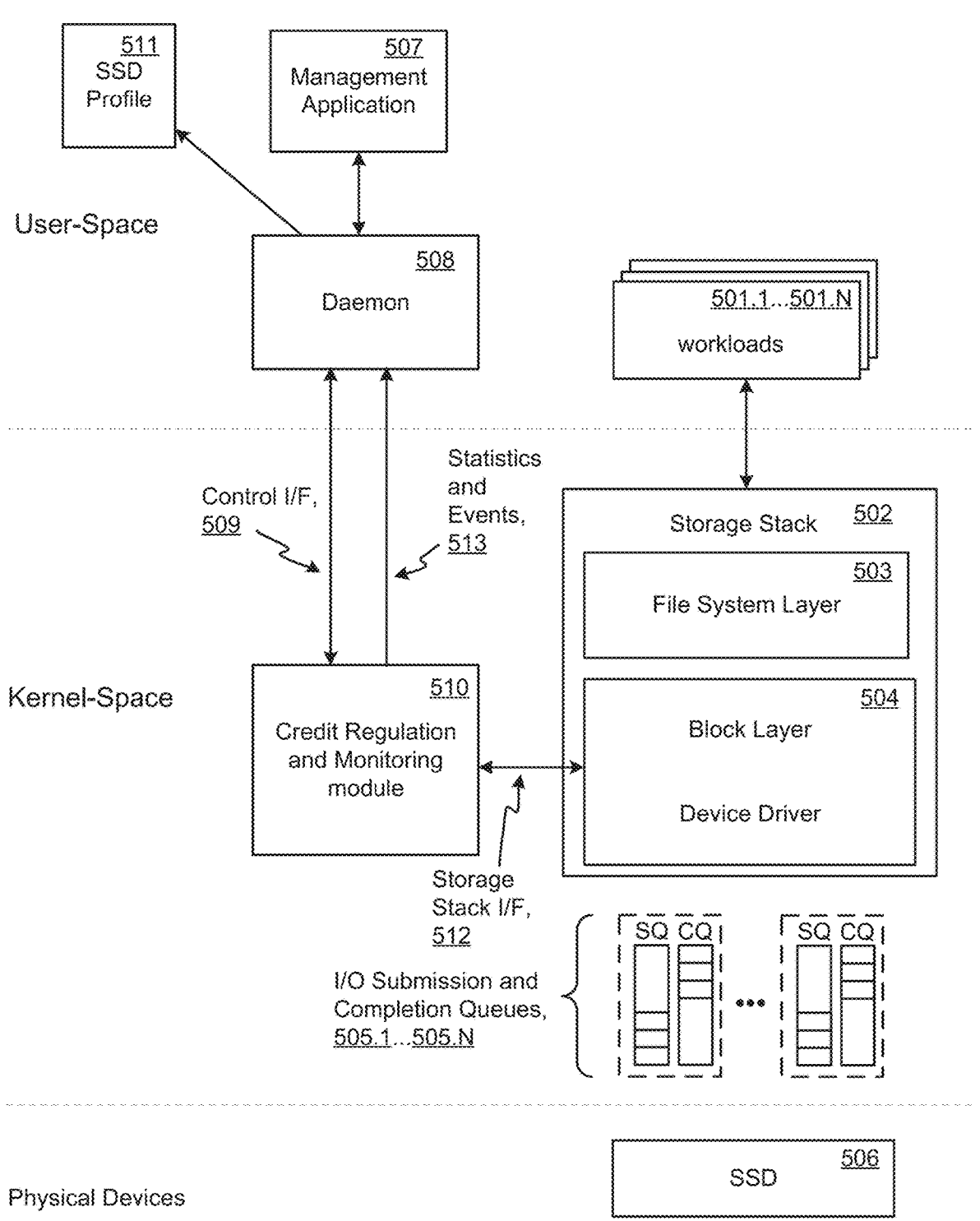
FIG. 5 illustrates an example of an apparatus for producing an SSD performance profile in accordance with at least one embodiment.

FIG. 5 illustrates an example of an apparatus for producing an SSD performance profile in accordance with at least one embodiment. As illustrated in FIG. 5, a set of workloads 501.1-501.N are applied from a plurality of applications to the SSD 506 to determine at least a portion of the characteristics of the SSD 506. A workload may be a runtime workload or a pre-defined workload that may be used to extract a specific SSD profile component for an SSD profile 511. I/O information associated with the set of workloads 501.1-501.N is obtained from the I/O submission queues of the I/O submission and completion queues 505.1-505.N.

In an embodiment, the credit regulation and monitoring module 510 captures windows of I/O information associated with the workloads 501.1-501.N until a buffer is filled. The time of the capture window may be recorded with the I/O information. The I/O information may be pulled by an analysis engine at a rate that does not perturb performance of the SSD 506. The analysis engine may be integrated as part of the daemon 508. The I/O information may include statistics such as IOPs, queue depth (QD), latency, bandwidth (BW), distribution, moving averages, histograms, and the like. Additionally, the credit regulation and monitoring module 510 may perform dither of collection of statistical data in terms of what statistics are collected in the capture window and periods outside of the capture window. In some instances, the credit regulation and monitoring module 510 can generate elastic moving averages based on workload deviations.

In an embodiment, statistics are used to produce SSD profiles, application profiles, formulate credit policies, application placement policies, and the like. A key challenge in the collection of these statistics is being able collect these statistics without disrupting performance of the SSDs and/or applications executing on the SSDs. Another challenge in collecting performance statistics on I/O operations for creating statistically-based profiles is keeping the collection of performance statistics from impacting the accuracy of these statistics.

To address these issues, in an embodiment, windows of data are captured, where the data is captured until a buffer is full. The time of the capture is window may also be recorded with the data. The data may then be pulled by an analysis engine at a rate that does not perturb performance. The data that is captured may include statistics, raw I/O characteristics, or any combination thereof. Dither of collection of statistical data, within the capture window and in terms of what statistics are collected in the capture window and what periods between the capture window, may also be used.

The credit regulation and monitoring module 510 may pass the statistical data generated using the I/O information to a daemon 508 for creation of an SSD profile 511. The statistical data may be provided to the daemon 508 via a statistics and events interface 513. The daemon 508 may utilize the statistical data to generate the PPVs for the SSD profile 511. According to various embodiments, creation of a PPV involves a multi-step process with a plurality of sequential steps and a plurality of iterative steps. In some embodiments, a first step in the creation of a PPV involves a pre-conditioning step to ensure a SSD 506 under analysis for the purpose of creating a PPV is in a specific state, where a specific state includes one or more of: a particular state of garbage collection operations; a particular age of flash blocks; a particular level of effective over provisioning; a particular level of write amplification; and a combination of the foregoing. In some embodiments, the effective over provisioning is maintained by the subsequent steps in the PPV creation process avoiding writing to unwritten LBAs from a previous preconditioning step.

According to various embodiments, a next step in creating a PPV is applying a particular workload from a plurality of applications to the SSD 506, where the workloads 501.1-501.N are scaled until a desired I/O QoS (performance level and latency distribution) is achieved. The desired I/O QoS may meet a particular set of confidence intervals and a particular set of variance constraints across I/O requests, where the resulting workload description is stored in the PPV.

In some embodiments, a next step in PPV creation involves the creation of a credit based I/O QoS regulation scheme, where the credit based I/O QoS regulation scheme maintains a target QoS and related QoS constraints of the workload definition from a prior step stored in the PPV, where the next step of creating a credit based I/O QoS regulation scheme involves multiple steps.

In some embodiments, a first step in creating a credit based I/O QoS regulation scheme involves applying the workloads 501.1-501.N from a prior step, creation of a set of initial values for credit parameters, including, but not limited to a credit replenishment amount, a credit replenishment interval, an outstanding credit limit and a set of coefficients used in a credit weighting scheme, where the credit scheme is enforced on the workloads 501.1-501.N, the application of the credit scheme on the workloads 501.1-501.N, and the subsequent iterative adjustment of the parameters until the workloads 501.1-501.N are able to meet their performance and latency objectives.

In further embodiments, a next step in creating a credit based rate regulation scheme involves applying the workloads 501.1-501.N from a prior step, application of the credit scheme on the workloads 501.1-501.N from a prior step, increasing the workloads 501.1-501.N by varying amounts on a subset of the plurality of applications, and the subsequent iterative adjustment of the parameters until the workloads 501.1-501.N on the subset of application that have not had their workloads 501.1-501.N varied is able to meet its performance and latency objectives.

In still further, embodiments, a next step in creating a credit based rate regulation scheme involves applying a mixed workload, where a portion of the workloads 501.1-501.N on a plurality of applications is from a prior step, with the remaining portion of the workloads 501.1-501.Non a plurality of applications is randomly varied, application of the credit scheme on the workloads 501.1-501.N from a prior step, application of a credit coefficient scaling mechanism based on deviations from the workloads 501.1-501.N in a prior step, and the subsequent iterative adjustment of the parameters until the workloads 501.1-501.N on the subset of application that have not had their workloads 501.1-501.N varied is able to meet its performance and latency objectives.

In various embodiments, a next step in creating a credit based rate regulation scheme involves applying a mixed workload, where a portion of the workloads 501.1-501.N on a plurality of applications is from a prior step, with the remaining portion of the workloads 501.1-501.N on a plurality of applications is varied in a fixed manner, application of the credit scheme on the workloads 501.1-501.N from a prior step, application of a credit coefficient mapping mechanism based on the amount a workload deviates from a workload in a prior step, and the subsequent iterative adjustment of the coefficient mapping parameters until the workloads 501.1-501.N on the subset of application that have not had their workloads 501.1-501.N varied is able to meet its performance and latency objectives.

In various embodiments, the credit based rate regulation scheme parameters computed in the plurality of previous steps are stored in the PPV.

In some embodiments, the configuration of the computing platform where the steps used in creating the PPV were performed is also stored in the PPV. In some embodiments computing platform configuration includes CPU, chipset, I/O bus and memory configuration information, where the computing platform configuration information is used in the process of scaling expected performance on a target computing platform. It should be noted that a plurality of PPVs can be generated on an SSD preconditioned to a particular drive state when generation of PPVs does not alter the performance behavior of the SSD from the steady state following the preconditioned state.

Figure 6:
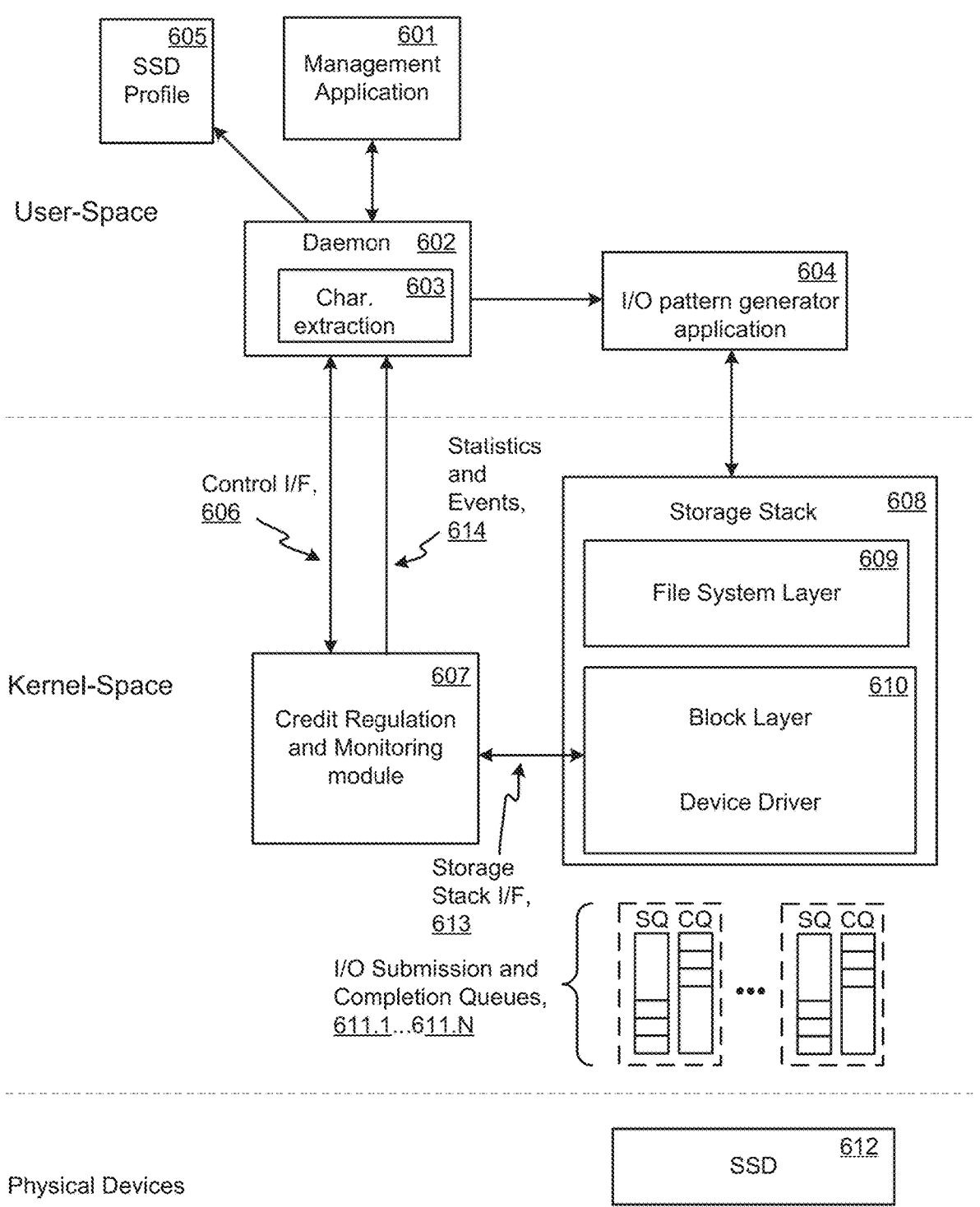
FIG. 6 illustrates an example of an apparatus for producing various drive characteristics for an SSD in accordance with at least one embodiment.

FIG. 6 illustrates an example of an apparatus for producing various drive characteristics for an SSD in accordance with at least one embodiment. As illustrated in FIG. 6, the credit regulation and monitoring module 607 interacts with a characteristic extraction engine 603 of the daemon 602 to identify one or more characteristics of the SSD 612 that can be used to generate the SSD profile 605. The credit regulation and monitoring module 607 may interact with the block layer 610 of the storage stack 608 within the kernel-space to obtain I/O information associated with particular I/O patterns generated by an I/O pattern generator application 604 operating within the user-space.

The I/O pattern generator application 604 may be implemented as an application or other executable code implemented within the user-space of the apparatus. In an embodiment, the I/O pattern generator application 604 may automatically generate one or more I/O patterns designed to determine various characteristics of the SSD 612. The SSD 612 may initially be placed in a pre-conditioning state, whereby the SSD 612 is secure erased to clear logical to physical mapping tables and/or to erase some or all of the flash blocks on the SSD 612. The I/O pattern generator application 604 may write to these flash blocks with a specific data pattern and write address pattern across some or all of the SSD 612 LBA address space to put the SSD 612 in a known state. The known state may include at least fullness of the drive, data pattern written, and LBA order written, at which point a target workload can be run against the SSD 612 for a period of time. This period of time may be determined such that a PPV with a given set of statistical requirements and associated credit algorithm and coefficients, as well as inter-vector credit scaling, can be produced.

In an embodiment, the daemon 602 instructs the I/O pattern generator application 604 to generate a particular I/O pattern or patterns to the SSD 612. The daemon 602 may pull statistics and events 614 from the credit regulation and monitoring module 607 and the characteristic extraction engine 603 uses these statistics and events 614 to identify the SSD characteristics.

As an illustrative example, a 2 TB drive made up of 16 flash die, all die with a 36 KB flash program unit size, where a flash program unit is comprised of one or more flash pages with total tprog time of 1.6 milliseconds, nominal ECC code rate to manufacturer's specifications, yielding an effective user data flash program unit size of 32 KB and over provisioning of 7% would take approximately 1.07*((2 TB decimal/32K)*1.6 milliseconds)/16=108.85 minutes to precondition to a point where recycling operations would typically start on the SSD. If generation of a single SSD Performance Profile Vector required another 60 minutes, generating 100 PPVs would take 168.85*100=16884.6 minutes or 281.4 hours of test time.

Figure 9:
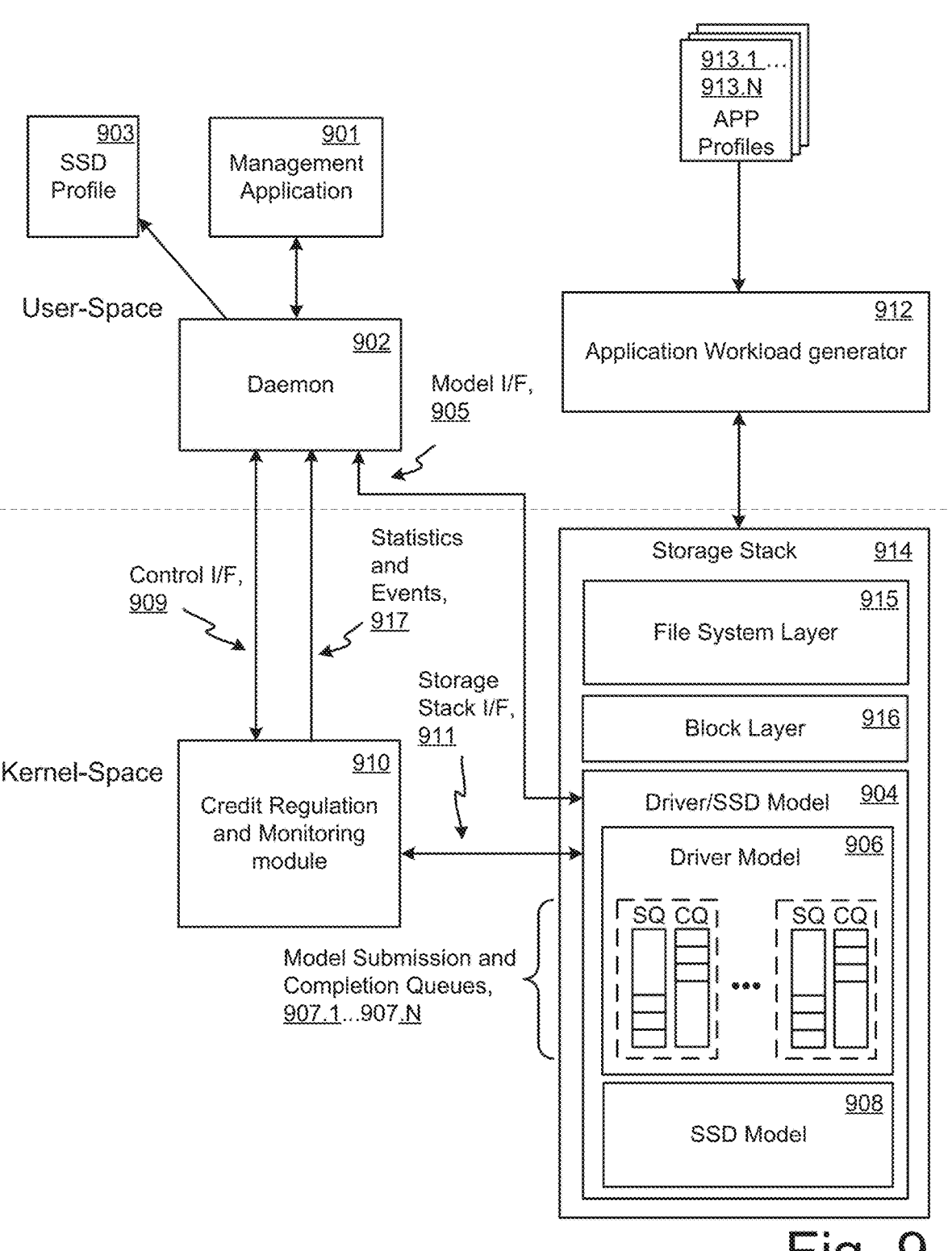
FIG. 9 illustrates an example of modeling framework to validate SSD performance profiles and to generate synthetic SSD performance profiles in accordance with at least one embodiment.

In an embodiment, a SSD performance model (as illustrated and described in greater detail with regard to FIG. 9) is used to accelerate the creation of SSD performance profile vectors for the SSD profile 605. In some embodiments the SSD performance model incorporates characteristics of the SSD to produce an accurate performance model of the SSD. In various embodiments characteristics used in the SSD performance model include flash die count, flash channel count, flash channel transfer rate, flash channel protocol, flash die block count, flash block page count, flash die plane count, flash die programing paradigm, flash die program operation times for various programming modes, flash die raw programming units for various flash programming modes, flash die ECC rates, flash die erase time, flash die program suspend support, flash die erase suspend support, flash die page read time, flash raw page size, user data bytes per flash page, SSD formatted LBA size, host interface transfer rate, host CPU baseline speed, host I/O request overhead, SSD write request overhead, SSD read request overhead, SSD ECC related read retry overhead, SSD garbage collection overhead and SSD internal buffer architecture. In some embodiments, the model can be set to a specific preconditioning state, allowing the preconditioning processor required for an actual SSD to be skipped.

In various embodiments, the SSD performance model goes through a training and calibration process to adjust SSD characteristic values, internal characteristics and internal algorithms to match SSD performance. The SSD performance model may be trained using supervised training techniques. For instance, a dataset of input workload and corresponding PPVs and/or sets of parameter ranges, characteristics ranges and algorithms can be selected for training of the SSD performance model. In some examples, the input workload can be obtained from administrators, users, and other sources of sample workload data. The SSD performance model may be evaluated to determine, based on the input sample workloads supplied to the SSD performance model, whether the SSD performance model is providing accurate PPVs and/or sets of parameter ranges, characteristics ranges and algorithms. Based on this evaluation, the SSD performance model may be modified (e.g., one or more parameters or variables may be updated) to increase the likelihood of the SSD performance model generating the desired results.

In some embodiments, a workload is run against an SSD 612 where statistics are collected on I/O requests and a PPV created. In various embodiments, the same workload is run on the SSD performance model, where iterative adjustments are made to a plurality of characteristics, parameters and algorithms until a plurality of sets of parameter ranges, characteristics ranges and algorithms are generated that can produce the same PPV as the actual SSD 612 with a specified level of statistical confidence. In some embodiments, the process is repeated for a plurality of workloads iteratively using the constrained ranges from previous workloads until a subset of ranges and algorithms are found that can meet produce PPVs matching SSD PPVs with a specified level of statistical confidence.

In some embodiments, the SSD performance model uses data from a real-time system, either online of offline, as input to identify the behavior of both an SSD and any underlying applications. The real-time network traffic may be replayed through the SSD performance model, which may result in the SSD performance model providing predictive data to the credit engine. The feedback from the SSD performance model, in embodiment, can be used to assist with real-time credit monitoring. For instance, the SSD performance model may use, as input, a number of SSD profile parameters corresponding to alignment costs, request size scaling, and the like. These SSD profile characteristics can be adjusted by inputting actual workload performance results against the SSD performance model to determine how accurately the model performs. In various embodiments, the SSD performance model can be initiated with initial estimations for these values and iteratively adjust them across a plurality of workloads.

In some embodiments, the model is implemented as a driver/block layer model module to act like a component of the storage stack 608, where the credit regulation and monitoring module 607 can monitor and perform rate regulation to I/O requests directed to the model module. In some embodiments, the model module is part of the storage stack 608. In still further embodiments, the model module is a stack separate from the storage stack 608, but still monitored and I/O request rate regulated by the credit regulation and monitoring module 607. In various embodiments, the module is run concurrently with the actual storage stack 608. In various embodiments a workload can be run against both the model module and the SSD 612 on the same host platform and in the same execution environment, where the same PPV generation process can be used. This may allow the model to perform efficiently and to calibrate itself against real world conditions and I/O requests. For instance, the aforementioned embodiments may allow the SSD perfor- mance model to generate PPVs at a faster rate while avoid- ing pre-conditioning steps.

FIG. 7 illustrates an example of a SSD performance profile 701 in accordance with at least one embodiment. A challenge in creating a credit-based I/O QoS regulation scheme for SSD Storage I/O requests to achieve a desired QoS across a plurality of applications is determining the performance behavior of a SSD under the aggregate work- load of the plurality of applications on a plurality of com- puting platforms and subsequently creating an I/O QoS regulation scheme to achieve the desired QoS across the plurality of applications. SSD performance varies greatly depending on read/write request mix, request attributes, request size, request pattern, SSD fullness and SSD age. Factors such as a covariance between the plurality of appli- cations also present challenges in creating the credit-based I/O QoS regulation scheme. A further challenge for SSDs is predicting performance degradation and/or eminent full or partial failures of the SSD.

A primary cause of variability in performance behavior is asymmetry of overhead for different types of I/O requests. For example, a workload comprising 100% 4 k random read requests generates 200K IOPS with 90% of requests having a latency under 100 microseconds, while a workload com- prising 80% 4 k random read requests and 20% 4 k random write requests only generates 80K IOPS, with 90% of requests having a latency under 500 microseconds. I/O request size and pattern also impact performance and latency. In addition, other factors that introduce variability include background operations and TRIM operations.

A further challenge in creating an I/O QoS regulation scheme for an SSD is that QoS requirements for each workload requires different I/O QoS regulation schemes that also need to factor in SSD state, where SSD state depends on the SSD fullness, over provisioning, age, and other factors impacting SSD performance. I/O Requests also have a multitude of flavors, where each unique I/O request consumes a different amount of SSD resources, has different interactions with neighboring requests and has a different I/O completion time and latency profile. In addition, the load factor on various computing system resources: CPU, memory, cache and I/O also impact I/O QoS.

Another challenge for a credit based I/O QoS regulation scheme where credit costs are not uniform across I/O requests or across workload mixes is adjusting costs dynamically when an application deviates from its assigned target workload and associated base credit scheme. Devia- tions in I/O request rate and mix require the credit I/O QoS regulation scheme to adjust to maintain QoS across a plurality of applications. Further, another challenge to a credit based I/O QoS regulation scheme is controlling the amount of credit outstanding to the SSD at any given time across a plurality of applications.

To address these challenges, in various embodiments, an SSD performance profile 701 of an SSD is constructed which is used to generate a credit scheme to regulate I/O requests to achieve a desired QoS across a plurality of applications. The SSD performance profile 701 needs the ability to meet the QoS requirements of a plurality of different workloads in a multi-tenant environment, and just as importantly, needs the ability to determine if adding an additional application workload can meet both the existing workload QoS requirements along with the new applica- tion's QoS requirements. To achieve this, in some embodi- ments, a SSD performance profile 701 is composed of a plurality of sections, where each section includes informa- tion needed for I/O QoS regulation policy decisions or I/O QoS regulation policy analysis, computation, and construc- tion. An SSD performance profile 701 may address the challenge in creating an I/O QoS regulation scheme for an SSD, where QoS requirements for each workload require different I/O QoS regulation schemes that also need to factor in SSD state, where SSD state depends on the SSD fullness, over provisioning, age, and other factors impacting SSD performance. PPVs may provide the SSD performance pro- file 701 with the ability to meet the QoS requirements of a plurality of different workloads in a multi-tenant environ- ment and to determine if adding an additional application workload can meet both the existing workload QoS require- ments along with the new application's QoS requirements. I/O requests also have a multitude of flavors, where each unique I/O request consumes a different amount of SSD resources, has different interactions with neighboring requests and has a different I/O completion time and latency profile. In addition, the load factor on various computing system resources: CPU, memory, cache and I/O also impact I/O QoS.

According to various embodiments, the sections of an SSD performance profile 701 include one or more of: a handle 702, a computing platform ID 703, a performance characteristics section 704; a Performance Profile Vectors (PPV) section 705.1-705.N; a conditions/policies section (not shown); and a combination of the foregoing. The handle 702 may indicate the serial number for the SSD, the manu- facturer for the SSD, and other information regarding the SSD (e.g., IEEE standard, etc.). The computing platform identifier 703 may indicate the computing platform for which the SSD is configured.

The performance characteristics section 704 of the per- formance profile includes a plurality of performance-related characteristics of the SSD. In some embodiments, the char- acteristics include the number and type of NAND flash die on the SSD, the number interface channels, such as of ONFI or Toggle-mode interface channels, attaching the NAND flash die to the SSD controller, the data transfer rate on the interface channels, and the topology of the flash die to controller interface channel connections. In some embodi- ments, the performance-related characteristics include non- volatile memory characteristics, such as one or more of flash die programming model, raw page size, block count, number of planes, program times, ECC requirements, NAND flash block erase times, NAND flash page read times, NAND flash read retry rates, NAND flash program failure rate, and other non-volatile memory storage characteristics, and the like. In some embodiments, the performance-related char- acteristics include internal SSD overheads for I/O operations of various sizes, alignments and types represented by a plurality equations and coefficients. In some embodiments, the characteristics include overhead of garbage collection operations, including operation times, access overhead, and request size scalars. In still some embodiments, the perfor- mance characteristics section includes performance charac- teristics for special host requests and host request options, including Force Unit Access (FUA), TRIM, and secure erase. In some embodiments, the performance characteris- tics section includes performance characteristics relating to storage media aging effects, including block retirement rates, ECC code rate aging schedules, and retry rates changes. In some embodiments, the section also includes performance characteristics of I/O operations that cause delayed performance effects, including TRIM operations and secure erase operations, where space released from these operations is not immediately made available for new data storage as it may have to still go through garbage collection and media erasure steps.

According to various embodiments, the conditions/policies section of the performance profile includes a set of conditions and notification policies to alert management entities of changes for a plurality of SSD and application behaviors. In some embodiments the set of conditions include changes from expected I/O performance and latencies, where the change is indicative of some possible failure condition in the drive, or significant change in the way the SSD performs.

According to various embodiments, the PPV section of the performance profile includes a plurality of PPVs, where each PPV represents a particular workload with a particular I/O QoS, SSD state, and an I/O QoS regulation scheme to guarantee an I/O QoS across one or more applications. In some embodiments, the PPV workload data includes an identifier that indicates the represented workload is a specific application workload, facilitating a rapid match of an application workload to the PPV. In some embodiments, the PPV includes a scheme to map workload that differ from the workload described in the PPV onto the credit scheme described in the PPV. According to various embodiments the PPV includes a set of computing platform load factors, where the load factors indicate the CPU, cache, memory and I/O load that allows the PPV workload to meet the PPV I/O QoS.

The SSD PPVs 705.1-705.N includes information about the state of the SSD. According to various embodiments the information on the state of the SSD includes one or more of: effective over provisioning; write amplification, where effective over provisioning is the amount of over provisioning created from the SSD's default over provisioning plus the over provisioning created by unwritten LBAs, any gain or loss in over provisioning from ECC code rates used to protect data stored on the flash media; media wear; expected retry behavior; or a combination of the foregoing.

According to various embodiments, the PPV workload data includes a plurality of scaling factors to map application workloads that do not match the PPV workload onto the PPV workload where the scaling factors are in turn used to appropriately adjust the credit-based I/O QoS regulation scheme to meet QoS requirements of existing applications as well as the QoS requirements of workloads that do not match the PPV workload. Additionally, an SSD PPV may include other characteristics 709, such as the corresponding credit interval, credit quantum, traffic distribution, effective OP, traffic mix coefficients, latency matric, credit computation coefficients, inner vector scalar coefficients, and the like. A SSD PPV may further include a unique vector handle 707 and computing platform load factors 708.

In some embodiments, the PPV representation of workload data includes bandwidth information. In some embodiments, the PPV representation of workload data includes IOPS information. According to various embodiments, the PPV representation of workload data includes information about I/O request types, sizes, alignment and attributes, where the information is represented as statistical distributions. In some embodiments I/O request types include but are not limited to read request, write request, flush request and data set management requests such as TRIM. In some embodiments, attributes include but are not limited to NVMe fused operations, force unit access (FUA) and limited retry. In some embodiments statistical distributions are represented as on or more of: CDFs; PDFs; PMFs; tabular data; curve fitting functions; and a combination of the foregoing.

In various embodiments, a PPV 705.1-705.N includes an I/O QoS regulation scheme comprised of techniques to generate non-accumulating credit on a periodic basis and a credit weighting scheme to assign credit costs to I/O requests based on at request type, size, alignment, and attributes, where a goal of the I/O QoS regulation scheme is meeting workload performance criteria described in the PPV 705.1-705.N across a plurality of applications. In some embodiments, credits for I/O requests come from a single pool of non-accumulating credit. In some embodiments credits in the non-accumulating credit scheme are apportioned based on one or more of the following: request type; request size; request alignment; or a combination of the foregoing. According to various embodiments, the I/O QoS regulation scheme includes one or more of: a dynamic credit adjustment scheme when an application deviates from an assigned workload; a scheme to control the amount of I/O request credit outstanding to the SSD, or a combination of the foregoing.

In some embodiments, the non-accumulating credit-based I/O QoS regulation scheme is used to achieve a particular performance for a particular workload profile, with a particular latency profile, and within a particular set of confidence intervals. This may be based on: a non-accumulating credit amount and replenishment rate; a set of I/O request type/size credit cost coefficients used in a set of credit cost formulas to compute credit; an outstanding credit limit (which serves to keep credit consumption spikes from occurring); and a dynamic credit adjustment scheme which scales credit when an application deviates from the target workload. Given the complexity of computing the plurality of the aforementioned characteristics, the computing process may be an iterative process, where characteristics are adjusted until a satisfactory result is achieved. Thus, the credit scheme may be obtained that maintains performance and avoids excursions. Further, scalar mappings for other workloads onto a given PPV's workload can be created.

In some embodiments, a PPV 705.1-705.N includes the techniques required to generate the non-accumulating credit on a periodic basis uses a timer to provide a fixed credit quanta at fixed interval. According to various embodiments, the non-accumulating credit for an interval varies adaptively based on credit consumption rate and I/O request mix. In some embodiments, the non-accumulating credit scheme described in the PPV 705.1-705.N mitigates timer overhead by computing credits in a non-accumulating credit window on-the-fly as requests arrive, where timer based non-accumulating credit replenishment is only required when credits are exhausted.

In some embodiments, the PPV credit weighting scheme applies a plurality of coefficients based on I/O request type, size, alignment, and attributes to compute credit for each I/O request. According to various embodiments, coefficients in the credit computation include the effects of prior I/O requests and background operations triggered by prior I/O requests, including, but not limited to the effects of FUA tagged requests, background garbage collection, background TRIM operations and background read disturb operations. In some embodiments, the PPV credit weighting scheme includes coefficients to account for individual I/O requests with attributes that indicate specific latency requirements.

According to various embodiments, the I/O QoS regulation scheme described in the PPV 705.1-705.N includes a mechanism to dynamically adjust credit costs when the I/O request workload deviates from the assigned workload. In some embodiments, the mechanism to dynamically adjust credit costs includes a proportional component based on deviation of I/O request type, size, alignment and attributes from a target workload for an application or plurality of applications. In some embodiments, the mechanism to dynamically adjust credit costs includes a hysteresis component based on workload deviations over time. In some embodiments, the hysteresis employs a plurality of coefficients tied to a plurality of moving averages of I/O request type, size, alignment and attributes across a plurality of applications.

According to various embodiments, the I/O QoS regulation scheme described in the PPV 705.1-705.N includes a mechanism to control the amount of credit allowed to be outstanding to the SSD across a plurality of applications. In some embodiments, the amount of outstanding credit is limited by a credit threshold, where the threshold can be embodied in a plurality of thresholds across a plurality of applications. In some embodiments, the thresholds employ a hysteresis mechanism, such as a moving average to account outstanding credit across a plurality of application over a time window, where the credits allowed outstanding across that time window meet QoS requirements for the plurality of applications. In some embodiments, a threshold for outstanding I/O requests is based on I/O request type.

In various embodiments, a PPV 705.1-705.N includes information about the state of the SSD. According to various embodiments the information on the state of the SSD includes one or more of: effective over provisioning; write amplification, where effective over provisioning is the amount of over provisioning created from the SSD's default over provisioning plus the over provisioning created by unwritten LBAs, any gain or loss in over provisioning from ECC code rates used to protect data stored on the flash media; media wear; expected retry behavior; or a combination of the foregoing.

According to various embodiments, the PPV workload data includes a plurality of scaling factors to map application workloads that do not match the PPV workload onto the PPV workload where the scaling factors are in turn used to appropriately adjust the credit-based I/O QoS regulation scheme to meet QoS requirements of existing applications as well as the QoS requirements of workloads that do not match the PPV workload.

In some embodiments, a same performance profile is used by a plurality of SSDs with the same manufacturer, model number, and firmware revision. Information specifying the manufacturer, model number and firmware revision are stored in the performance profile for identification purposes. A challenge to creating a performance profile used to QoS regulate application I/O requests to achieve a particular quality of service across a plurality of applications is the variations introduced between running the I/O QoS regulation on different computing platforms. In some embodiments, a same performance profile is used by a plurality of SSDs with the same manufacturer, model number and firmware revision connected to a same computing platform where the I/O QoS regulation is performed. Information specifying the manufacturer, model number and firmware revision along with computing platform configuration are stored in the performance profile for identification purposes.

The creation of the SSD performance profile 701 may include various steps. For instance, in various embodiments, the creation of the plurality of performance related characteristics of a SSD for creation of the SSD profile 701 involves a multi-step process with a plurality of sequential steps and a plurality of iterative steps. In some embodiments, a first step in the creation of performance related characteristics involves a pre-conditioning step to ensure a SSD under analysis for the purpose of creating performance related characteristics is in a known state. In still further embodiments creation of the plurality of performance related characteristics uses an instrumented storage I/O stack capable of measuring individual I/O times.

In some embodiments a next step in the creation of the plurality of performance related characteristics for a SSD involves writing a plurality of data for a linear LBA range where the amount of data written to the SSD is sufficient to cause the SSD to write data to all the individual flash devices storing user data on the SSD, where the amount of data written to each individual flash device storing user data on the SSD is sufficient to fill a plurality of flash pages allowing normal flash read operations to data written to the linear LBA range.

In further embodiments, a next step in the creation of a plurality of performance related characteristics builds on understanding of expected read operation times, where small read requests are sent in parallel to incrementally staggered LBA locations within an LBA range written in a prior step, where a longer than expected read request operation time is used to determine a flash device access collision to establish the topology and count of the individual flash devices on the SSD. In still further embodiments, the same technique is used to establish the number of channels on the SSD as well as the organization of data stored in the media on the SSD. In some embodiments, the same techniques are used to establish bus transfer rates across a plurality of buses connecting the flash device on the SSD to the host.

In various embodiments, a next step in the creation of the plurality of performance related characteristics for a SSD involves issuing individual small reads to a plurality of LBA addresses within a previously established linearly written LBA range to determine read operation times, where in read operation times vary depending on the characteristics of the portion of the media being accessed.

In further embodiments, a next step in the creation of a plurality of performance related characteristics builds on understanding of expected read operation times, where small read requests are sent in parallel to incrementally staggered LBA locations within an LBA range written in a prior step, where a longer than expected read request operation time is used to determine a flash device access collision to establish the topology and count of the individual flash devices on the SSD. In still further embodiments, the same technique is used to establish the number of channels on the SSD as well as the organization of data stored in the media on the SSD. In some embodiments, the same techniques are used to establish bus transfer rates across a plurality of buses connecting the flash device on the SSD to the host.

In various embodiments, a next step in the creation of a plurality of performance related characteristics builds on understanding of data from prior steps to establish estimates of internal performance behaviors of the SSD, where I/O request sizes are increased and the resulting change in I/O request time is used to establish internal overheads for various operations inside the SSD, where the resulting information is used to establish scalar values for various I/O request operations.

In some embodiments, the process for the creation of a plurality of performance related characteristics is iterative, where data from a current step is used to refine data from a prior step until a determination is made that the incremental changes to the performance related characteristics meet a statistical confidence criteria.

In various embodiments, the process for the creation of a plurality of performance related characteristics involves issuing a plurality of host TRIM operation requests intermixed with a plurality of other host operation requests, varying size of requests and timing between requests, where the time to complete TRIM operations is measured. In still further embodiments, the process for the creation of a plurality of performance related characteristics involves first issuing a host TRIM request, allowing the host request to complete, followed by issuing a plurality of other host operation requests of varying sizes, where the completion time of the other host operation requests are measured for a period of time until the host operation request completion times match expected completion times, indicating any background impact from the TRIM operation has abated. In some embodiments the process for the creation of a plurality of performance related characteristics involves first issuing a host TRIM request, and while the request is in progress, issue a plurality of other host operation requests of varying sizes, where the completion time of the other host operation requests are measured for a period of time the TRIM request is in progress, assessing the impact of foreground TRIM operations on other host requests. In various embodiments, the process for the creation of a plurality of performance related characteristics performs the same set of steps used to analyze TRIM are also used to analyze host NVMe NameSpace deletion requests.

The SSD drive profile 710 is used to dynamically track individual SSD drive state, which is used in determining an individual SSD's available performance. The SSD drive profile data 712 is used along with application performance data to select appropriate PPVs (including a credit rate regulation scheme) for the SSD. At a base level, without knowing an individual SSD's actual effective OP (which is a main regulator of performance), it can be difficult to determine how much performance the SSD can produce. Further, it can be difficult to determine the drive's actual effective OP, requiring monitoring and statistical analysis to make this determination. For example, even if a drive is TRIMed via the File System and appears completely empty, the TRIMed data may not have been garbage collected, resulting in drive performance ramping up as the TRIMed data is garbage collected. For individual SSDs, the following information is maintained: Handle (MFR, IEEE, SERIAL#), "accuracy", periodically captured SMART+FS data (POH, Bytes Written/Read, free space), Effective OP estimate, Age, Trim/Trim bleed rate, and retry rate variation, Further, block age disparity (Wear Leveling) and RDD may be tracked. However, these impacts can be "observed" in higher WA and elevated read retries.

Even for SSDs that have the same manufacturer, model and firmware revision, performance varies between SSDs due to individual drive state, including, but not limited to effective over provisioning, write amplification, aging, background operations along with variations in media characteristics of the individual drive. Thus another challenge is determining which PPV from a SSD performance profile to select and how to apply any scaling factors included in the performance profile and PPV as selection is based in part on an individual SSD's state. Individual drive state is also changing constantly, presenting another challenge.

In various embodiments, an SSD drive profile 710 is maintained for individual SSDs tracking state and characteristics of individual SSD drives. In some embodiments, the SSD drive profile 710 includes a handle 711 to identify the individual SSD associated with SSD drive profile 710. In still further embodiments, the handle 711 includes information indicating the SSD drive manufacturer, model, and serial number. In some embodiments the SSD drive profile 710 includes a set of indicators that indicate the degree of accuracy of the various individual drive state data stored in the SSD drive profile 710.

In various embodiments, the SSD drive profile 710 includes drive SMART data, where the SMART data is updated on a periodic basis. In some embodiments, the SMART data in the SSD drive profile 710 includes Power On Hours (POH), Data Units Written, Data Units Read, Percentage Used, and Available Spare for an individual SSD. In further embodiments, the SSD drive profile 710 includes file system data about the drive, where the file system data is updated on a periodic basis. In some embodiments, the file system data in the SSD drive profile 710 includes file system free disk space.

In various embodiments, when an individual SSD drive is associated/connected/reconnected with its individual SSD drive profile, SMART data along with file system data is read from the SSD drive and compared to existing SSD drive profile 710 contents to determine if the contents of the SSD drive profile are valid. In some embodiments the validity comparison is performed using a combination of thresholds and scalar coefficients to assign a validity value to the contents of the SSD drive profile 710.

In various embodiments, the SSD drive profile 710 includes a drive aging indicator. In some embodiments, the drive aging indicator reflects the most recent Percentage Used SMART data. In further embodiments, the drive aging indicator is a computed value, where the computed value includes both an age component and an age rate component. Age may be computed from a combination of SMART Percentage Used along with runtime analysis of data units written and current estimated WA, where the data units written multiplied by the estimated WA are used to correlate an estimated raw write rate against reported drive age as well as the rate of aging.

In various embodiments, the SSD drive profile 710 includes an estimate of effective over provisioning, where estimated effective over provisioning is computed by analyzing the difference between expected write performance and actual write performance, based at least in part on expected performance for a current workload used across a plurality of PPVs matching the current workload in the SSD's associated performance profile 701. In still further embodiments, statistical analysis of changes in the current workload is used to interpolate the estimated effective over provisioning over time.

In further embodiments the SSD drive profile 710 includes an estimate of write amplification, where estimated write amplification is computed by analyzing the difference between expected write performance and actual write performance, based at least in part on expected performance for a current workload used across a plurality of PPVs matching the current workload in the SSD's associated performance profile 701. In still further embodiments, statistical analysis of changes in the current workload is used to interpolate the estimated write amplification over time.

In various embodiments, the SSD drive profile 710 includes data tracking large TRIM requests executed against the SSD, where the tracking serves the purpose of monitoring the performance impact of the large TRIM requests over time. In some embodiments, a component of the tracking of large TRIM requests involves performance impact from the time the large TRIM requests from the time when the large TRIM request is sent until the time when the SSD responds with a completion to the large TRIM request. In still further embodiments, the tracking of large TRIM requests involves performance impact from background operations resulting from the large TRIM request that occur over time. In various embodiments, the rate of the background operations associated with large TRIM requests is correlated to the rate of host write data transfer rates.

In various embodiments, the SSD drive profile 710 includes an estimate of SSD media read retry rates, where the estimated SSD media read retry rate is based in part on expected read completion time exceeding thresholds described in the SSD's associated performance profile 701.

A challenge of collecting statistics on live computing platforms is the overhead associated with the collection, reduction, analysis, and storage of the statistics. In various embodiments, to address this challenge, statistics are collected on every Nth request, where dithering is employed to reduce harmonic effects. In still further embodiments, statistics are collected on finite number of consecutive requests, based on a periodic trigger, where the number of consecutive requests and the period trigger are dithered to improve the statistical collection process. Capture "M" requests, then stop capturing. This may reduce CPU overhead and may shrink the size of the counters, which in turn may reduce the overall counter footprint.

Figure 8:
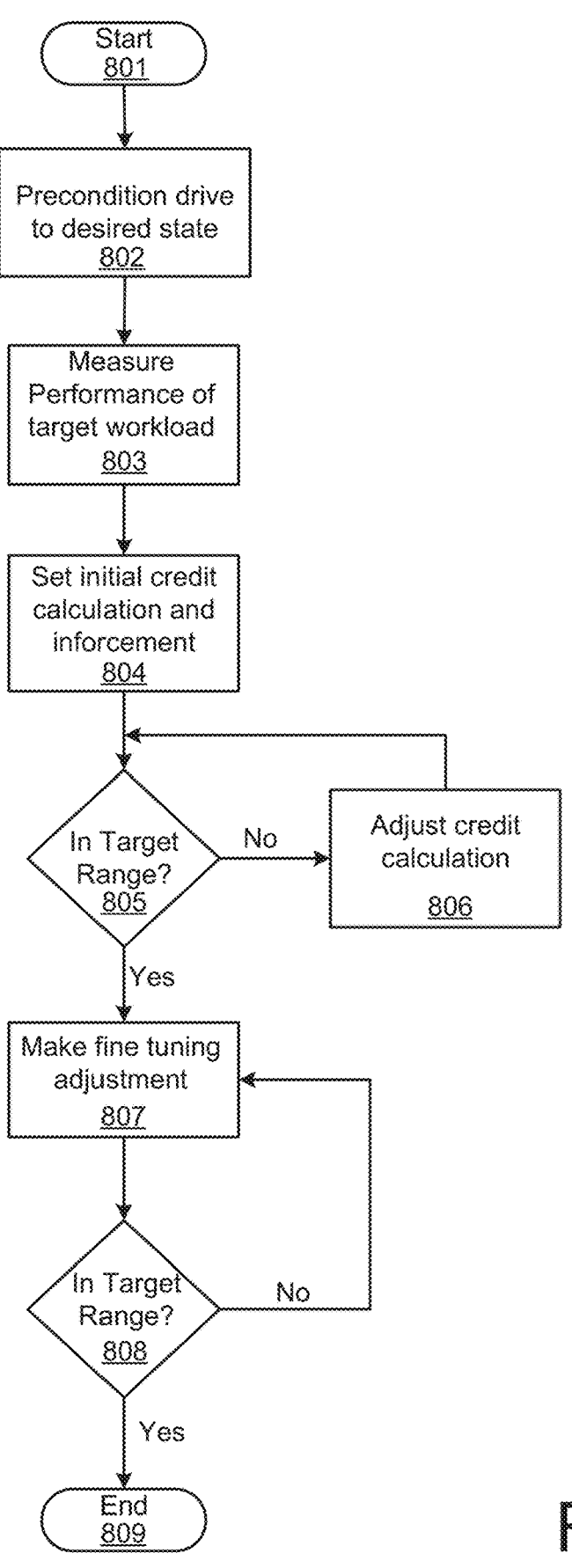
FIG. 8 illustrates an example of computing a credit calculation and enforcement scheme for a target application workload in accordance with at least one embodiment.

FIG. 8 illustrates an example of computing a credit calculation and enforcement scheme for a target application workload in accordance with at least one embodiment. At step 801, the process illustrated in FIG. 8 is initiated. At step 802, an SSD is preconditioned to a desired state. For instance, in order to characterize an SSD to create a PPV, the SSD may need to be put into a known state. To precondition the SSD, the SSD may be secure erased to clear logical to physical mapping tables, in some cases erasing some or all of flash blocks on the SSD. Further, the SSD may be written with a specific data pattern and write address pattern across some or all of the SSD's LBA address space to put the SSD in a known state. This known state may include at least fullness of the drive, data pattern written, and LBA order written.

At step 803, the performance of the SSD for a target workload is measured. For instance, a target workload can be run against the SSD for a period sufficient to produce a PPV with a given set of statistical requirements and associated credit algorithm and coefficients along with inter-vector credit scaling. In various embodiments, the target workload is also run on an SSD performance model, where iterative adjustments are made to a plurality of characteristics, parameters and algorithms until a plurality of sets of parameter ranges, characteristics ranges and algorithms are generated that can produce the same PPV as the actual SSD with a specified level of statistical confidence.

At step 804, an initial credit calculation and enforcement is set. For instance, the SSD performance model may be used with an initial set of coefficients and parameters that are utilized to generate, from the target workload, an initial PPV for the SSD. The initial set of coefficients and parameters may include a non-accumulating credit amount, a credit replenishment window, and credit weighting coefficients based on the I/O type, size, and attributes along with thresholds for the amount of outstanding credit. The coefficients and thresholds may receive initial weights corresponding to how much impact these may have in the credit scheme.

At step 805, the credit scheme is evaluated to determine whether the credit scheme is within a target range subject to a statistical confidence interval, whereby the credit scheme is determined to enforce the target workload and QoS for the PPV. For instance, for a credit scheme, an outstanding credit threshold may be established such that an application does not burst within a replenishment window for non-accumulating credit and, thus, does not disturb the QoS of other applications. If the credit scheme is not within the target range, the credit calculation for the credit scheme is adjusted at step 806. For instance, the scaling coefficients for the credit scheme may be formulated to reign in bad actors. A set of moving averages may be used to keep track of the workload mix. When a deviation in workload is detected using the moving average, the scaling coefficients are applied.

For the process 800, a "well-behaved" workload and a "misbehaved" workload are used. Starting within an initial set of scaling coefficients (e.g., size, type, attributes) along with weights on impact for each scalar, it is determined whether the "misbehaved" workload varies from the target workload. If so, the scalars are iteratively adjusted until the "misbehaved" workload no longer impacts the QoS of the "well-behaved" workload. Thus, the moving averages serve as the main control over the scaling coefficients of the credit scheme.

At step 807, if the credit scheme is within the target range, fine tuning adjustments are made to the SSD performance model using a machine learning-based process using reinforcement learning. The SSD performance model may be tuned using data from a plurality of PPVs. For instance, a subset of parameters extracted during the SSD parameter extraction process may be tuned. The SSD performance model is provided with SSD characteristics (e.g., die, channels, internal overheads, bus speeds, flash read/program/erase times, etc.) from the SSD profile along with drive state (e.g., over-provisioning, write amplification, age, etc.) from the PPV based on an initial parameter extraction process. The SSD performance model may also be provided with constraints for each parameter, from which the SSD performance model may create a {range, selected value, impact weighting} tuple for each parameter that is used in the machine learning process. The selected value may serve as the starting point for a parameter of the SSD performance model.

In an embodiment, the credit regulation and monitoring module is provided with QoS constraints to govern I/O to the SSD performance model (which operates to mimic an NVMe driver connected to an SSD). An impact rating, which is a priority weighting of the impact of a parameter relative to other characteristics it interacts with, may be used. The initial estimate for the impact rating may serve as a guess. There may also be applied constraints on the ranges.

The workload from the PPV may be applied to the SSD performance model. The machine learning process may comprise determining if the SSD performance model meets the QoS constraints (based on a set of characteristics), at step 808. If the SSD performance model does not meet the QoS constraints, the process 800 loops back to step 807, whereby the characteristics are fine tuned to the most restrictive parameter values in weighted order to obtain a set of range constraints that meet the QoS objectives within some constraint. This looping may continue, further narrowing/adjusting the {range, selected value, impact weighting} tuple until there is a working solution across all PPVs. Once a working solution is identified, the process 800 ends at step 809.

FIG. 9 illustrates an example of a modeling framework to validate SSD performance profiles and to generate synthetic SSD performance profiles in accordance with at least one embodiment. Characterizing SSD behavior to produce SSD profile vector data for a plurality of workloads can be challenging, as this may require significant amounts of time and resources to accomplish. Consider that in order to characterize an SSD drive to create a performance profile vector, the SSD first must be placed into a known state. The standard way to accomplish this is known as "preconditioning." The SSD is first secure erased to clear logical to physical mapping tables, in some cases erasing some or all of flash blocks on the SSD, then written with a specific data pattern and write address pattern across some or all of the SSD's LBA address space to put the SSD in a known state, where a known state includes at least fullness of the drive, data pattern written, and LBA order written, at which point a target workload can then run against the SSD for a period sufficient to produce a profile vector with a given set of statistical requirements and associated credit algorithm and coefficients along with inter-vector credit scaling.

In various embodiments, a SSD performance model is used to accelerate the creation of SSD performance profile vectors. The SSD performance model, in some instances, may include a driver model 906 and an SSD model 908. In some embodiments, the SSD model 908 incorporates characteristics of the SSD that may be used to produce an accurate performance model of the SSD. In various embodiments, characteristics used in the SSD model 908 include flash die count, flash channel count, flash channel transfer rate, flash channel protocol, flash die block count, flash block page count, flash die plane count, flash die programing paradigm, flash die program operation times for various programming modes, flash die raw programming units for various flash programming modes, flash die ECC rates, flash die erase time, flash die program suspend support, flash die erase suspend support, flash die page read time, flash raw page size, user data bytes per flash page, SSD formatted LBA size, host interface transfer rate, host CPU baseline speed, host I/O request overhead, SSD write request overhead, SSD read request overhead, SSD ECC related read retry overhead, SSD garbage collection overhead and SSD internal buffer architecture. In some embodiments, the SSD model 908 can be set to a specific preconditioning state, allowing the preconditioning processor required for an actual SSD to be skipped.

The driver model 906 may be a stripped down and modified version of a NVMe driver. For instance, enumeration may be modified, whereby the model is called and a request is made to determine how many SSDs there are and allocates resources (including how many I/O submission and completion queues each modeled drive supports). I/O submission and completion queue allocation may also be modified such that instead of indicating to the NVMe hardware the location, it indicates the SSD model 908. I/O submission queue tail pointer updates are modified such that instead of poking a hardware tail pointer, it calls a command submission function, as described in greater herein in connection with FIG. 20. Further, the I/O completion queue tail pointer update interrupt handler is made public (non-static) so the SSD model 908 can call it when it updates the tail pointer.

The SSD model 908 includes an interface to the daemon 902 that provides it with SSD characteristics, characteristic updates during the learning process, and other information about the number of SSDs and the SSD drive state. The SSD model 908 may be a time based, event driven model of the SSD. The SSD model 908 is described in greater detail herein in connection with FIGS. 19-27.

In various embodiments, a portion of the characteristics are determined from publicly available information about the SSD. In still further embodiments, another portion of the characteristics are determined by sending a plurality of I/O request patterns to the SSD, where statistics are collected and used to extract SSD characteristics.

In various embodiments, the SSD performance model goes through a training and calibration process to adjust SSD characteristic values, internal characteristics and internal algorithms to match SSD performance. The SSD performance model may be trained using supervised training techniques. For instance, a dataset of input workload and corresponding PPVs and/or sets of parameter ranges, characteristics ranges and algorithms can be selected for training of the SSD performance model. In some examples, the input workload can be obtained from administrators, users, and other sources of sample workload data. The SSD performance model 908 may be evaluated to determine, based on the input sample workloads supplied to the SSD performance model, whether the SSD performance model is providing accurate PPVs and/or sets of parameter ranges, characteristics ranges and algorithms. Based on this evaluation, the SSD performance model may be modified (e.g., one or more parameters or variables may be updated) to increase the likelihood of the SSD performance model generating the desired results.

In some embodiments, a workload is run against an SSD where statistics are collected on I/O requests and a PPV created. In various embodiments, the same workload is run on the SSD performance model, where iterative adjustments are made to a plurality of characteristics, parameters and algorithms until a plurality of sets of parameter ranges, characteristics ranges and algorithms are generated that can produce the same PPV as the actual SSD with a specified level of statistical confidence. In some embodiments, the process is repeated for a plurality of workloads iteratively using the constrained ranges from previous workloads until a subset of ranges and algorithms are found that can meet produce PPVs matching SSD PPVs with a specified level of statistical confidence. In an embodiment, the application workload generator 912 can generate synthetic workloads and/or generate workloads based on application profiles 913.1-913.N. The application workload generator 912 may provide these workloads to the SSD performance model to perform the aforementioned iterative adjustments. I/O information associated with the set of workloads is obtained from the I/O submission queues of the I/O submission and completion queues 907.1-907.N.

In an embodiment, the SSD performance model uses a model interface 905 with the daemon 902 to load parameters that may be used by the SSD performance model and to extract parameters that have been updated using machine learning. As noted above, the credit regulation and monitoring module 910 may interact with a daemon 902 in the user-space via a control interface 909 and a statistics and events interface 917. The daemon 902 may be a service process that supervises the system and/or provides functionality to other processes. The daemon 902 may maintain a library and may keep track of the various SSD profiles 903 and application profiles 913.1-913.N within a profile database implemented in the user-space. For instance, via a management application 901, the daemon 902 may load and unload the various profiles 903 and 913.1-913.N from the profile database.

In some embodiments, the SSD performance model uses data from a real-time system, either online or offline, as input to identify the behavior of both an SSD and any underlying applications. The real-time network traffic may be replayed through the SSD performance model, which may result in the SSD performance model providing predictive data to the credit engine. The feedback from the SSD performance model, in embodiment, can be used to assist with real-time credit regulation and monitoring. For instance, the SSD performance model may use, as input, a number of SSD profile characteristics corresponding to alignment costs, request size scaling, and the like. These SSD profile characteristics can be adjusted by inputting actual workload performance results against the SSD performance model to determine how accurately the model performs. In various embodiments, the SSD performance model can be initiated with initial estimations for these values and iteratively adjust them across a plurality of workloads.

In various embodiments, the PPVs produced by the model include an indicator that the PPV was generated by the model 908. In still further embodiments, the model generated indicator is used determine that analytics should be enabled to verify the accuracy of the PPV when it is in use. In some embodiments the PPV model generated indicator is cleared when a determination is made that the model generated PPV meets the required performance criteria of PPV.

In some embodiments, the model is implemented as a driver/block layer model module 904 to act like a component of the storage stack 914, where the I/O Request Rate Regulation framework can monitor and perform rate regulation to I/O requests directed to the model module 904. In some embodiments, the model module 904 is part of the storage stack 914. As noted above, the credit regulation and monitoring module 910 may interact with the block layer 916 of the storage stack 914 within the kernel-space to obtain I/O information associated with particular I/O patterns. The model module 904 may provide, over a storage stack interface 911 can provide I/O information that may be used as part of the I/O Request Rate Regulation. The storage stack 914 may further include a file system layer 915. The file system layer 915 provides an abstraction to organize information into separate files, each of which may be identified using a unique name. Each file system type may define its own structures and logic rules used to manage these groups of information and their names. The file system layer 915 may be used to control how data is stored and retrieved.

In still further embodiments, the model module 904 is a stack separate from the storage stack 914, but still monitored and I/O request rate regulated by the I/O Rate Regulation framework. In various embodiments, the module 904 is run concurrently with the actual storage stack 914. In various embodiments a workload can be run against both the model module 904 and the SSD on the same host platform and in the same execution environment, where the same PPV generation process can be used. This may allow the model to perform efficiently and to calibrate itself against real world conditions and I/O requests. For instance, the aforementioned embodiments may allow the SSD performance model to generate PPVs at a faster rate while avoiding pre-conditioning steps.

Another challenge in generating PPVs from SSDs is accounting for performance variations caused by SSD aging effects such as flash wear that increases RBER, where flash wear causes ECC requirements to change and blocks to be retired, reducing effective OP. Increased RBER can also force ECC tradeoffs, changing error recovery policies which impact request latency distributions. Furthermore, performance testing of aged drives has additional challenges. A first challenge is the time it takes to accurately age the SSD. A second challenge is running performance analysis on the SSD causes aging, so a limited number of performance tests can be run on the SSD, where those performance tests, associated PPVs and extracted characteristics apply to an age range. To address these challenges, in various embodiments, the SSD is aged to a target age where performance characteristics are extracted and a plurality of PPVs generated. In further embodiments, the extracted performance characteristics and plurality of PPVs are used to calibrate the model and generate a plurality of PPVs.

Figure 10:
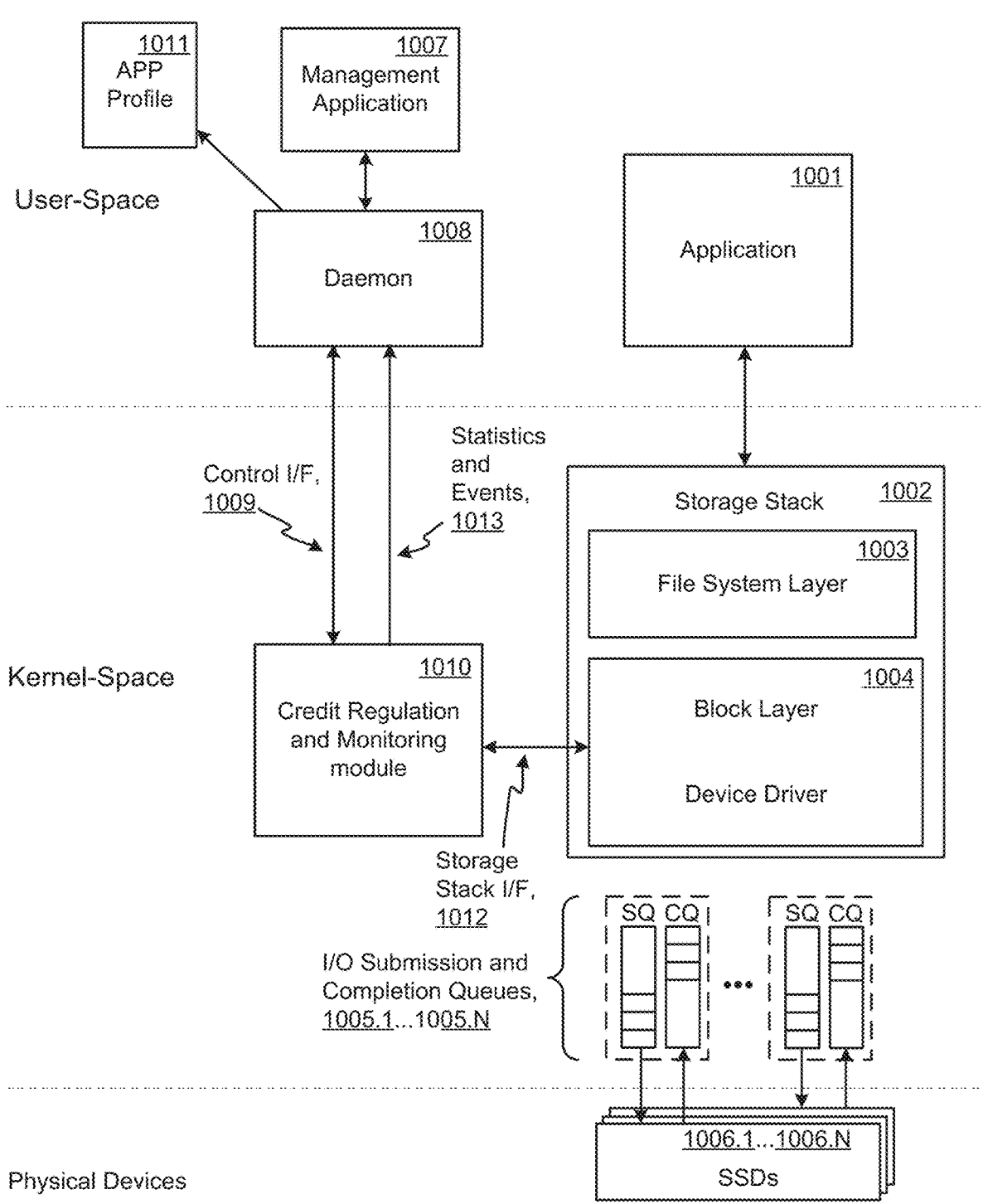
FIG. 10 illustrates an example of an apparatus for producing application performance profiles in accordance with at least one embodiment.

FIG. 10 illustrates an example of an apparatus for producing application performance profiles in accordance with at least one embodiment. A challenge in the regulation of I/O rates for applications to achieve a desired QoS is having a detailed understanding of individual application storage performance requirements and storage usage. In various embodiments, an application profile 1011 is created for an individual application (application, virtual machine, container, etc.) that details the characteristics of the application's storage performance requirements and storage usage, where those characteristics can be used in conjunction with information about SSD performance to make a determination of application placement and rate regulation scheme assignment to achieve a desired performance.

The creation of application profiles may be similar to that of the aforementioned SSD profiles in terms of gathering statistics. However, these statistics are utilized to generate an application's profile 1011. Further, an application profile 1011 may be created against a group of SSDs 1006.1-1006.N that have a target performance profile. The application profile 1011 may also be used to shape traffic to achieve better application performance. For instance, if an application 1001 has a high burst I/O operation, the application profile 1011 may control the application 1001 to maintain its stability.

In various embodiments creation of a plurality of application region descriptions and a plurality of application thread descriptions for an application profile 1011 utilizes an instrumented storage I/O stack capable of measuring individual I/O times and individual I/O access locations as well as tracking individual I/O attributes and initiating application thread.

In some embodiments, creation of the application profile 1011 is performed using a plurality of SSD devices 1006.1-1006.N capable of supplying a target level of SSD performance. In further embodiments, the target level of SSD performance is achieved by placing the plurality of SSDs 1006.1-1006.N in a plurality known states of over provisioning. In still further embodiments, the target level of SSD performance is achieved by adding workloads necessary to achieve target plurality performance levels for the plurality of SSDs 1006.1-1006.N, where aspects of the added workloads such as I/O distribution and write amplification are tightly controlled.

In various embodiments, the creation of the plurality application region descriptions and the plurality of application thread descriptions for an application profile 1011 post processes data collected from an instrumented storage stack 1002, where data collected for individual threads is broken into a plurality thread profiles for the thread along with a plurality of thread transition descriptions and links to the transitioning thread description. In various embodiments, the application profile creation process is iterative, where the performance for the plurality of SSDs 1006.1-1006.N along with the constraints included in the application profile 1011 are adjusted until a desired application performance level is achieved.

In various embodiments, application profiling continues on production computing platforms, after the application profile 1011 has been created, where profiling data is collected at a selectable rate and sent to background and offline tasks for analysis. In some embodiments, the application profiling data collected is used to refine application profile characteristics. In further embodiments, the application profiling data collected is used to detect anomalous application 1001 behavior by checking the collected application profiling data against the data in the existing application profile 1011, where when the application 1001 deviates from a plurality of constraints, a notification is generated to alert management software of the anomaly.

One challenge of collecting statistics on live computing platforms is the overhead associated with the collection, reduction, analysis, and storage of the statistics. In various embodiments statistics are collected on average every Nth request, where dithering is employed to avoid harmonic effects in the statistical collection process. In still further embodiments, statistics are collected on finite number of consecutive requests, based on a periodic trigger, where the number of consecutive requests and the period trigger are dithered to improve the statistical collection process.

Figure 11:
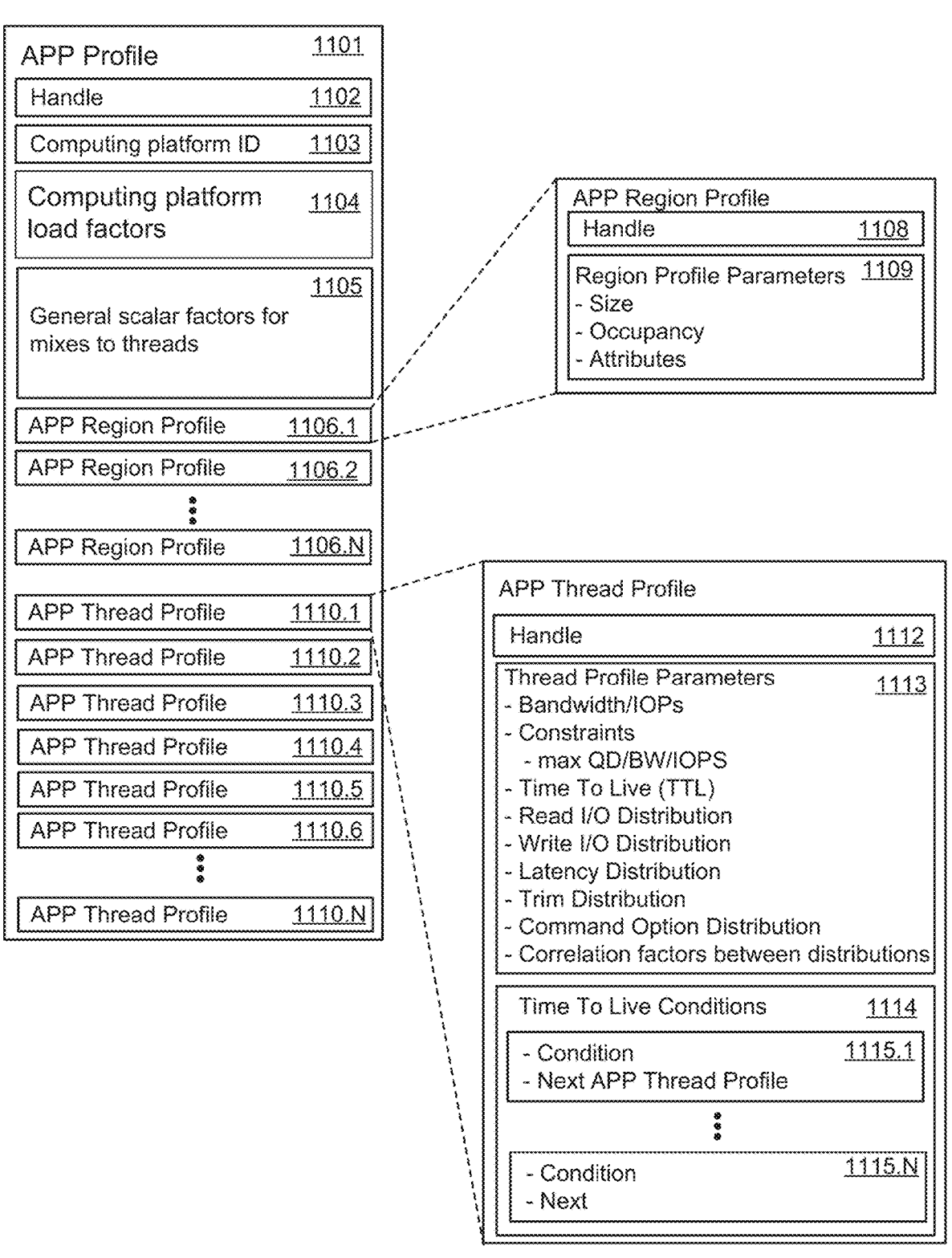
FIG. 11 illustrates an example of an application performance profile in accordance with at least one embodiment.

FIG. 11 illustrates an example of an application performance profile in accordance with at least one embodiment. In some embodiments, the application profile 1101 includes information used to uniquely identify an application, where examples of unique application identifiers include application name, application executable file characteristics, and application service name. In further embodiments the unique identifier for an application includes a uniquely generated value. The application profile 1101 may include a handle 1102, a computing platform identifier 1103, and computing platform load factors 1104. The computing platform identifier 1103 may be similar to the computing platform identifier 703 described above in connection with FIG. 7. The computing platform load factors 1104 may be used by the orchestration layer in the decisioning process described herein.

In various embodiments, the application profile 1101 includes a section that includes a set of application storage region profiles 1106.1-1106.N describing a plurality of storage regions used by the application, where each storage region profile includes a handle 1108 and a set of region profile characteristics 1109. These characteristics 1109 may include a unique region descriptor and a set of characteristics, including by not limited to, region size, region fullness, and region attributes, where region attributes include, but are not limited to access patterns, I/O request type and size distributions.

In some embodiments, the application profile 1011 includes a section that includes a set of application thread profiles 1110.1-1110.N describing a plurality of threads belonging to the application. A thread workload to a particular region of storage can go through transitions that change its QoS requirements. For instance, a thread may have a startup phase followed by a normal operation phase. As another example, a database thread may have a transition during a checkpoint. The daemon may monitor statistics and use time-to-live (TTL) data to determine when/if a thread profile should be changed. In some examples, the TTL transition conditions used are amount of data read/written and change in the thread's read/write mix.

An application thread profile may include a handle 1112 and a set of thread profile characteristics 1113. These characteristics 1113 may correspond to a set of attributes for the thread, including, but not limited to bandwidth, IOPS, workload I/O request mix, type, attribute and size distributions, constraints to limit maximum bandwidth, IOPS, and I/O request queue depth, and latency distributions across I/O request type, size, and attributes. In further embodiments, the attributes for the thread include references to the section of the application profile 1101 describing storage regions, where the references indicate which storage regions the thread accesses. In some embodiments, a plurality of threads use the same thread description, where the count of threads scales depending on application performance requirements.

In various embodiments, each particular request type along with the request size and attributes has a different latency profile stored in the application profile 1101. For example, an application may only allow a specified number of log writes outstanding, requiring the application to wait until the number of log writes drops below an outstanding log write threshold. Depending on the rate of log writes and the desire for the application to not block log writes, the average latency per log write and associated log write latency deviation may be required to fall within a specific latency profile, where that latency profile is captured in the application profile 1101. A distribution may be captured in the application profile 1101 to serve this purpose. In various embodiments, latency requirements for various operation types are different. In some embodiments, read requests and write requests for an application have different latency requirements. In still further embodiments, the size of a request is also used in the determination of a latency requirement.

In various embodiments, the application profile 1101 includes a write amplification scaling factor 1105, where the write amplification scaling factor 1105 is derived from the difference in the write amplification generated by a thread compared to the write amplification of a specific random write mix workload. For instance, different application write patterns may generate different amounts of write amplification. The relative WA generated by the threads of an application against the various storage regions used by the application may be determined by comparing the WA generated by the application threads against the WA generated by a random workload. This value can be turned into a WA scaling factor used in the credit generation scheme.

Another challenge in creating a credit based I/O rate regulation scheme across a plurality of applications accessing SSD storage is supporting a plurality of applications where some applications have specific QoS requirements defined in an application profile, while other applications have QoS requirements expressed as a fractional portion of the SSD storage performance.

It should be noted that in some instances, particular applications may not have a unique application profile. These applications, instead, may be rate-regulated (or unregulated) by associating these applications with an application type. The application type may indicate if the application should be rate-regulated with an associated application profile, executed without rate regulation, or executed with rate-regulation using a default rate regulation scheme along with one or more fractional portions of the credit available from a plurality of associated SSDs.

In various embodiments applications are assigned an application type, where the application type along with application type modifiers determine how to apply a credit rate regulation scheme to the application. In some embodiments, an application is assigned an application type indicating the application has an application profile defining the application's QoS requirements. In further embodiments, an application is assigned an application type indicating the application can execute without a credit rate regulation scheme, allowing the application to run an unconstrained I/O workload against the SSD. In still further embodiments, an application is assigned an application type indicating the application receives a fractional portion of the credits associated with a SSD profile selected for a SSD, where that fractional portion may have an additional modifier to limit the application to a particular performance. In still further embodiments, an application is assigned an application type indicating the application receives a fractional portion of credits, where requests from the application are preemptively dropped, returning and error to the application, when the application exceeds its fractional portion of credits, where the application's requests become preemptively lossy as its fractional credit is exceeded.

Figure 12:
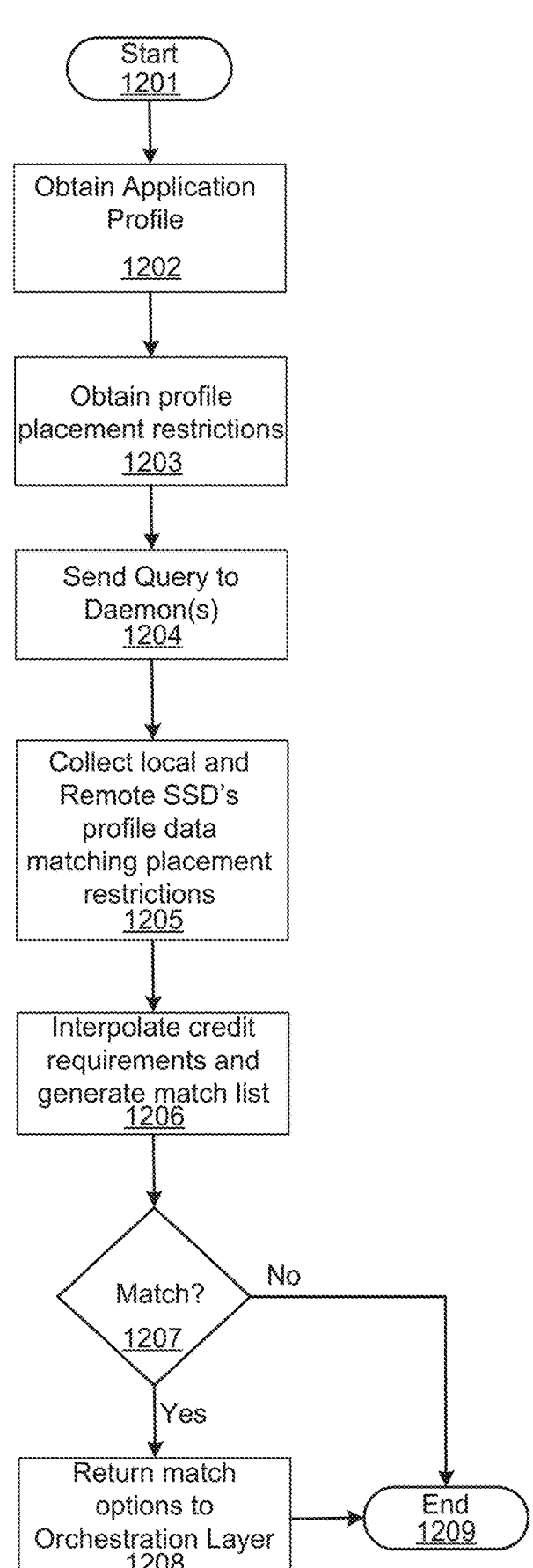
FIG. 12 illustrates an example of a decision process for application storage placement in accordance with at least one embodiment.

FIG. 12 illustrates an example of a decision process for application storage placement in accordance with at least one embodiment. A challenge in determining where to allocate SSD storage for an application across a plurality of computing platforms attached to a plurality of SSD storage devices is determining what plurality of SSDs with a plurality of existing application workloads can meet both the space and performance/QoS requirements of the application. It is understood that the application also has other requirements that must be met as well, including, but not limited to, network performance, CPU performance and memory space and performance.

At step 1201, the application placement decision process may be initiated. As noted above, a challenge in implementing a credit based I/O rate regulation scheme across a plurality of application executing on a plurality of computing platforms with a plurality of storage devices is dynamically balancing application placement to optimize storage utilization. A number of factors can cause the underlying performance of an SSD to change. A particular application's write pattern may produce a pattern that has higher or lower write amplification than expected or a prior TRIM operation will have created more free space, increasing SSD write performance. In addition, reduction of SSD fragmentation between applications can increase performance predictability. These factors may trigger the initiation of the application placement decision process.

At step 1202, an application profile for the subject application is obtained. As noted above, an application profile is created for an individual application (application, virtual machine, container, etc.) that details the characteristics of the application's storage performance requirements and storage usage, where those characteristics can be used in conjunction with information about SSD performance to make a determination of application placement and rate regulation scheme assignment to achieve a desired performance. The creation of application profiles may be similar to that of the aforementioned SSD profiles in terms of gathering statistics. However, these statistics are utilized to generate an application's profile. Further, an application profile may be created against a group of SSDs that have a target performance profile. An application profile may also be used to shape traffic to achieve better application performance. In various embodiments, an application profile created for an application can be used to determine the application's space and performance requirements across a plurality of threads, where the available space and performance of a plurality of SSDs supporting a plurality of existing applications and their associated requirements is analyzed to determine which plurality of SSDs can support the application's requirements.

At step 1203, a set of profile placement restrictions may be obtained. As noted above, the application profile may specify various requirements related to the performance and storage of the application. In addition to these requirements, the application profile may define one or more placement restrictions, whereby certain storage configurations may not be used for the implementation of the application. For example, the application profile may specify that SSDs having particular or specific storage characteristics may not be used for storage and use of the application. As another example, the application profile may indicate or restrict which storage devices may be accessed to determine what storage is available. As yet another example, a set of placement restrictions may define a threshold amount of wear or age that may be used to determine which SSDs may be utilized. This may allow the orchestration layer to perform wear leveling across a plurality of SSDs to that these SSDs age at similar rates. In some embodiments, the available performance of an SSD is determined by the SSD's SSD performance profile, the SSD's individual drive profile, the current application workload on the SSD, and the current selected SSD performance profile vector or a plurality of alternative candidate performance profile vectors, where a candidate performance profile vector meets performance requirements of the current application workload along with a new additional application workload or portion of a new additional application workload, where available performance includes factors defined in a performance profile vector.

In various embodiments, an application storage allocation policy may be reviewed to obtain any profile placement restrictions. The application storage allocation policy may take into account the fullness information in the application profile region descriptor to enact thin provisioning on an SSD, where the level of thin provisioning is determined based on the resulting performance of the SSD at an expected level of over provisioning determined by the fullness information from the plurality of application regions occupying the SSD. In some embodiments, application storage allocation policy takes into account that an SSD has built-in thin provisioning, where the fullness information in the application profile region descriptor is used in part in the determination of allocation policy At step 1204, a query may be sent to the daemon to collect, at step 1205, local and remote SSD profile data matching placement restrictions. The daemon may maintain a library and may keep track of the various SSD profiles and application profiles within a profile database implemented in the user-space. For instance, via a management application, the daemon may load and unload the various profiles from the profile database. Thus, the daemon may provide, from relevant SSD profiles, SSD profile data from which the data matching the placement restrictions may be identified. In various embodiments, the available performance of a plurality of SSDs along with the performance requirements described in an application's application performance profile are used to make a determination where to allocate space across the plurality of SSDs for an application, where the allocated space meets the performance requirements of the application along with the performance requirements of existing applications. In further embodiments, the available performance of a plurality of SSDs along with the performance requirements described in an application's application performance profile are presented through an API to software layer, where the software layer makes storage allocation decisions for the application and reports those decisions back through an API. In some embodiments, the availability of unused SSD I/O queue pairs is factored into making a determination where to allocate space for an application across the plurality SSDs.

At step 1206, the credit requirements for the application are interpolated and a match list is generated highlighting SSDs that may be used for the application. The interpolation of these credit requirements may be performed according to the process described above in connection with FIG. 8. At step 1207, it is determined whether there are any matching SSDs that may be used for the application. If no matching SSDs are identified, the process ends at step 1209. However, if one or more matching SSDs are identified, at step 1208, a set of match options may be returned to the orchestration layer, which may facilitate selection of a particular match for implementation of the application.

In various embodiments, if a set of match options is returned, an application is assigned a set of space and performance objectives, where at least one of the performance objectives represents a fixed or fractional percentage of a portion of an SSD's performance based on a selected performance profile vector (PPV) from the SSD's performance profile, where the selected PPV supports a particular performance based on the SSD's current drive state and a target workload mix and latency. In some embodiments, the selection of a PPV is based on supporting a plurality of applications with specific performance requirements defined in their application profiles, where the remaining performance and space is allocated to a plurality of applications in fixed or fractional portions of the remaining performance. For example, one application may consume 40% of an SSD's performance based on the application's performance profile requirements and a selected profile, while the remaining 60% of the performance is split up fractionally between three other applications. In further embodiments, the fixed or fractional percentage allocated to an application is subject to thresholds. For example, an application may be allowed a fractional percentage of SSD performance up to a percentage limit.

In some embodiments, the performance requirements of an application are to simply provide that application a fractional amount of a portion of the performance available from and SSD, where performance allocation is determined by a credit based rate regulation scheme derived from a SSD's SSD performance profile. These applications are referred to as "Best Effort" applications where they request best effort performance from the underlying storage based on a fractional performance allocation scheme.

In various embodiments, when space is allocated on an SSD to an application based on a determined apportionment of an SSD's performance, a credit based rate regulation scheme is established for the application's threads that access the allocated space, where the credit based rate regulation scheme is computed from a selected performance profile vector from the SSD's performance profile and a performance allocation and latency constraints assigned to the application thread. In some embodiments, the credit based rate regulation scheme is enforced in the I/O stack used by an application thread.

In various embodiments, an application thread's credit-based rate regulation scheme is comprised of the aforementioned elements, where the computation of non-accumulating credit value, credit replenishment scheme and interval, formula coefficients, formula scaling factors and formula constraints involves profile vector and thread performance allocation & latency requirements. In still further embodiments, creation of the various factors of the credit based rate regulation scheme for an application thread involves interpolation of plurality of scaling factors to adjust for disparities between the application thread's workload and the workload associated with the currently selected performance profile vector from the SSD's performance profile.

Figure 13:
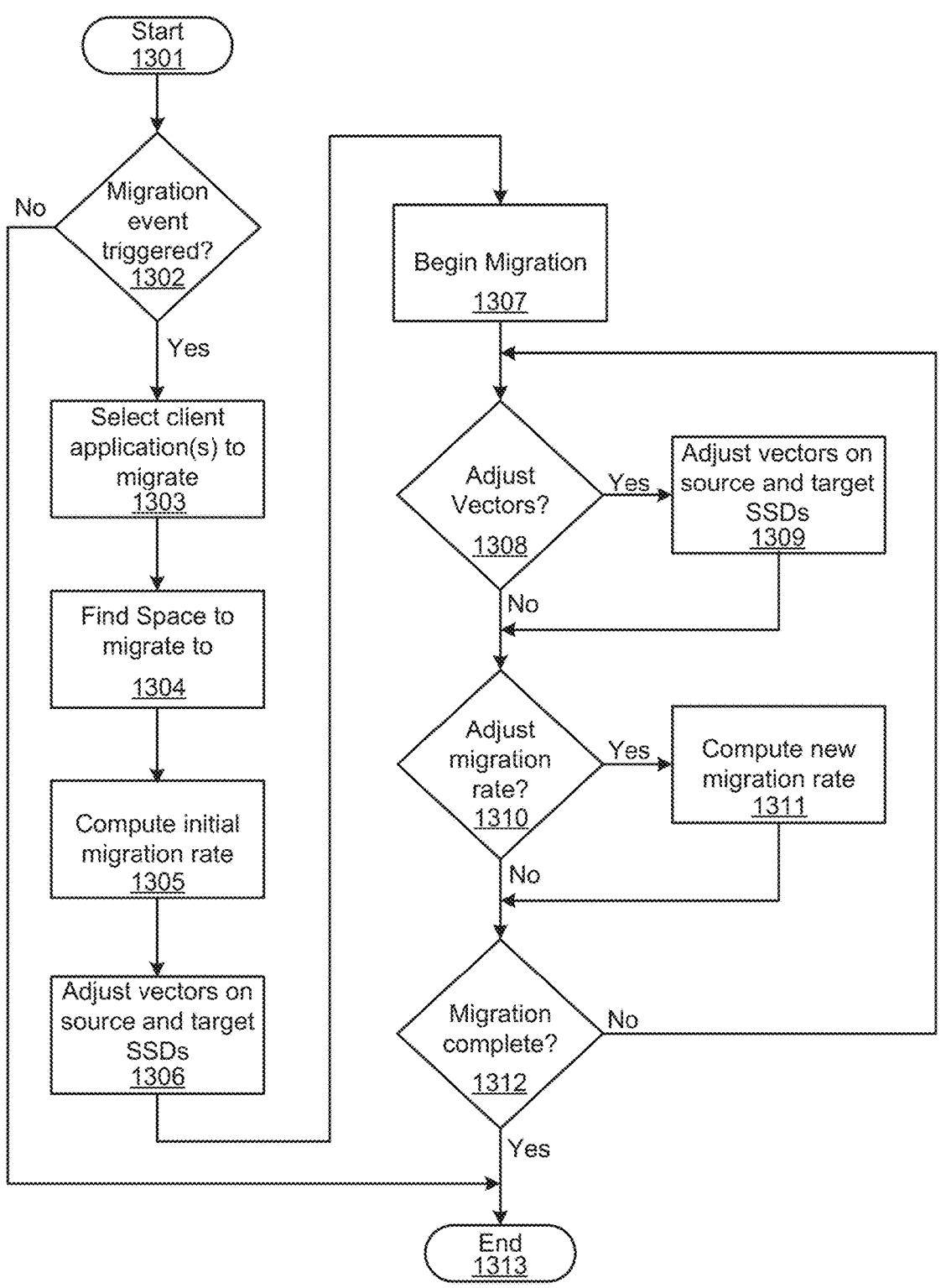
FIG. 13 illustrates an example of an application storage migration in accordance with at least one embodiment.

FIG. 13 illustrates an example of an application storage migration in accordance with at least one embodiment. A challenge in implementing a credit based I/O rate regulation scheme across a plurality of applications executing on a plurality of computing platforms with a plurality of storage devices is dynamically balancing application placement to optimize storage utilization. A number of factors can cause the underlying performance of an SSD to change. A particular application's write pattern may produce a pattern that has higher or lower write amplification than expected or a prior TRIM operation will have created more free space, increasing SSD write performance. In addition, reduction of SSD fragmentation between applications can increase performance predictability.

Another challenge is in determining where to allocate SSD storage for an application across a plurality of computing platforms attached to a plurality of SSD storage devices. For instance, determining what plurality of SSDs with a plurality of existing application workloads can meet both the space and performance/QoS requirements of the application can be difficult. In various embodiments, an application profile created for an application is used to determine the application's space and performance requirements across a plurality of threads, where the available space and performance of a plurality of SSDs supporting a plurality of existing applications and their associated requirements is analyzed to determine which plurality of SSDs can support the application's requirements.

In some instances, a migration event may be large and consume a significant amount of time. As a result, SSD profiles may need to be adjusted over time. As an illustrative example, if an application initially consumes 100 Mbps of 80/20 on a source server, resulting in the application consuming the same bandwidth on the target server, during the migration process at the midway point, the load would be approximately 50 Mbps of 80/20 if read/write migration is equal. This could be more imbalanced depending on the traffic pattern. If this process is started with 100 Mbps allocated at both ends, certain elements may be simplified but there is still room for optimization.

At step 1301, the application storage migration process is initiated. An application storage migration may be triggered by an application or an SSD. In various embodiments, a monitoring component tracks actual performance statistics versus expected performance statistics included in an SSD's active profile, where changing performance conditions trigger the migration of the storage of a plurality of storage regions on the SSD for a plurality of applications to a plurality of new storage regions on a plurality of different SSDs. In further embodiments, a monitoring component tracks SSD fragmentation, where changing fragmentation across the pool of managed SSD storage triggers the migration of the storage of a plurality of storage regions on the SSD for a plurality of applications to a plurality of new storage regions on a plurality of different SSDs.

In some embodiments, the available performance of an SSD is determined by the SSD's SSD performance profile, the SSD's individual drive profile, the current application workload on the SSD, and the current selected SSD performance profile vector or a plurality of alternative candidate performance profile vectors, where a candidate performance profile vector meets performance requirements of the current application workload along with a new additional application workload or portion of a new additional application workload, where available performance includes factors defined in a performance profile vector.

In various embodiments, the process of migrating an application's storage from one storage device to another storage device is delegated to software optimized in performing the migration process, where the migration I/O request rates are managed by the credit based I/O rate regulation scheme to ensure performance objectives are maintained for the plurality of applications accessing both the source and destination storage devices associated with the migration.

At step 1302, the monitoring component determines whether a migration event has been triggered. For instance, the monitoring component may evaluate the actual performance statistics versus the expected performance statistics included in the SSD's active profile to determine whether there have been changes to the performance conditions of the SSD that would necessitate an application storage migration. If the monitoring component determines that a migration event has not been triggered, the process may end at step 1313.

If the monitoring component determines that a migration event has been triggered, the monitoring component may select one or more client applications that are to be migrated at step 1303. For instance, the monitoring component may evaluate the performance characteristics of the one or more client applications on the source SSD and determine, based on these performance characteristics, which applications may need to be migrated in order to provide the necessary resources for these applications.

At step 1304, the monitoring component finds space to migrate the selected one or more client applications to and, at step 1305, compute the initial migration rate for these applications. For instance, the monitoring component may evaluate the various SSD profiles for available SSDs to identify one or more SSDs that may serve as the target(s) for the selected one or more client applications for migration. In various embodiments, the available performance of a plurality of SSDs along with the performance requirements described in an application's application performance profile are used to make a determination where to allocate space across the plurality of SSDs for an application, where the allocated space meets the performance requirements of the application along with the performance requirements of existing applications. In further embodiments, the available performance of a plurality of SSDs along with the performance requirements described in an application's application performance profile are presented through an API to software layer, where the software layer makes storage allocation decisions for the application and reports those decisions back through an API. In some embodiments, the availability of unused SSD I/O queue pairs is factored into making a determination where to allocate space for an application across the plurality SSDs. Once one or more SSDs have been identified, the monitoring component may calculate the migration rate for these applications. For instance, as data is migrated, I/O requests to the migrated data are re-directed to the new storage location, which represents a shifting of the application's normal workload from the source to the destination storage location. This calculation may be used, at step 1306, to adjust the PPVs of the source SSD and of the one or more target SSDs that are to receive the one or more client applications.

Once the monitoring component has identified the target SSDs for the one or more client applications from the source SSD, the monitoring component, at step 1307, may begin migration of the one or more client applications. At step 1308, the monitoring component may determine whether to adjust the PPVs for the source and target SSDs based on an analysis of the migration process. For instance, as the migration of the applications is occurring, the monitoring component may determine whether further adjustments to the PPVs are required based on the actual performance of the one or more client applications and of the source and target SSDs. If adjustments are required, the monitoring component, at step 1309, may adjust the PPVs for the source and target SSDs accordingly.

At step 1310, the monitoring component may further determine whether to adjust the migration rate for the one or more client applications. For instance, if the monitoring component determines that an adjustment to the migration rate is required in order to not negatively impact performance of the source and target SSDs, the monitoring component, at step 1311, may compute a new migration rate that provides improved performance of the source and target SSDs while ensuring that the one or more client applications are not negatively impacted by the migration process. As another example, a new migration rate may be determined based on the distribution of the normal workload between the source and destination storage locations, which may determine how much migration can consume based on how much reading from the source and writing at the destination storage location consumes in terms of QoS.

At step 1312, the monitoring component may determine whether the migration of the one or more client applications has been completed. If so, the migration process may end at step 1313. In some instances, the monitoring component may re-evaluate the PPVs of the source and target SSDs to ensure that these account for the migration of the one or more client applications and are, thus, accurate. The monitoring component may make any necessary adjustments based on the final performance of the one or more client applications in the target SSD(s) and on the performance of the source SSD without the one or more client applications. If the migration process has not been completed, the monitoring component may continue to monitor the migration process and make any adjustments to the PPVs of the source and target SSDs and o the migration rate for the one or more client applications as needed.

Figure 14:
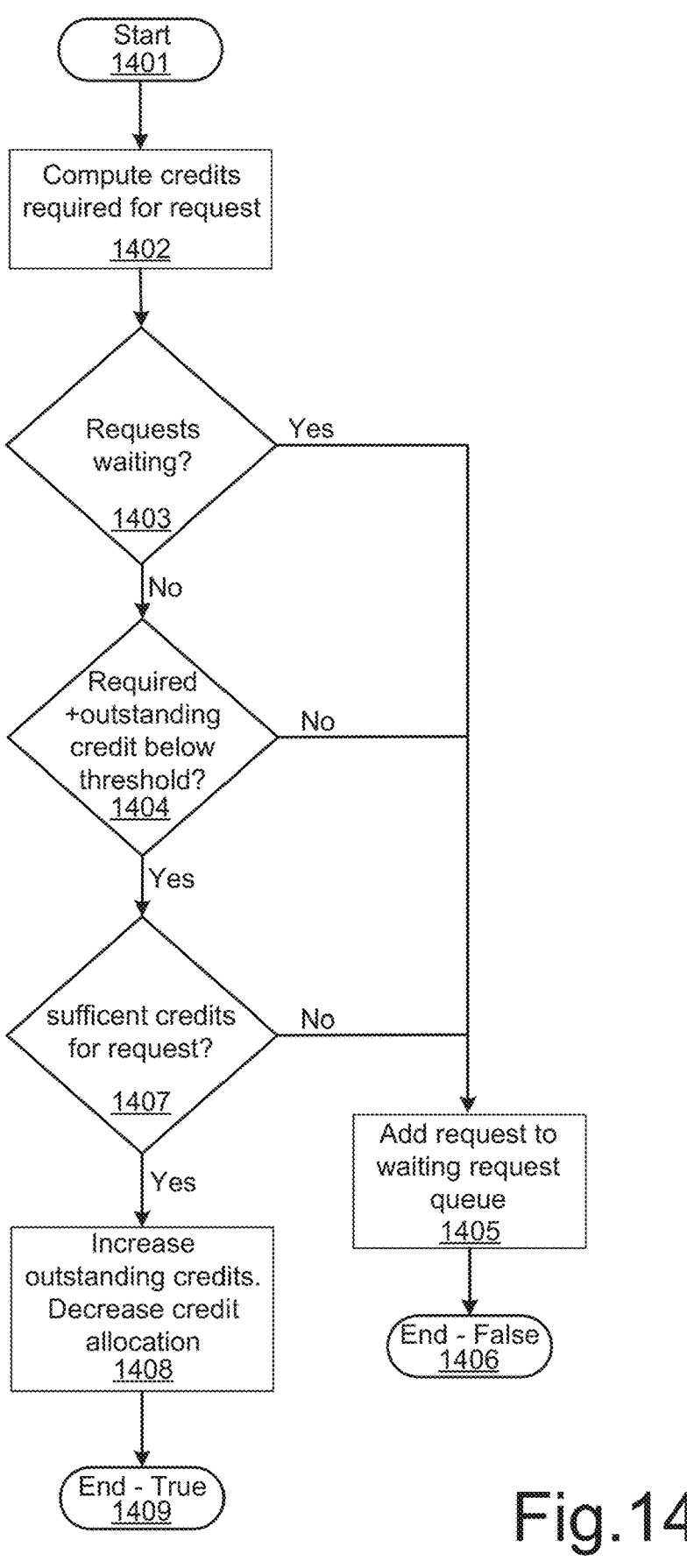
FIG. 14 illustrates an example of I/O submission decision handling for credit based I/O in accordance with at least one embodiment.

FIG. 14 illustrates an example of I/O submission decision handling for credit based I/O in accordance with at least one embodiment. At step 1401, the process for determining how to handle an I/O submission request may be initiated. For instance, this process may be initiated in response to an I/O request. At step 1402, the credits required for the I/O request may be computed. For instance, in response to an I/O request, the credit regulation and monitoring sub-system calculates the amount of credit required for execution of the command.

At step 1403, the credit regulation and monitoring sub-system may determine whether there are any other I/O requests waiting to be performed. The credit regulation and monitoring sub-system may evaluate the I/O submission queues to determine whether there are any other I/O submissions that are awaiting execution. If the credit regulation and monitoring sub-system determines that there are other I/O requests within the I/O submission queues, the credit regulation and monitoring sub-system may add the new I/O request to the I/O submission queues for later execution (if possible) at step 1405 and the process ends at step 1406.

If there are no other I/O requests waiting, the credit regulation and monitoring sub-system may determine whether the required credit for the I/O request and the outstanding credit are below a threshold value at step 1404. As noted above, the credit regulation and monitoring sub-system may include credit tracking information that may be used to determine the available and outstanding credit via an outstanding credit table and the commands to be executed via a blocked command queue. The blocked command queue may mirror the I/O submission queues of the I/O submission and completion queues. The blocked command queue may include command identifiers, which are the handles used by the device driver of the block layer of the storage stack. For instance, when the credit regulation and monitoring module receives a completion notification from the device driver via the I/O information interface, the notification may include the command identifier of the completed command. This command identifier may be used to identify the command from the blocked command queue. If the credit regulation and monitoring sub-system determines that the required credit for the I/O request and the outstanding credit are not below the threshold value, the credit regulation and monitoring sub-system may add the new I/O request to the I/O submission queues for later execution (if possible), as described above.

If the required credit for the I/O request and the outstanding credit are below the threshold value, the credit regulation and monitoring sub-system may determine whether there are sufficient credits for the new I/O request. For instance, the credit regulation and monitoring sub-system calculates the amount of credit required for execution of the command. The credit regulation and monitoring sub-system may evaluate an outstanding credit table to determine whether there is sufficient credit available to allow for execution of the command. If the credit regulation and monitoring sub-system determines that there is insufficient credit available for the command, the credit regulation and monitoring sub-system 408 may add the command to the blocked command queue at step 1405. However, if there is sufficient credit available for the I/O request, the credit regulation and monitoring sub-system may increase outstanding credits and decrease credit allocation at step 1408. This may allow for the I/O request to be fulfilled, at which point the process ends at step 1409.

Figure 15:
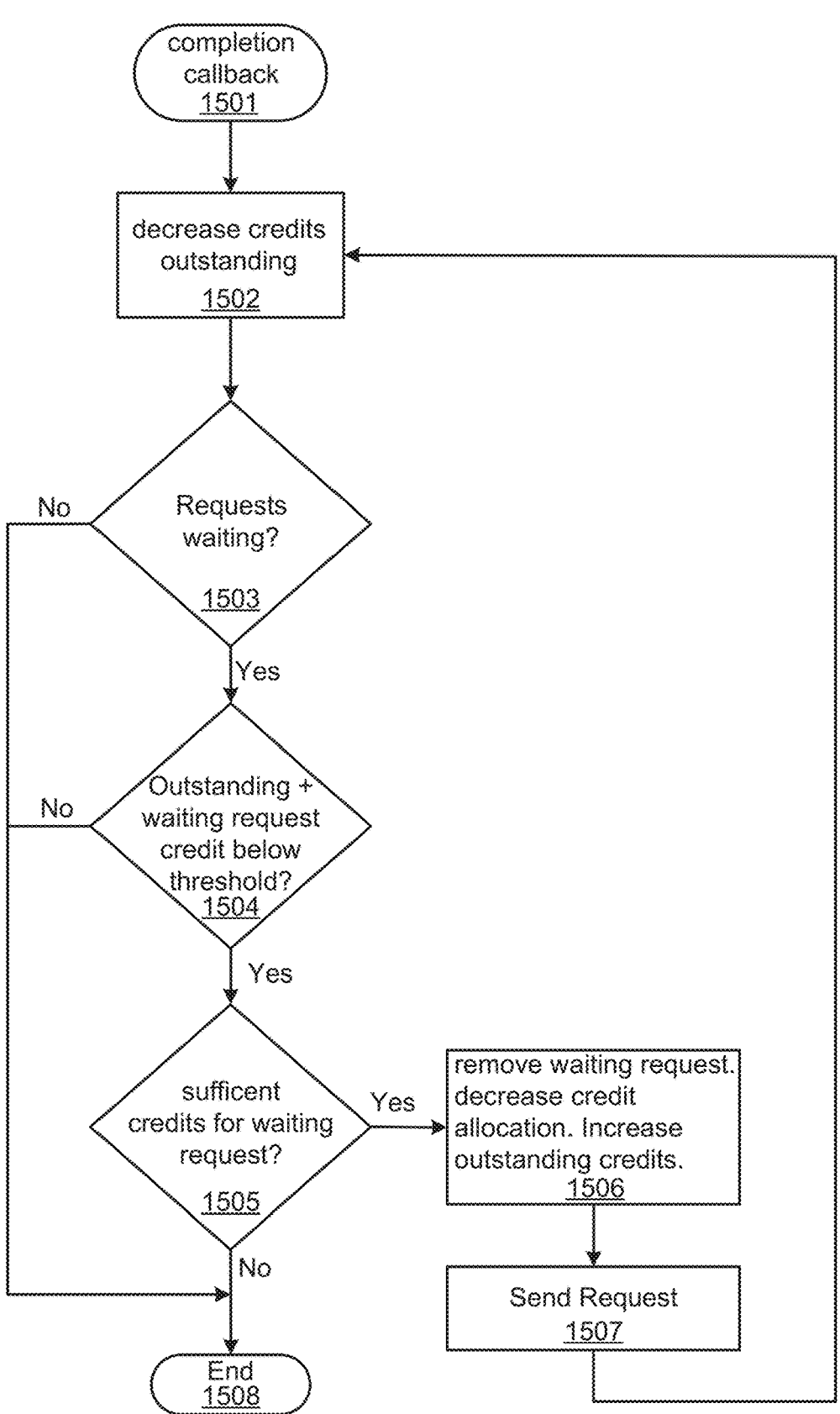
FIG. 15 illustrates an example of I/O completion decision handling for credit based I/O in accordance with at least one embodiment.

FIG. 15 illustrates an example of I/O completion decision handling for credit based I/O in accordance with at least one embodiment. The process illustrated in FIG. 15 may be performed in response to fulfillment of an I/O submission request. For instance, when an I/O submission request is fulfilled, the credit regulation and monitoring sub-system may receive, at step 1501, a completion callback indicating that the I/O submission request has been initiated and/or fulfilled. As noted above, the credit regulation and monitoring sub-system may calculate the credits required for processing of an I/O submission request.

At step 1502, in response to the completion callback, the credit regulation and monitoring sub-system may decrease the credits outstanding for the SSD. The credit regulation and monitoring sub-system may determine how much credit was outstanding as a result of processing of the now completed I/O operation and release the outstanding credit for use in processing other I/O requests.

At step 1503, the credit regulation and monitoring sub-system may determine whether there are any I/O submission requests waiting to be processed. As noted above, the credit regulation and monitoring sub-system may include credit tracking information that may be used to determine the available and outstanding credit via an outstanding credit table and the commands to be executed via a blocked command queue. The blocked command queue may mirror the I/O submission queues of the I/O submission and completion queues. The blocked command queue may include command identifiers, which are the handles used by the device driver of the block layer of the storage stack. For instance, when the credit regulation and monitoring module receives a completion notification from the device driver via the I/O information interface, the notification may include the command identifier of the completed command. This command identifier may be used to identify the command from the blocked command queue. If the credit regulation and monitoring sub-system determines that there are no I/O submission requests waiting to be processed, the process may terminate at step 1508.

If the credit regulation and monitoring sub-system identifies one or more existing I/O submission requests pending, the credit regulation and monitoring sub-system determines, at step 1504, whether the outstanding credit and the amount of credit required by the next pending I/O submission request is below a credit threshold value. As noted above, the amount of outstanding credit is limited by a credit threshold, where the threshold can be embodied in a plurality of thresholds across a plurality of applications. These thresholds may employ a hysteresis mechanism, such as a moving average to account outstanding credit across a plurality of application over a time window, where the credits allowed outstanding across that time window meet QoS requirements for the plurality of applications. In some embodiments, a threshold for outstanding I/O requests is based on I/O request type. If the outstanding credit and the amount of credit required by the next pending I/O submission request is not below the threshold value, the process may terminate at step 1508. Alternatively, rather that terminating the process, the credit regulation and monitoring sub-system may reorder the queue for unsent requests assuming coherency is enforced at a higher level. For instance, the credit regulation and monitoring sub-system may move on to the next pending request to see if this request can be executed. The first I/O submission may be placed at the bottom of the queue or moved back such that once the pending request is processed, the credit regulation and monitoring sub-system may return to the first I/O submission.

If the credit regulation and monitoring sub-system determines that the outstanding credit and the amount of credit required by the next pending I/O submission request is below the credit threshold value, the credit regulation and monitoring sub-system may determine, at step 1505, whether there is sufficient credit for the pending I/O submission request. For instance, when a command is received for an application, the credit regulation and monitoring sub-system calculates the amount of credit required for execution of the command. The credit regulation and monitoring sub-system may evaluate the outstanding credit table to determine whether there is sufficient credit available to allow for execution of the command. If the credit regulation and monitoring sub-system determines that there is insufficient credit available for the command, the credit regulation and monitoring sub-system may terminate the process at step 1508. In some instances, the command may be re-added to the blocked command queue, as described above.

If the credit regulation and monitoring sub-system determines that there is sufficient credit for the pending I/O submission request, the credit regulation and monitoring sub-system may, at step 1506, remove the request from the blocked command queue, decrease the amount of credit available, and increase the amount of outstanding credits in the outstanding credit table. Further, at step 1507, the credit regulation and monitoring sub-system may send the I/O operation(s) corresponding to the I/O submission request for processing. Once these operations have been performed, the credit regulation and monitoring sub-system may repeat the process illustrated in FIG. 15.

Figure 16:
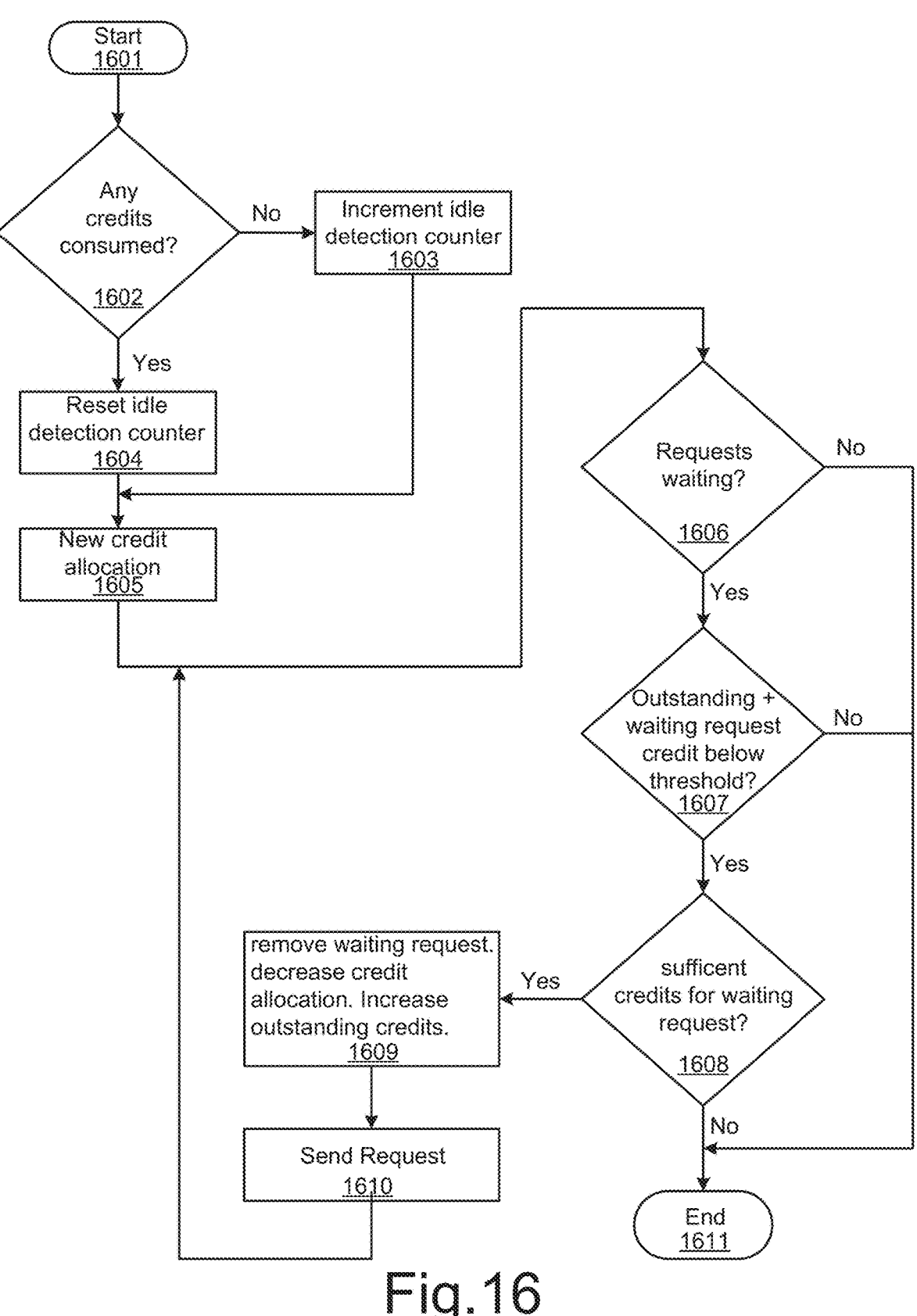
FIG. 16 illustrates an example of I/O credit replenishment processing using a timer for credit based I/O in accordance with at least one embodiment.

FIG. 16 illustrates an example of I/O credit replenishment processing using a timer for credit based I/O in accordance with at least one embodiment. As noted above, the techniques required to generate the non-accumulating credit on a periodic bases may use a timer to provide a fixed credit quanta at fixed intervals. The process illustrated in FIG. 16 may be initiated at step 1601, after which the credit regulation and monitoring sub-system may determine, at step 1602, whether any credits have been consumed. If the credit regulation and monitoring sub-system determines that no credits have been consumed, the credit regulation and monitoring sub-system, at step 1603, may increment the idle detection counter. Alternatively, if the credit regulation and monitoring sub-system determines that one or more credits have been consumed, the credit regulation and monitoring sub-system, at step 1604, may reset the idle detection counter.

In an embodiment, credit is allocated by providing threads with non-accumulating credit at a regular interval. If a thread stops consuming credits, the thread is deemed to have gone idle and its QoS credits may be allocated elsewhere. Thus, application threads are monitored in order to determine whether it is using any credits. If it does not consume any credits in an interval, the idle detection counter may be incremented. If the thread consumes any credits, the idle detection counter may be reset. When the idle detection counter crosses a threshold value, the application thread is deemed idle, which allows for the re-allocation of credit to other clients. If the application thread is re-activated and starts consuming resources, credit allocation may be adjusted.

Once the idle detection counter has either been reset or incremented, the credit regulation and monitoring sub-system, at step 1605, performs a new credit allocation. As noted above, the non-accumulating credit for an interval varies adaptively based on credit consumption rate and I/O request mix. Thus, the credit regulation and monitoring sub-system may evaluate the credit consumption rate and I/O request mix to perform this new credit allocation. In some instances, the non-accumulating credit scheme utilized by the credit regulation and monitoring sub-system may mitigate timer overhead by computing credits in a non-accumulating credit window on-the-fly as requests arrive, where timer based non-accumulating credit replenishment is only required when credits are exhausted.

At step 1606, the credit regulation and monitoring sub-system may determine whether there are any requests waiting. This step may be similar to step 1503 described above in connection with the process illustrated in FIG. 15. For instance, as noted above, the credit regulation and monitoring sub-system may include credit tracking information that may be used to determine the available and outstanding credit via an outstanding credit table and the commands to be executed via a blocked command queue. If the credit regulation and monitoring sub-system determines that there are no I/O submission requests waiting to be processed, the process may terminate at step 1611.

Steps 1607-1610 may mirror those of steps 1504-1507 described above in connection with FIG. 15, respectively. For instance, if the credit regulation and monitoring sub-system identifies one or more existing I/O submission requests pending, the credit regulation and monitoring sub-system determines, at step 1607, whether the outstanding credit and the amount of credit required by the next pending I/O submission request is below a credit threshold value. If the amount is not below the threshold, the process may terminate at step 1611. However, if the amount is below the threshold, the credit regulation and monitoring sub-system may determine, at step 1608, whether there is sufficient credit for the pending I/O submission request. If so, the credit regulation and monitoring sub-system may, at step 1609, remove the request from the blocked command queue, decrease the amount of credit available, and increase the amount of outstanding credits in the outstanding credit table. Further, at step 1610, the credit regulation and monitoring sub-system may send the I/O operation(s) corresponding to the I/O submission request for processing. However, if there are not enough credits for the pending I/O submission request, the process may terminate at step 1611. In various embodiments, a cached copy of the I/O submission requests are held until the process terminates at step 1611 to aggregate the request sending operation at step 1610.

Figure 17:
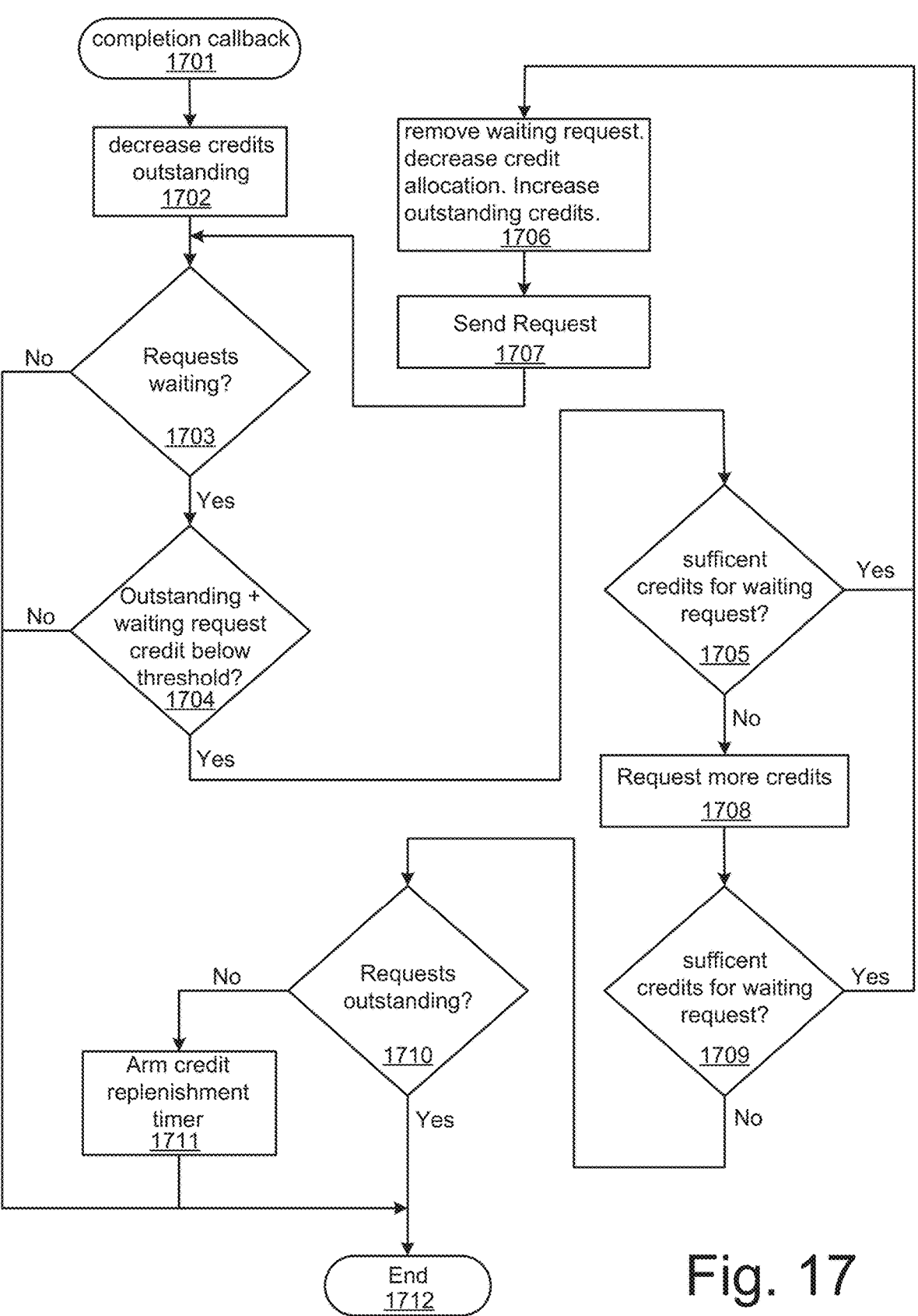
FIG. 17 illustrates an example of I/O credit replenishment processing with minimized timer overhead for credit based I/O in accordance with at least one embodiment.

FIG. 17 illustrates an example of I/O credit replenishment processing with minimized timer overhead for credit based I/O in accordance with at least one embodiment. As noted above, the non-accumulating credit scheme described in a PPV mitigates timer overhead by computing credits in a non-accumulating credit window on-the-fly as requests arrive, where timer based non-accumulating credit replenishment is only required when credits are exhausted. Thus, the process illustrated in FIG. 17 may provide a credit scheme wherein credit replenishment employs in-line credit replenishment as opposed to timer-based, periodic credit replenishment as described above in connection with FIG. 16.

At step 1701, the credit regulation and monitoring sub-system may receive a completion callback indicating that the I/O submission request has been initiated and/or fulfilled. As noted above, the credit regulation and monitoring sub-system may calculate the credits required for processing of an I/O submission request. At step 1702, the credit regulation and monitoring sub-system may decrease the credits outstanding according the number of credits allocated for the completed I/O operation.

At step 1703, the credit regulation and monitoring sub-system may determine whether there are any I/O submission requests waiting to be processed. If the credit regulation and monitoring sub-system determines that there are no I/O submission requests waiting to be processed, the process may terminate at step 1712. However, if the credit regulation and monitoring sub-system identifies one or more existing I/O submission requests pending, the credit regulation and monitoring sub-system determines, at step 1704, whether the outstanding credit and the amount of credit required by the next pending I/O submission request is below a credit threshold value. If the outstanding credit and the amount of credit required by the next pending I/O submission request is not below the threshold value, the process may terminate at step 1712.

If the credit regulation and monitoring sub-system determines that the outstanding credit and the amount of credit required by the next pending I/O submission request is below the credit threshold value, the credit regulation and monitoring sub-system may determine, at step 1705, whether there is sufficient credit for the pending I/O submission request. For instance, when a command is received for an application, the credit regulation and monitoring sub-system calculates the amount of credit required for execution of the command. The credit regulation and monitoring sub-system may evaluate the outstanding credit table to determine whether there is sufficient credit available to allow for execution of the command. If the credit regulation and monitoring sub-system determines that there is insufficient credit available for the command, the credit regulation and monitoring sub-system may request more credits at step 1708 and, at step 1709, again determine whether there are sufficient credits for the request.

If the credit regulation and monitoring sub-system determines that there are sufficient credits available for the pending I/O submission request, the credit regulation and monitoring sub-system, at step 1706, may remove the request from the blocked command queue, decrease the amount of credit available, and increase the amount of outstanding credits in the outstanding credit table. Further, at step 1707, the credit regulation and monitoring sub-system may send the I/O operation(s) corresponding to the I/O submission request for processing. Once these operations have been performed, the credit regulation and monitoring sub-system may repeat the process illustrated in FIG. 17.

If the credit regulation and monitoring sub-system determines, after two or more attempts to obtain sufficient credit for the pending I/O submission requests, that there is not sufficient credit available for the request, the credit regulation and monitoring sub-system may determine whether there are any other outstanding I/O submission requests (e.g., requests that have been submitted to the SSD but that have not yet been completed) at step 1710. If there are any outstanding requests, the credit regulation and monitoring sub-system may terminate the process at 1712 to allow for completion of the outstanding requests. However, if there are no requests outstanding, the credit regulation and monitoring sub-system, at step 1711, may arm a credit replenishment timer and terminate the process at step 1712. This timer may be necessary if there are no credits and there are no I/O submission requests outstanding. However, this timer may not be required if credits can be updated automatically as requests are completed.

Figure 18:
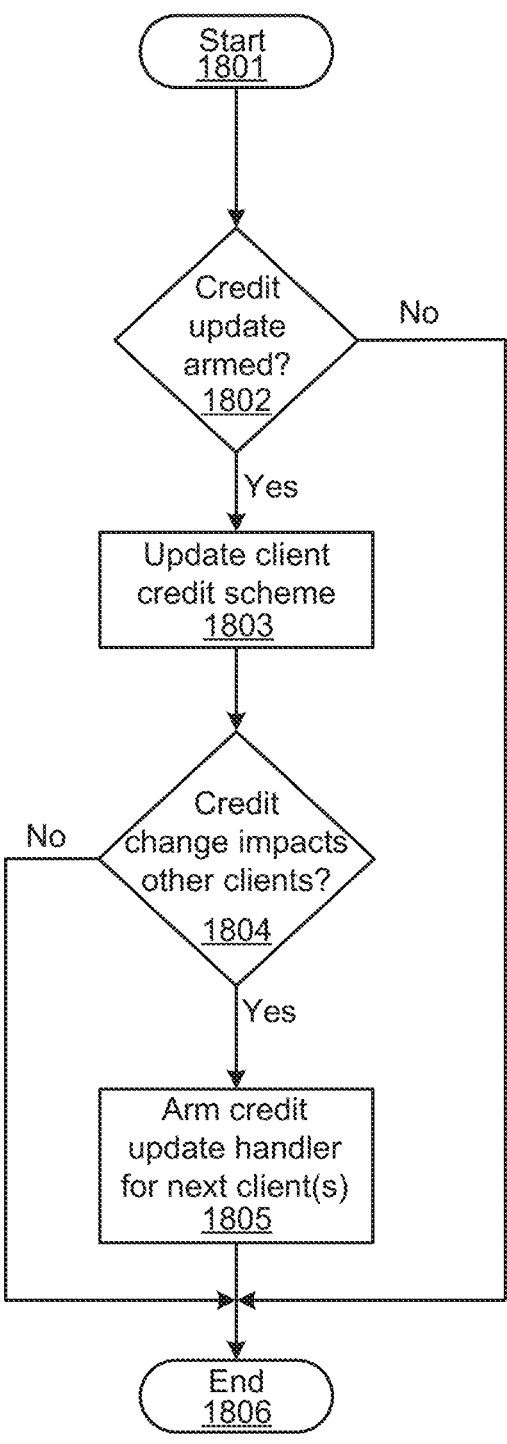
FIG. 18 illustrates an example of a method of performing I/O credit update notification in accordance with at least one embodiment.

FIG. 18 illustrates an example of a method of performing I/O credit update notification in accordance with at least one embodiment. The process illustrated in FIG. 18 represents an example embodiment of a method to update credits across a plurality of clients. At step 1801, the process for updating credits may be started, at which point it is determined, at step 1802, whether the credit update has been armed. If the credit update has not been armed, the process may end at step 1806. However, if the credit update has been armed, the client credit scheme may be updated at step 1803.

Once the client credit scheme has been updated, it is determined whether the credit change impacts any other clients. If there is no impact to other clients, the process may end at step 1806. However, if the credit change does impact one or more other clients, the credit update handler for the next clients may be armed at step 1805. The process may terminate at step 1806 once the credit update handler for these other clients is armed.

Figure 19:
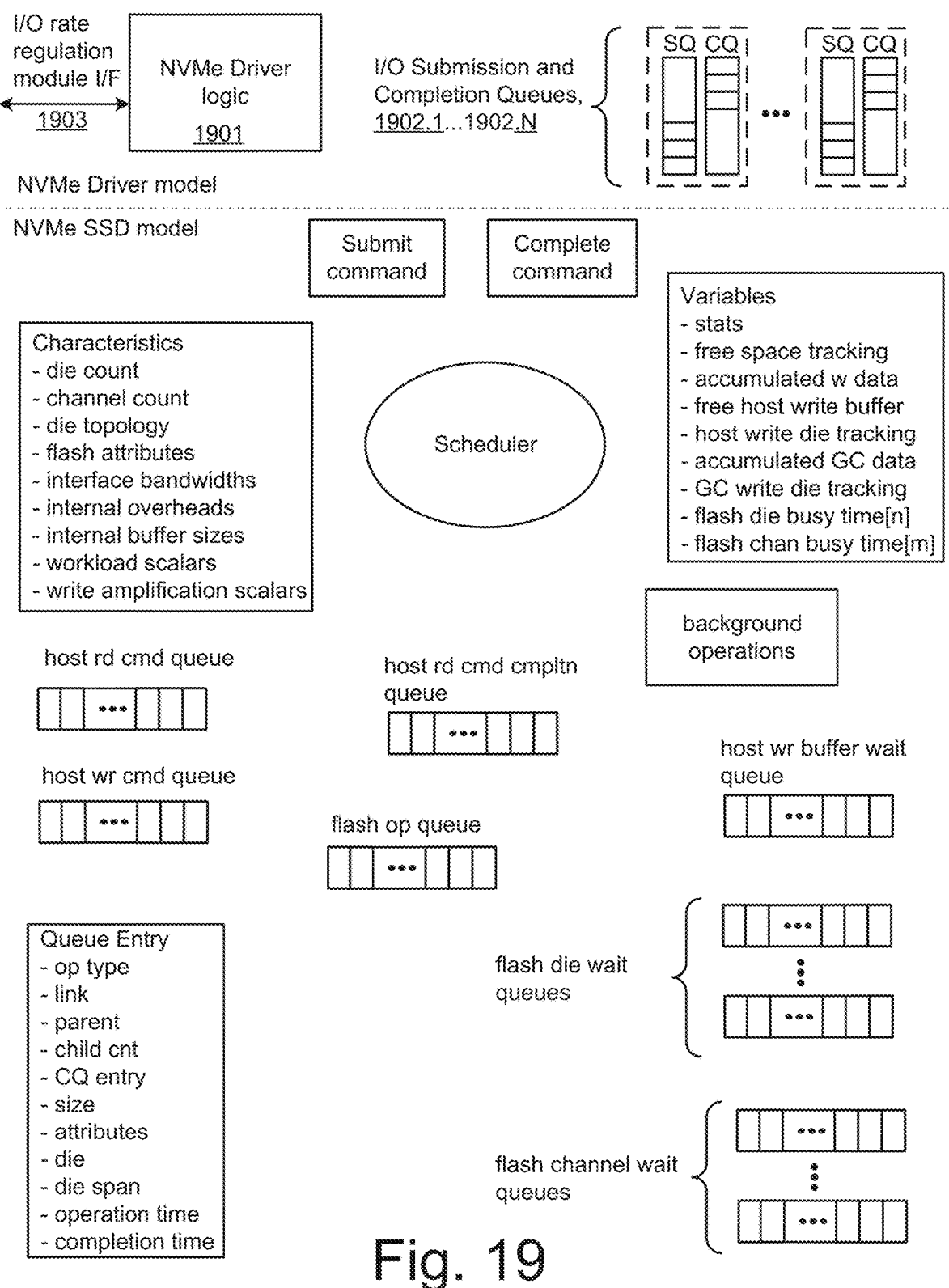
FIG. 19 illustrates an example of an SSD performance model that includes an NVMe driver model and an NVMe SSD model in accordance with at least one embodiment.

FIG. 19 illustrates an example of an SSD performance model that includes an NVMe driver model and an NVMe SSD model in accordance with at least one embodiment. The NVMe driver model is a stripped down version of the driver with the I/O submission queues and completion queues 1902.1-1902.N in host memory. The NVMe driver model may include NVMe driver logic 1901, which may interact with the credit regulation and monitoring module via an I/O rate regulation module interface 1903, as described in greater detail herein in connection with FIG. 9.

The NVMe SSD model is comprised of several queues, counters, statistics and a scheduler. These queues may include a host read command queue, a host read command completion queue, a host write command queue, a flash operation queue, a host write buffer wait queue, flash die wait queues, and flash channel wait queues. Operations moving through this model may be represented by queue entries. The queue entries may include operation type, queue link, ptr to parent host read to a flash read, count of host read's child operations, completion queue entry for a host read or write operation (constructed from data in the submission queue entry), request size, special attributes of a host request (e.g., force unit access, etc.), die targeted by a flash read or write, number of flash reads a host read requires to retrieve its data, time it takes to perform the operational step, actual wall clock time when the operation will finish, and the like.

Figure 20:
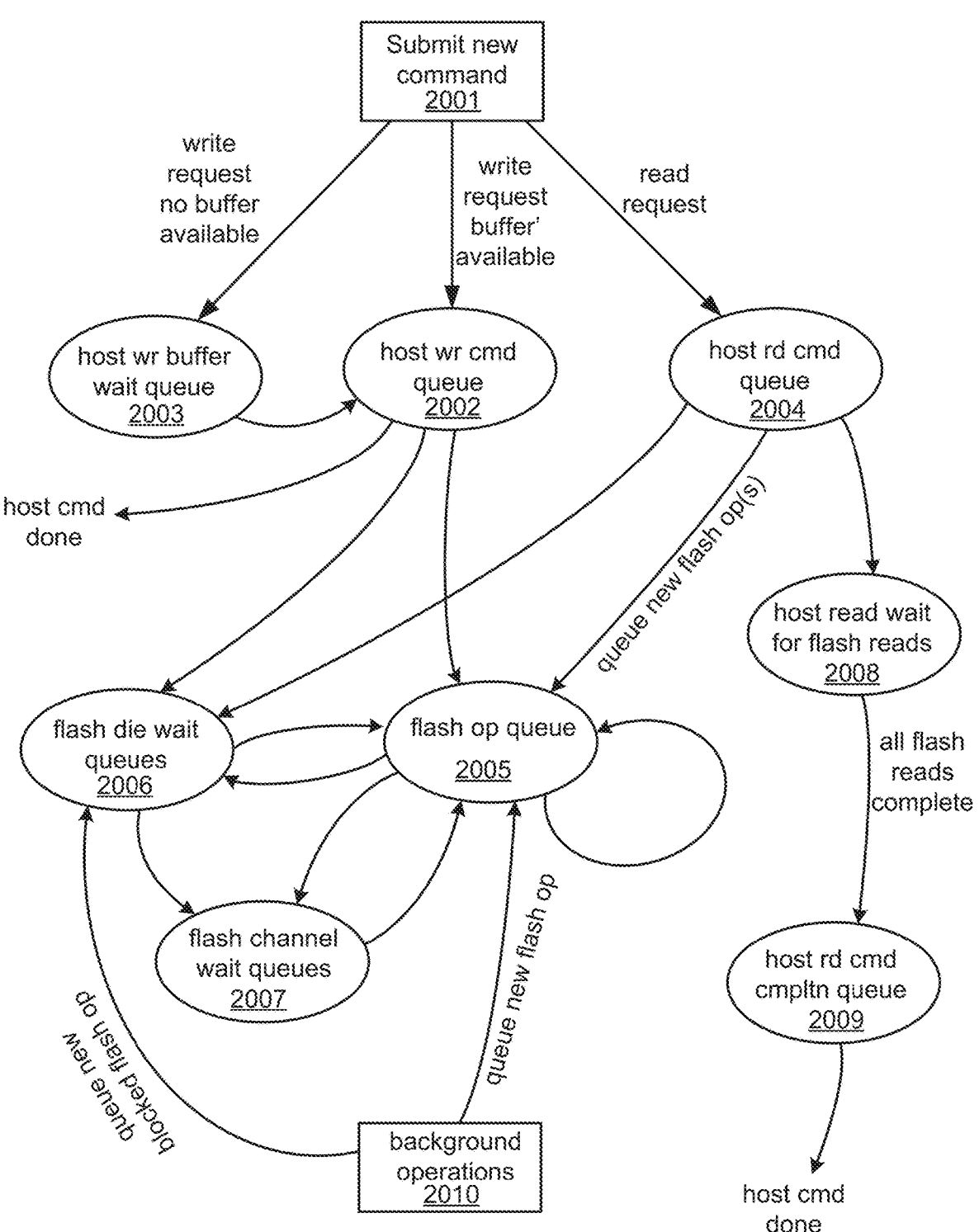
FIG. 20 illustrates an example of how operations are created and moved between queues in accordance with at least one embodiment.

FIG. 20 illustrates an example of how operations are created and moved between queues in accordance with at least one embodiment. At step 2001, a new command is submitted. The new command may include a read or write request that may be processed using the SSD. If the new command is a write request, but there is no buffer available, the request may be placed in the host write request buffer wait queue at step 2003. Once the write request buffer becomes available, the write request may be moved to the host write request command queue at step 2002. If the new command is a read request, the request may be placed in the host read command queue at step 2004.

Steps 2005-2007 may represent how flash operations are scheduled. This scheduling may be performed because a flash die or channel may be busy servicing another operation. Active flash operations may reside in the flash op queue at step 2005. Waiting flash operations may reside in either a flash die wait queue at step 2006 or in a flash channel wait queue at step 2007, where an operation may be queued until the underlying resource becomes available.

Read requests in the host read command queue may be placed in a host read wait for flash reads at step 2008. Once all flash reads are completed, the read request may be added to a host read command completion queue at step 2009 after which the host command (read request) is completed.

Figure 21:
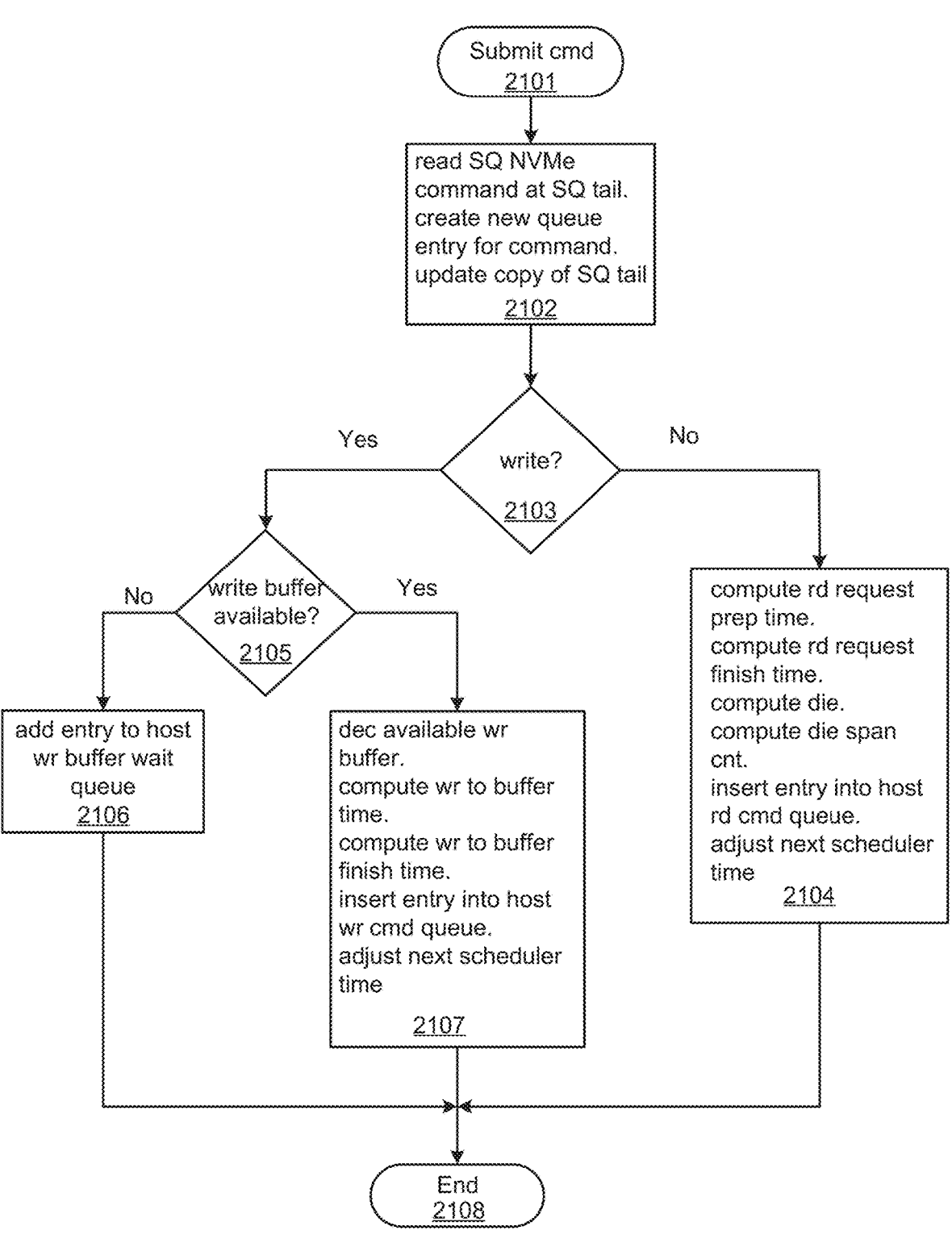
FIG. 21 illustrates an example of a method of handling submitted NVMe commands via a submit function in accordance with at least one embodiment.

FIG. 21 illustrates an example of a method of handling submitted NVMe commands via a submit function in accordance with at least one embodiment. When a NVMe command is submitted by the driver, the submit command is called at step 2101. In response to this command, the SQ NVMe command at the SQ tail is read, at step 2102. Further, a new queue entry for the NVMe command is created and the copy of the SQ tail is updated.

At step 2103, it is determined whether the NVMe command is a write command. If the NVMe command is not a write command, the read request preparation time, the read request finish time, and the compute die span count are computed at step 2104. Further, an entry may be inserted into the host read command queue and an adjustment may be made to the next scheduler time. Once this is completed, the process may terminate at step 2108.

If the NVMe command is a write command, the process moves to step 2105, where it is determined whether there is write buffer available for the command. If there is no write buffer available, at step 2106, an entry may be added to the host write buffer wait queue, after which the process may terminate at step 2108. However, if there is write buffer available, the available write buffer may be decreased at step

2107. Further, the write command to buffer time and the write command to buffer finish time may be computed. An entry may be inserted into the host write command queue and an adjustment may be made to the next scheduler time. Once this completed, the process may terminate at step 2108.

Figure 22:
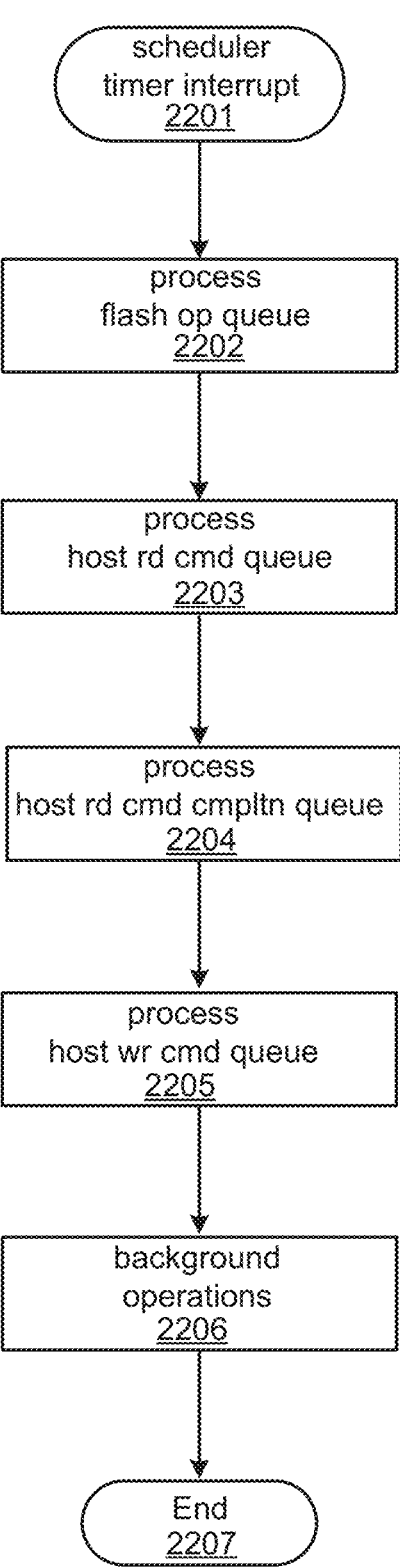
FIG. 22 illustrates an example of a method of handling a scheduler timer interrupt in accordance with at least one embodiment.

FIG. 22 illustrates an example of a method of handling a scheduler timer interrupt in accordance with at least one embodiment. The operation scheduler for the model may operate on a timer interrupt, which may be set when the earliest next queue entry across all queues requires servicing at step 2201. At steps 2202-2205, the scheduler calls each queue's processing function. A queue's processing function may evaluate the operation at the head of the queue to determine if the operation has completed. The order of the queues represented in steps 2202-2205 is not fixed, thereby allowing for processing of each of the queues in any order. At step 2206, the scheduler calls a function to schedule background operations (e.g., garbage collection, etc.). The process may end at step 2207.

The scheduler timer may not operate on a fixed time interval. Instead, the timer may be set to expire when the operation with the earliest completion time across all queues will be ready. Thus, every time a timed operation is inserted in a queue, it is evaluated to determine if the scheduler timer needs adjusting.

Figure 23:
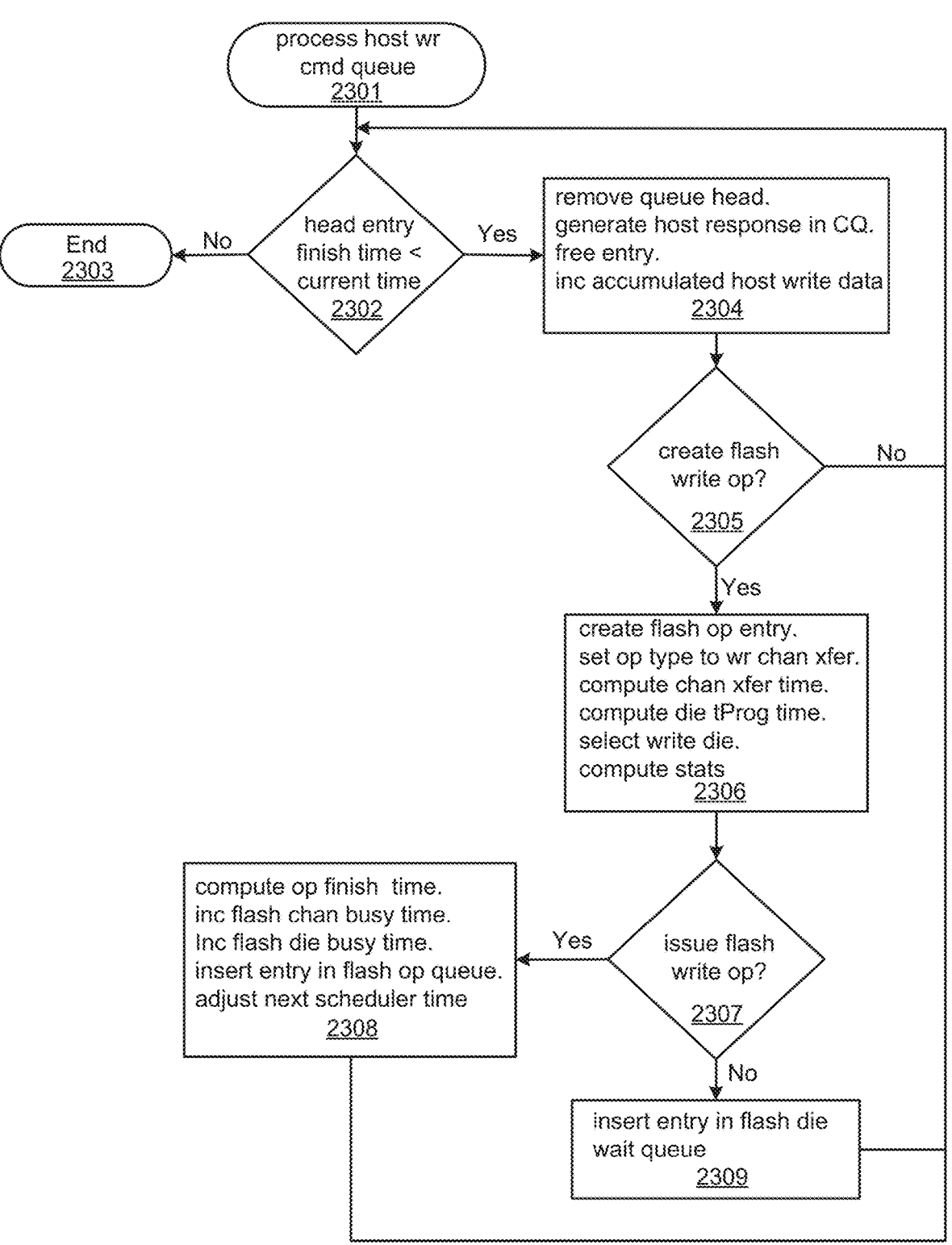
FIG. 23 illustrates an example of a method of processing host write commands from a host write command queue in accordance with at least one embodiment.

FIG. 23 illustrates an example of a method of processing host write commands from a host write command queue in accordance with at least one embodiment. At step 2301, the host write command queue is processed. During this processing, at step 2302, it is determined whether the head entry finish time is less than the current time. If the head entry finish time is not less than the current time, the process terminates at step 2303. However, if the head entry finish time is less than the current time, at step 2304, the queue head is removed and a host response in the CQ is generated. Further, the entry in the queue is freed and the accumulated host write data is increased.

At step 2305, it is determined whether to create a flash write operation. If a flash write operation is not created, the process may be restarted by further processing the host write command queue. If a flash write operation is created, at step 2306, a flash operation entry is created and the operation type is set to a write channel transfer. Further, the channel transfer time and the die tProg time are computed, as well as various statistics. A write die may also be selected.

At step 2307, it is determined whether to issue a flash write operation. If the flash write operation is not issued, the flash operation entry is inserted into the flash die wait queue at step 2309 and the process may be restarted by further processing the host write command queue. However, if the flash write operation is issued, the operation finish time is computed, the flash channel busy time is increased, the flash die busy time is increased, and the entry is inserted into the flash operation queue at step 2308. Further, an adjustment may be made to the next scheduler time. Once step 2308 is completed, the process may be restarted as described above.

Figure 24:
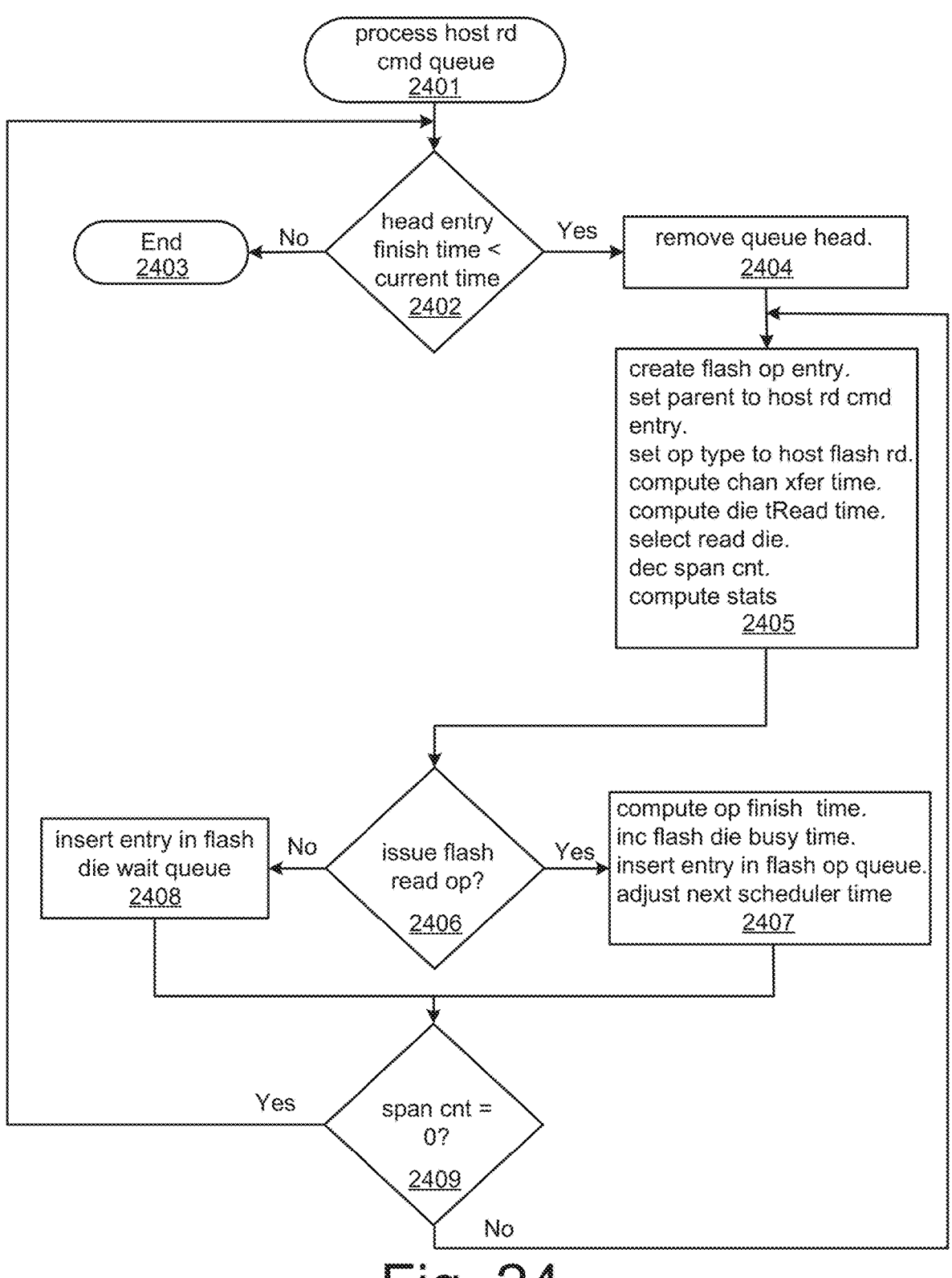
FIG. 24 illustrates an example of a method of processing host read commands from a host read command queue in accordance with at least one embodiment.

FIG. 24 illustrates an example of a method of processing host read commands from a host read command queue in accordance with at least one embodiment. At step 2401, the host read command queue may be processed. At step 2402, it is determined whether the head entry finish time is less than the current time. If the head entry finish time is greater than or equal to the current time, the process may terminate at step 2403. However, if the operation at the head of the queue has completed (indicating all work necessary to start issuing flash reads for this host read have completed), at step

2404, the operation is removed from the queue head and the span count from the entry is saved. This may inform how many flash reads need to be issued.

Once the queue head has been removed, a loop to create new flash read operations queue entries may be started. At step 2405, a flash operation entry may be created. A parent to host read command entry may be set. Further, the operation type may be set to a host flash read and the channel transfer time and die tRead time may be computed. A read die may be selected and the span count may be decreased. Statistics may further be computed.

At step 2406, it is determined whether to issue a flash read operation. For instance, it is determined if the die that is to be read is busy and that the die wait queue is empty. If not, an entry may be inserted in the flash die wait queue at step 2408. Alternatively, if the flash read operation is issued, at step 2407, the operation finish time may be computed and the flash die busy time may be increased. Further, an entry may be inserted into the flash operation queue and the next scheduler time may be adjusted, accordingly.

At step 2409, it is determined whether the span count is equal to zero. If the span count is equal to zero, the process illustrated in FIG. 24 may be re-initiated, with the host read command queue processed anew. However, if the span count is a value different from zero, the operations described above corresponding to step 2405 may be performed once more, with the subsequent steps repeated.

Figure 25:
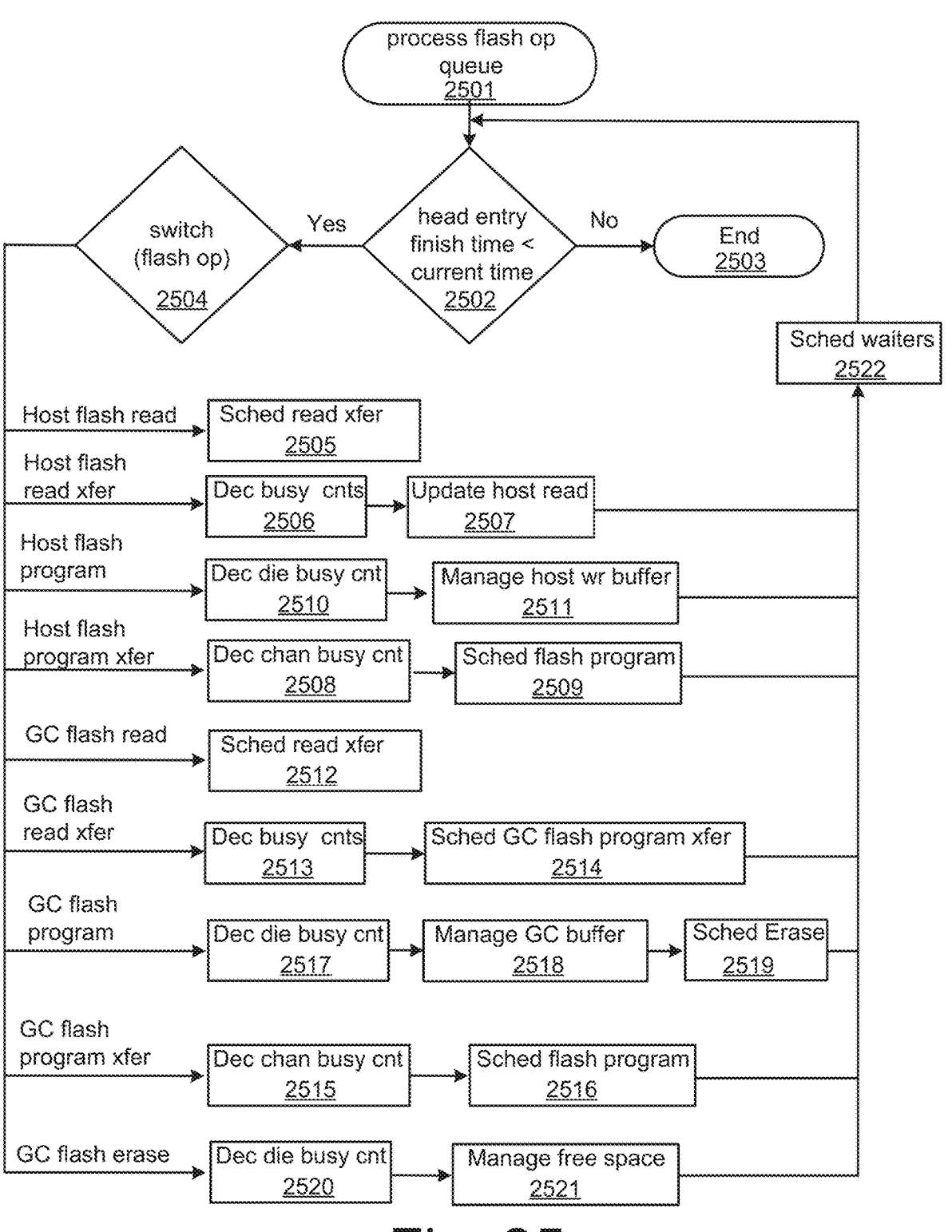
FIG. 25 illustrates an example of a method of processing a flash operations queue in accordance with at least one embodiment.

FIG. 25 illustrates an example of a method of processing a flash operations queue in accordance with at least one embodiment. FIG. 25 may represent how the SSD model is managed and processed. Flash read and program operations are asymmetric in nature. Further, flash devices can handle a single operation at a time and have limited buffer space. To initiate a program operation, the channel needs to be available such that a program operation needs both the channel and the die to be available. A read, alternatively, only needs the die to be available to start with. After an operation is processed, it is determined if there is anything on the die or channel wait queues that can be scheduled because the operation freed up a die or channel. If so, the entry at the head of a die and/or channel is removed and added to the flash operations queue. The appropriate die and channel counts are incremented, as described above in connection with FIGS. 23-24.

A host or GC write can be sitting in a die wait queue even when it is waiting on a channel. This may occur because it has to secure the die before it can grab the channel. Thus, when a channel is freed, both the channel's wait queue as well as the wait queues of any dies attached to that channel need to be evaluated to determine if an operation waiting on the channel queue is to be scheduled or if a transfer is to be scheduled for a write waiting in a die wait queue.

Operations that have a die or channel busy reside in the process flash operations queue ordered by completion time, initiating the process at step 2501. At step 2502, it is determined if the head entry finish time is less than the current time. If not (e.g., the entry at the head of the queue is complete), the entry is removed and processed based on the operation type, after which the process ends at step 2503. However, if the head entry finish time is less than the current time, it is determined, at step 2504, which flash operations are completed. Based on this determination at step 2504, any of the subsequent operations corresponding to the particular flash operations completed may be performed.

When a host flash read operations completes, the process moves to step 2505 to schedule a host flash read transfer to move the data. The operation type is converted. If the channel is free, the operation is inserted in the flash operations queue, otherwise it is inserted on tail of a flash channel wait queue.

When a host flash read transfer operation completes, the channel and die busy counts are decremented (now both channel and die are free) at step 2506 and the parent host read is notified another flash read completed at step 2507. If all the flash reads for the parent host read are complete, the host read is inserted in the host read completion queue.

When a host flash program transfer completes, the channel busy count is decremented at step 2508. A flash programming step is scheduled at step 2509 by converting the operation type to host flash program and the entry is inserted into the flash operations queue.

When a host flash program completes, the die busy count is decremented and the entry is freed at step 2510. Next, the host write buffer is managed at step 2511. Generally, the write buffer is freed and a check is performed to determine if waiting entries can be processed on the host write buffer wait queue.

When garbage collection (GC) operations complete, they act similarly to their host counterparts (e.g., step 2512 for a GC flash read may be similar to step 2505 for a host flash read, etc.) with a few differences. When a GC flash read transfer completes, in addition to decrementing the busy counts at step 2513, it is determined if GC data has been accumulated to schedule, at step 2514, a GC flash program transfer. When a GC flash program transfer completes, it is determined if any erase operations can be scheduled for completely recycled blocks at step 2519. When a GC flash erase completes, free space may be updated at step 2521.

Figure 26:
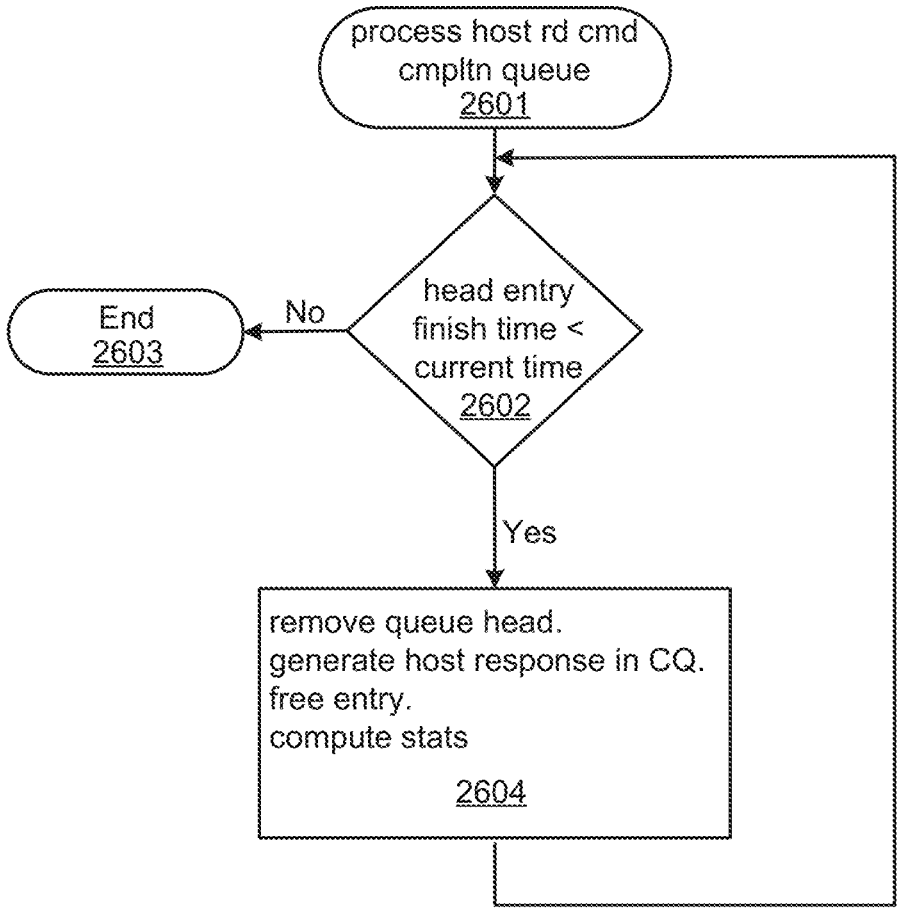
FIG. 26 illustrates an example of a method of processing a host read command completion queue in accordance with at least one embodiment.

FIG. 26 illustrates an example of a method of processing a host read command completion queue in accordance with at least one embodiment. At step 2601, the host read command completion queue may be processed. At step 2602, it is determined whether the head entry finish time is less than the current time. If the head entry finish time is greater than or equal to the current time, the process may terminate at step 2603. However, if the head entry finish time is less than the current time, at step 2604, the queue head may be removed and a host response may be generated in the CQ. Further, the corresponding entry may be freed from the queue and statistics may be computed. Once this is completed, the process may be repeated, whereby the host read command completion queue may again be processed.

Figure 27:
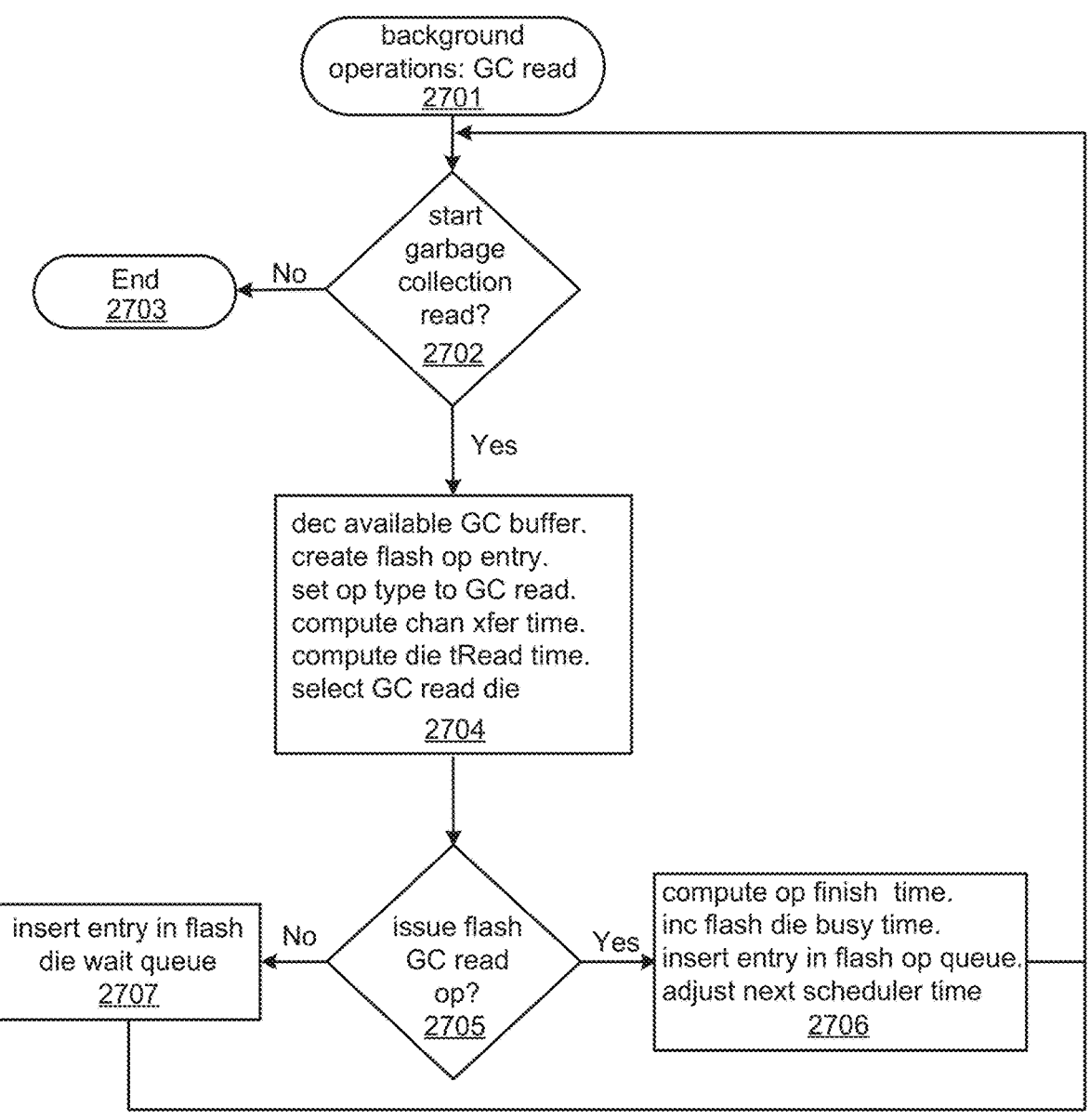
FIG. 27 illustrates an example of a method of performing one or more background operations including garbage collection in accordance with at least one embodiment.

FIG. 27 illustrates an example of a method of performing one or more background operations including garbage collection in accordance with at least one embodiment. At step 2701, garbage collection operations are read. At step 2702, it is determined whether to start the garbage collection read. For instance, garbage collection may be initiated when the amount of free space falls below a threshold value. The rate garbage collection reads may be issued may be based on how fast free space is being consumed and/or the amount of buffer space.

If the garbage collection read is started, at step 2704, the amount of available garbage collection buffer may be decreased and a flash operation entry may be created. Further, the operation type may be set to a garbage collection read. The channel transfer time and the die tRead time may also be computed and the garbage collection read die may be selected. At step 2705, it may be determined whether to issue a flash garbage collection operation. If the operation is not issued, at step 2707, an entry in the flash die wait queue may be inserted and the process illustrated in FIG. 27 may be repeated. However, if the flash garbage collection read operation is issued, at step 2706, the operation finish time may be computed and the flash die busy time may be increased. Further, an entry may be inserted into the flash operation queue and the next scheduler time may be adjusted, accordingly. Once step 2706 has been completed, the process illustrated in FIG. 27 may be repeated.

Figure 28:
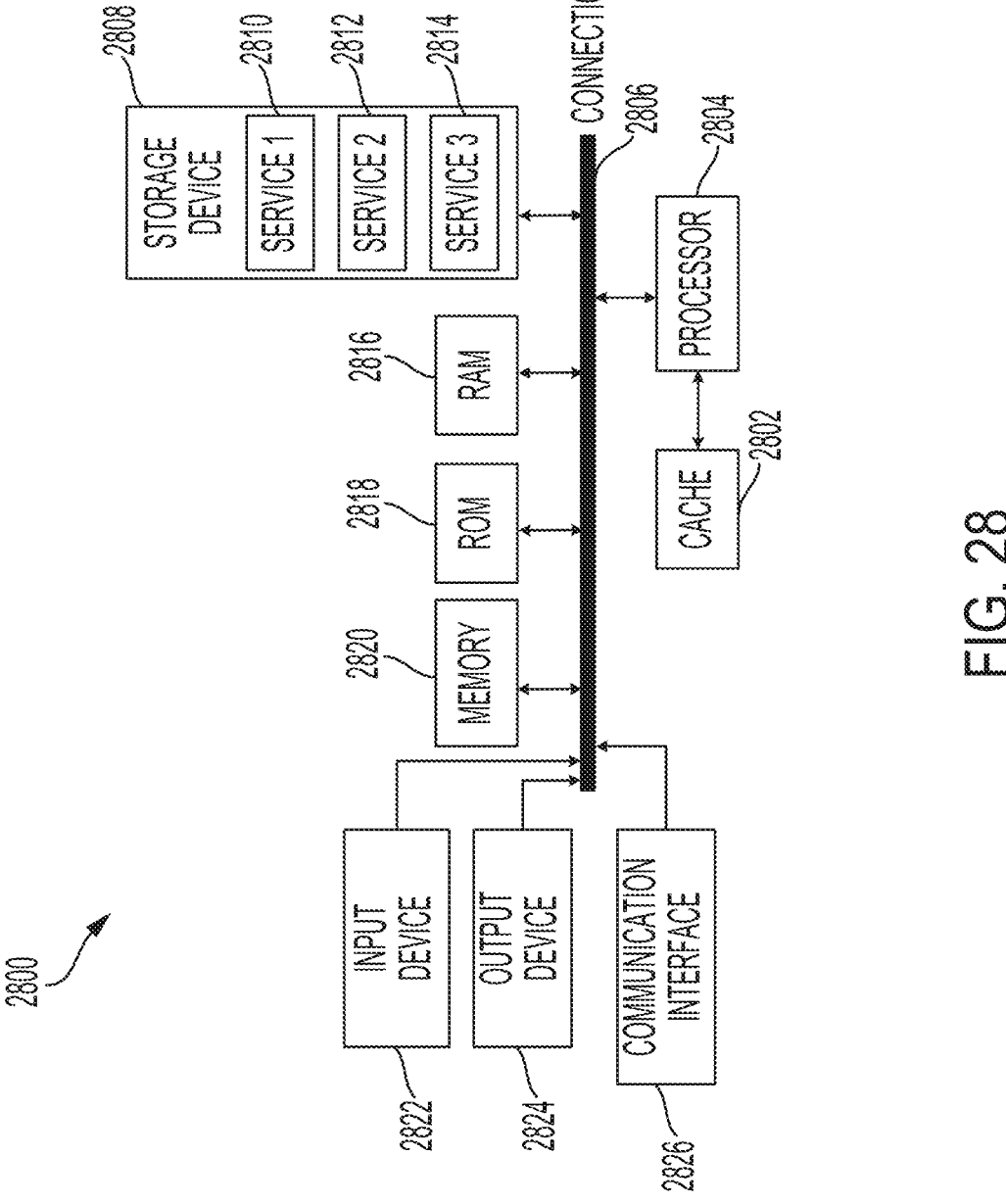
FIG. 28 illustrates a computing system architecture including various components in electrical communication with each other using a connection in accordance with various embodiments In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

FIG. 28 illustrates a computing system architecture 2800 including various components in electrical communication with each other using a connection 2806, such as a bus, in accordance with some implementations. Example system architecture 2800 includes a processing unit (CPU or processor) 2804 and a system connection 2806 that couples various system components including the system memory 2820, such as ROM 2818 and RAM 2816, to the processor 2804. The system architecture 2800 can include a cache 2802 of high-speed memory connected directly with, in close proximity to, or integrated as part of the processor 2804. The system architecture 2800 can copy data from the memory 2820 and/or the storage device 2808 to the cache 2802 for quick access by the processor 2804. In this way, the cache can provide a performance boost that avoids processor 2804 delays while waiting for data. These and other modules can control or be configured to control the processor 2804 to perform various actions.

Other system memory 2820 may be available for use as well. The memory 2820 can include multiple different types of memory with different performance characteristics. The processor 2804 can include any general purpose processor and a hardware or software service, such as service 1 2810, service 2 2812, and service 3 2814 stored in storage device 2808, configured to control the processor 2804 as well as a special-purpose processor where software instructions are incorporated into the actual processor design. The processor 2804 may be a completely self-contained computing system, containing multiple cores or processors, a bus, memory controller, cache, etc. A multi-core processor may be symmetric or asymmetric.

To enable user interaction with the computing system architecture 2800, an input device 2822 can represent any number of input mechanisms, such as a microphone for speech, a touch-sensitive screen for gesture or graphical input, keyboard, mouse, motion input, speech and so forth. An output device 2824 can also be one or more of a number of output mechanisms known to those of skill in the art. In some instances, multimodal systems can enable a user to provide multiple types of input to communicate with the computing system architecture 2800. The communications interface 2826 can generally govern and manage the user input and system output. There is no restriction on operating on any particular hardware arrangement and therefore the basic features here may easily be substituted for improved hardware or firmware arrangements as they are developed.

Storage device 2808 is a non-volatile memory and can be a hard disk or other types of computer readable media which can store data that are accessible by a computer, such as magnetic cassettes, flash memory cards, solid state memory devices, digital versatile disks, cartridges, RAMs 2816, ROM 2818, and hybrids thereof.

The storage device 2808 can include services 2810, 2812, 2814 for controlling the processor 2804. Other hardware or software modules are contemplated. The storage device 2808 can be connected to the system connection 2806. In one aspect, a hardware module that performs a particular function can include the software component stored in a computer-readable medium in connection with the necessary hardware components, such as the processor 2804, connection 2806, output device 2824, and so forth, to carry out the function.

The disclosed methods can be performed using a computing system. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device. The processor may be configured to carry out all or part of methods described herein for example by executing code for example stored in memory. One or more of a user device or computer, a provider server or system, or a suspended database update system may include the components of the computing system or variations on such a system.

This disclosure contemplates the computer system taking any suitable physical form, including, but not limited to a Point-of-Sale system ("POS"). As example and not by way of limitation, the computer system may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud, which may include one or more cloud components in one or more networks. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor may be, for example, be a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory can be coupled to the processor by, for example, a bus. The memory can include, by way of example but not limitation, random access memory (RAM), such as dynamic RAM (DRAM) and static RAM (SRAM). The memory can be local, remote, or distributed.

The bus can also couple the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software can be stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The bus can also couple the processor to the network interface device. The interface can include one or more of a modem or network interface. It will be appreciated that a modem or network interface can be considered to be part of the computer system. The interface can include an analog modem, Integrated Services Digital network (ISDN0 modem, cable modem, token ring interface, satellite transmission interface (e.g., "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer system can be controlled by operating system software that includes a file management system, such as a disk operating system. One example of operating system software with associated file management system software is the family of operating systems known as Windows® from Microsoft Corporation of Redmond, WA, and their associated file management systems. Another example of operating system software with its associated file management system software is the Linux™ operating system and its associated file management system. The file management system can be stored in the non-volatile memory and/or drive unit and can cause the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any system capable of executing a set of instructions (sequential or otherwise) that specify actions to be taken by that system.

While the machine-readable medium or machine-readable storage medium is shown, by way of example, to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the subject matter to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112 (f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Client devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things. The input devices can include, for example, a keyboard, a mouse, a key pad, a touch interface, a microphone, a camera, and/or other types of input devices. The output devices can include, for example, a display screen, a speaker, a haptic feedback system, a printer, and/or other types of output devices. A data storage device, such as a hard drive or flash memory, can enable the computing device to temporarily or permanently store data. A network interface, such as a wireless or wired interface, can enable the computing device to communicate with a network. Examples of computing devices include desktop computers, laptop computers, server computers, hand-held computers, tablets, smart phones, personal digital assistants, digital home assistants, as well as machines and apparatuses in which a computing device has been incorporated.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A computer-implemented method, comprising:

detecting a change to a performance of a set of solid-state drives (SSDs), wherein the change is detected based on one or more factors, and wherein the change corresponds to an application executing on a set of computing platforms associated with the set of SSDs;

obtaining an application profile corresponding to the application, wherein the application profile details characteristics corresponding to storage performance requirements and storage usage associated with the application;

identifying a set of placement restrictions corresponding to the application;

querying a daemon to obtain local and remote SSD profile data matching the set of placement restrictions, wherein the local and remote SSD profile data is associated with the set of SSDs;

interpolating a set of credit requirements associated with the application to identify one or more SSDs usable for the application, wherein the set of credit requirements are interpolated based on the application profile;

selecting a performance profile vector (PPV) associated with an SSD from the one or more SSDs, wherein the PPV is selected based on the set of credit requirements; and allocating a portion of performance capabilities and storage of the SSD for execution of the application, wherein the portion is allocated based on the PPV and the set of credit requirements.

2. The computer-implemented method of claim 1, further comprising:

establishing a credit based rate regulation scheme for execution of individual application threads that access the storage, wherein the credit based rate regulation scheme is computed from the PPV and a performance allocation and latency constraints assigned to the individual application threads.

3. The computer-implemented method of claim 1, wherein the set of placement restrictions are obtained from an application storage allocation policy, and wherein the application storage allocation policy enacts thin provisioning on different SSDs within the set of SSDs.

4. The computer-implemented method of claim 1, wherein the one or more factors include a detected change in a write pattern associated with the application, and wherein the change in the write pattern results in an increase in a write performance of the set of SSDs.

5. The computer-implemented method of claim 1, wherein the one or more factors include a reduction of SSD fragmentation between applications implemented on the set of SSDs.

6. The computer-implemented method of claim 1, wherein the set of placement restrictions are obtained from the application profile.

7. The computer-implemented method of claim 1, wherein the set of placement restrictions define a threshold amount of wear for determining which SSDs from the set of SSDs can be used, and wherein the threshold amount of wear is used to perform wear leveling across the set of SSDs.

8. A system, comprising:

one or more processors; and memory storing thereon instructions that, as a result of being executed by the one or more processors, cause the system to:

detect a change to a performance of a set of solid-state drives (SSDs), wherein the change is detected based on one or more factors, and wherein the change corresponds to an application executing on a set of computing platforms associated with the set of SSDs;

obtain an application profile corresponding to the application, wherein the application profile details characteristics corresponding to storage performance requirements and storage usage associated with the application;

identify a set of placement restrictions corresponding to the application;

query a daemon to obtain local and remote SSD profile data matching the set of placement restrictions, wherein the local and remote SSD profile data is associated with the set of SSDs;

interpolate a set of credit requirements associated with the application to identify one or more SSDs usable for the application, wherein the set of credit requirements are interpolated based on the application profile;

select a performance profile vector (PPV) associated with an SSD from the one or more SSDs, wherein the PPV is selected based on the set of credit requirements; and allocate a portion of performance capabilities and storage of the SSD for execution of the application, wherein the portion is allocated based on the PPV and the set of credit requirements.

9. The system of claim 8, wherein the instructions further cause the system to:

establish a credit based rate regulation scheme for execution of individual application threads that access the storage, wherein the credit based rate regulation scheme is computed from the PPV and a performance allocation and latency constraints assigned to the individual application threads.

10. The system of claim 8, wherein the set of placement restrictions are obtained from an application storage allocation policy, and wherein the application storage allocation policy enacts thin provisioning on different SSDs within the set of SSDs.

11. The system of claim 8, wherein the one or more factors include a detected change in a write pattern associated with the application, and wherein the change in the write pattern results in an increase in a write performance of the set of SSDs.

12. The system of claim 8, wherein the one or more factors include a reduction of SSD fragmentation between applications implemented on the set of SSDs.

13. The system of claim 8, wherein the set of placement restrictions are obtained from the application profile.

14. The system of claim 8, wherein the set of placement restrictions define a threshold amount of wear for determining which SSDs from the set of SSDs can be used, and wherein the threshold amount of wear is used to perform wear leveling across the set of SSDs.

15. A non-transitory computer-readable storage medium storing thereon executable instructions that, as a result of being executed by one or more processors of a computer system, cause the computer system to:

detect a change to a performance of a set of solid-state drives (SSDs), wherein the change is detected based on one or more factors, and wherein the change corresponds to an application executing on a set of computing platforms associated with the set of SSDs;

obtain an application profile corresponding to the application, wherein the application profile details characteristics corresponding to storage performance requirements and storage usage associated with the application;

identify a set of placement restrictions corresponding to the application;

query a daemon to obtain local and remote SSD profile data matching the set of placement restrictions, wherein the local and remote SSD profile data is associated with the set of SSDs;

interpolate a set of credit requirements associated with the application to identify one or more SSDs usable for the application, wherein the set of credit requirements are interpolated based on the application profile;

select a performance profile vector (PPV) associated with an SSD from the one or more SSDs, wherein the PPV is selected based on the set of credit requirements; and allocate a portion of performance capabilities and storage of the SSD for execution of the application, wherein the portion is allocated based on the PPV and the set of credit requirements.

16. The non-transitory computer-readable storage medium of claim 15, wherein the executable instructions further cause the computer system to:

establish a credit based rate regulation scheme for execution of individual application threads that access the storage, wherein the credit based rate regulation scheme is computed from the PPV and a performance allocation and latency constraints assigned to the individual application threads.

17. The non-transitory computer-readable storage medium of claim 15, wherein the set of placement restrictions are obtained from an application storage allocation policy, and wherein the application storage allocation policy enacts thin provisioning on different SSDs within the set of SSDs.

18. The non-transitory computer-readable storage medium of claim 15, wherein the one or more factors include a detected change in a write pattern associated with the application, and wherein the change in the write pattern results in an increase in a write performance of the set of SSDs.

19. The non-transitory computer-readable storage medium of claim 15, wherein the one or more factors include a reduction of SSD fragmentation between applications implemented on the set of SSDs.

20. The non-transitory computer-readable storage medium of claim 15, wherein the set of placement restrictions are obtained from the application profile.

21. The non-transitory computer-readable storage medium of claim 15, wherein the set of placement restrictions define a threshold amount of wear for determining which SSDs from the set of SSDs can be used, and wherein the threshold amount of wear is used to perform wear leveling across the set of SSDs.

* * * * *